United States Patent [19]

McMann et al.

[11] Patent Number: 5,014,220
[45] Date of Patent: May 7, 1991

[54] RELIABILITY MODEL GENERATOR

[75] Inventors: Catherine M. McMann, Renton; Gerald C. Cohen, Seattle, both of Wash.

[73] Assignee: The Boeing Company, Seattle, Wash.

[21] Appl. No.: 241,540

[22] Filed: Sep. 6, 1988

[51] Int. Cl.[5] .................... G06F 15/18; G06F 13/14
[52] U.S. Cl. .................... 364/513; 364/200; 364/274.3
[58] Field of Search ............ 364/186, 187, 188, 189, 364/513, 578, 200, 900

[56] References Cited

U.S. PATENT DOCUMENTS

| | | | |
|---|---|---|---|
| 3,882,305 | 5/1975 | Johnstone | 364/513 |
| 3,902,051 | 8/1975 | Betten | 364/186 |
| 4,155,116 | 5/1979 | Tawfik et al. | 364/513 |
| 4,593,367 | 6/1986 | Slack et al. | 364/513 |
| 4,599,692 | 7/1986 | Tan et al. | 364/513 |
| 4,599,693 | 7/1986 | Denenberg | 364/513 |
| 4,620,286 | 10/1986 | Smith et al. | 364/513 |
| 4,642,782 | 2/1987 | Kemper et al. | 364/513 |
| 4,644,479 | 2/1987 | Kemper et al. | 364/513 |
| 4,649,515 | 3/1987 | Thompson et al. | 364/513 |
| 4,675,829 | 6/1987 | Clemenson | 364/513 |
| 4,697,243 | 9/1987 | Moore et al. | 364/513 |
| 4,704,695 | 11/1987 | Kimura et al. | 364/513 |
| 4,713,775 | 12/1987 | Scott et al. | 364/513 |
| 4,752,889 | 6/1988 | Rapaport et al. | 364/513 |
| 4,839,823 | 6/1989 | Matsumoto | 364/513 |
| 4,847,784 | 7/1989 | Clancey | 364/513 |

Primary Examiner—Felix D. Gruber
Attorney, Agent, or Firm—Seed & Berry

[57] ABSTRACT

An improved method and system for automatically generating reliability models for use with a reliability evaluation tool is described. The reliability model generator of the present invention includes means for storing a plurality of low level reliability models which represent the reliability characteristics for low level system components. In addition, the present invention includes means for defining the interconnection of the low level reliability models via a system architecture description. In accordance with the principles of the present invention, a reliability model for the entire system is automatically generated by aggregating the low level reliability models based on the system architecture description.

23 Claims, 62 Drawing Sheets

```
SPACE        = ( NGFTP1: 0..1,    (* FTP CHANNEL STATUS         *)
               NPAR11: 0..1,      (* PARTITION INTERFACE STATUS *)
               NGFTP2: 0..1,      (* FTP CHANNEL STATUS         *)
               NPAR12: 0..1,      (* PARTITION INTERFACE STATUS *)
               NPAR22: 0..1,      (* PARTITION INTERFACE STATUS *)
               NGFTP3: 0..1,      (* FTP CHANNEL STATUS         *)
               NPAR13: 0..1,      (* PARTITION INTERFACE STATUS *)
               NPAR23: 0..1,      (* PARTITION INTERFACE STATUS *)
               NGFTP4: 0..1,      (* FTP CHANNEL STATUS         *)
               NPAR24: 0..1;      (* PARTITION INTERFACE STATUS *)

START        = ( 1,1, 1,1,1, 1,1,1, 1,1);

DEATHIF        NGFTP1 + NGFTP2 + NGFTP3 + NGFTP4 < 2
        OR NPAR11 + NPAR12 + NPAR13    (** SINGLE PARTITION SUCCESS CASE **)
        + NPAR22 + NPAR23 + NPAR24  < 1;  (** SINGLE PARTITION SUCCESS **)

LAMFTP    = 220.0E-6;    (* FTP CHANNEL FAILURE RATE              *)
                         (*  ---INCLUDES CENTRAL POWER SOURCE---  *)
LAMCOM    = 40.0E-6;     (* FTP NETWORK INTERFACE FAILURE RATE    *)
                         (*  ---INCLUDES ROOT NODE---             *)

IF NGFTP1 > 0 TRANTO NGFTP1 = 0, NPAR11 = 0
         BY LAMFTP;
IF NGFTP2 > 0 TRANTO NGFTP2 = 0, NPAR12 = 0,
         NPAR = 0
         BY LAMFTP;
IF NGFTP3 > 0 TRANTO NGFTP3 = 0, NPAR13 = 0
         NPAR23 = 0
         BY LAMFTP;
IF NGFTP4 > 0 TRANTO NGFTP4 = 0, NPAR24 = 0,
         BY LAMFTP;

IF NPAR11 > 0 TRANTO NPAR11 = 0 BY LAMCOM;
IF NPAR12 > 0 TRANTO NPAR12 = 0 BY LAMCOM;
IF NPAR13 > 0 TRANTO NPAR13 = 0 BY LAMCOM;
IF NPAR22 > 0 TRANTO NPAR22 = 0 BY LAMCOM;
IF NPAR23 > 0 TRANTO NPAR23 = 0 BY LAMCOM;
IF NPAR24 > 0 TRANTO NPAR24 = 0 BY LAMCOM;
```

Figure 1B

```
A :: @ (B :: input x; output q;
      C :: input y; output r);
      D :: input q, r; output z;
```

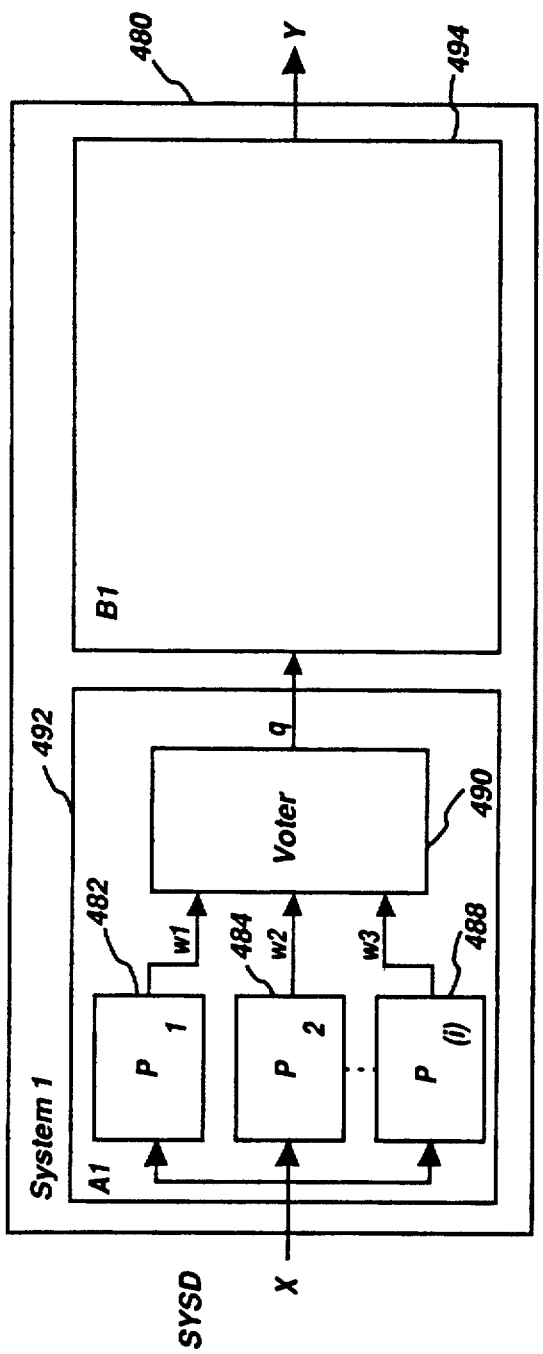
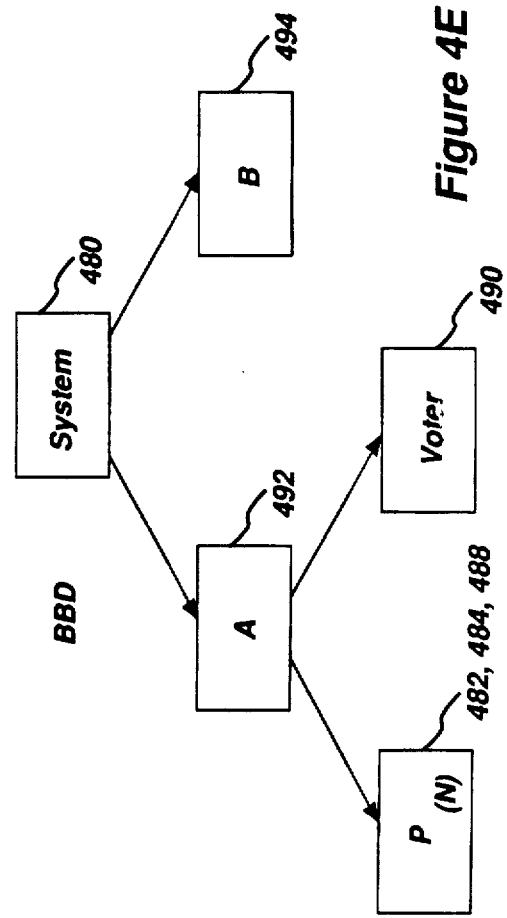
Figure 4D
Figure 4E

| COMPONENT NAME: SYSTEM | PARENT COMPONENT: EXAMPLE 1 |
|---|---|

FUNCTIONAL SPECIFICATIONS:
INPUT x; OUTPUT y;

SUBCOMPONENTS: A,B
INTRA-SUBCOMPONENT STRUCTURE:
A--> INPUT x; OUTPUT q;
B--> INPUT q; OUTPUT y;

---

| COMPONENT NAME: A | PARENT COMPONENT: SYSTEM |
|---|---|

FUNCTIONAL SPECIFICATIONS:
INPUT x; OUTPUT q;

SUBCOMPONENTS: P(I), VOTER
INTRA-SUBCOMPONENT STRUCTURE:
FA (P(I)): INPUT x; OUTPUT w I;
VOTER--> FA (P(I): INPUT w I; OUTPUT q;

---

| COMPONENT NAME: P | PARENT COMPONENT: A |
|---|---|

FUNCTIONAL SPECIFICATIONS:
INPUT x; OUTPUT w;

FAILURE MODES:
NO-OP: w:(n)
BAD:   w :(b)

---

| COMPONENT NAME: VOTER | PARENT COMPONENT: A |
|---|---|

FUNCTIONAL SPECIFICATIONS:
FA (P(I)):
INPUT w I FROM P(I);
OUTPUT y --> N | ALL(w I:(n))
      y = t|FAz<>t, w I:(^n):#(w I = t) > #(w I = z)

---

| COMPONENT NAME: B | PARENT COMPONENT: SYSTEM |
|---|---|

FUNCTIONAL SPECIFICATIONS:
INPUT q; OUTPUT NS(q);

FAILURE MODES:
NO-OP: y:(n)

*Figure 4F*

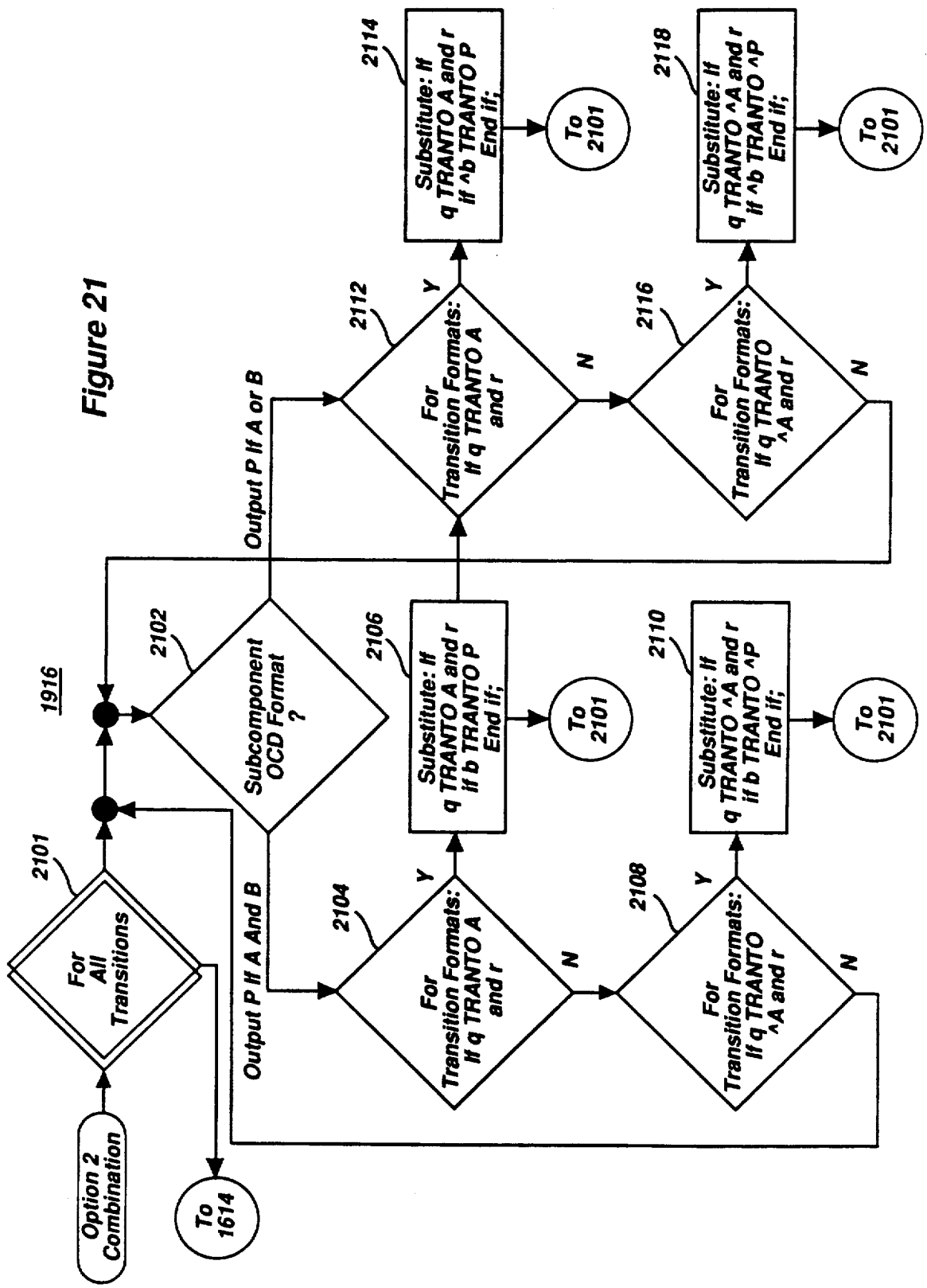

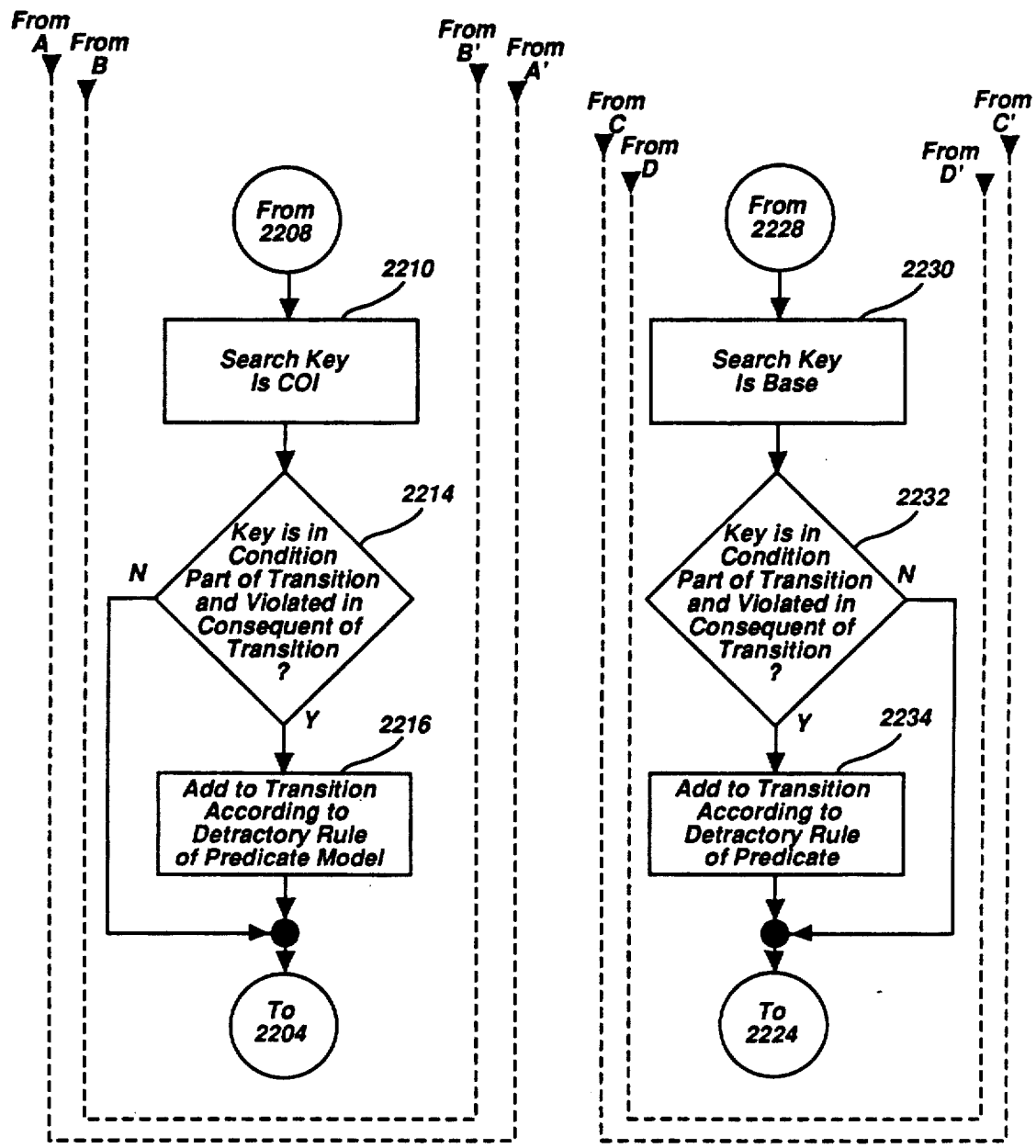
Figure 22B1    Figure 22B2

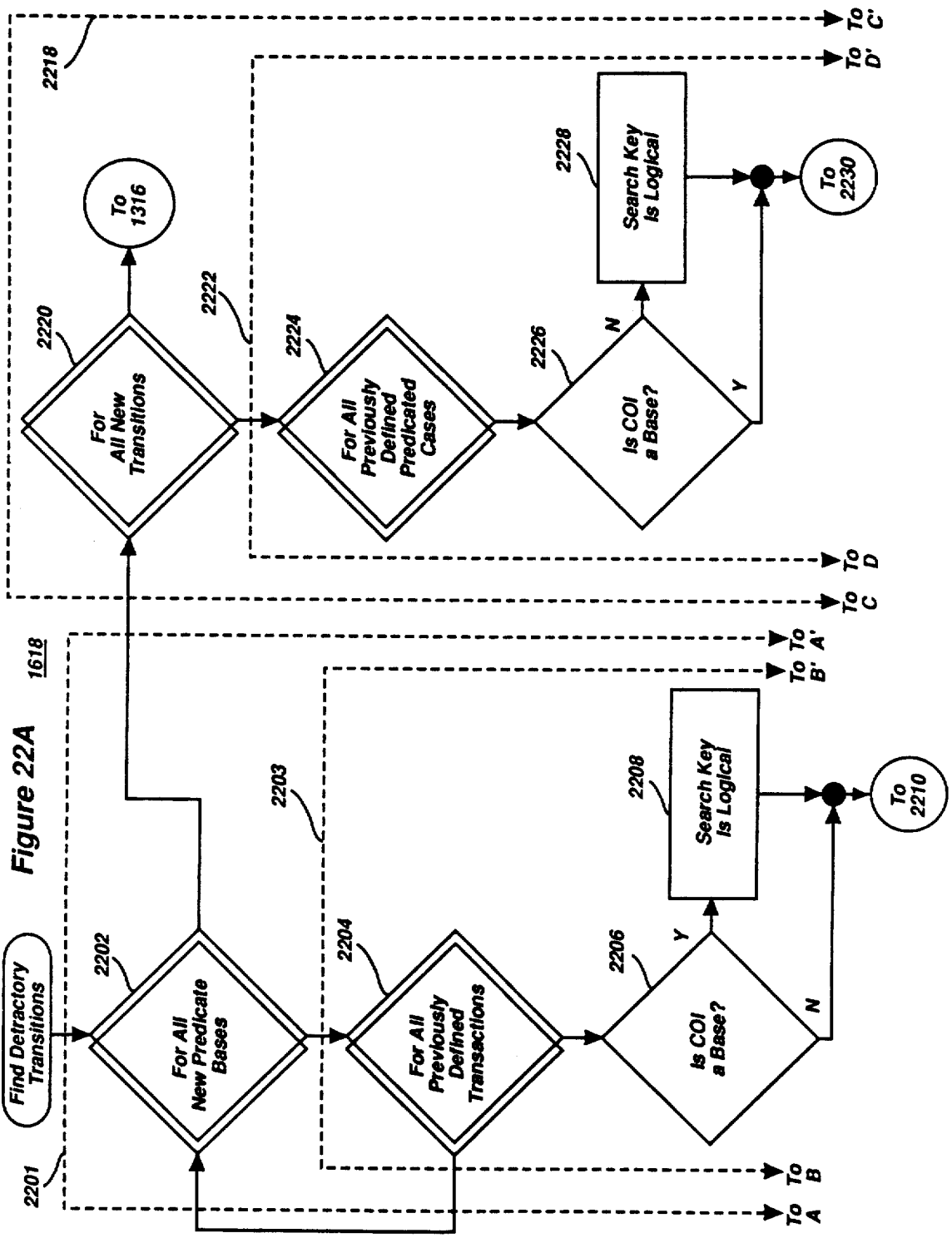

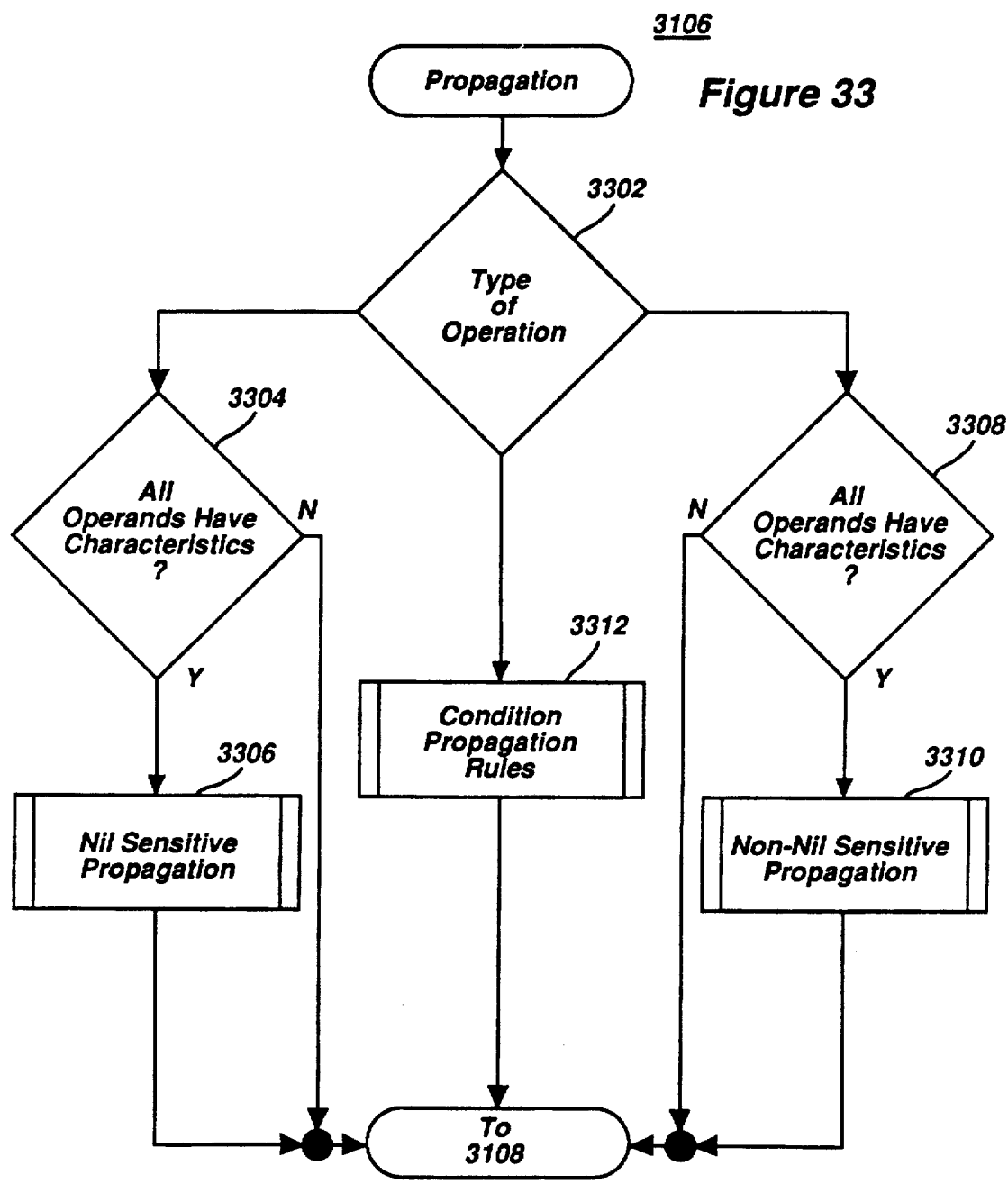

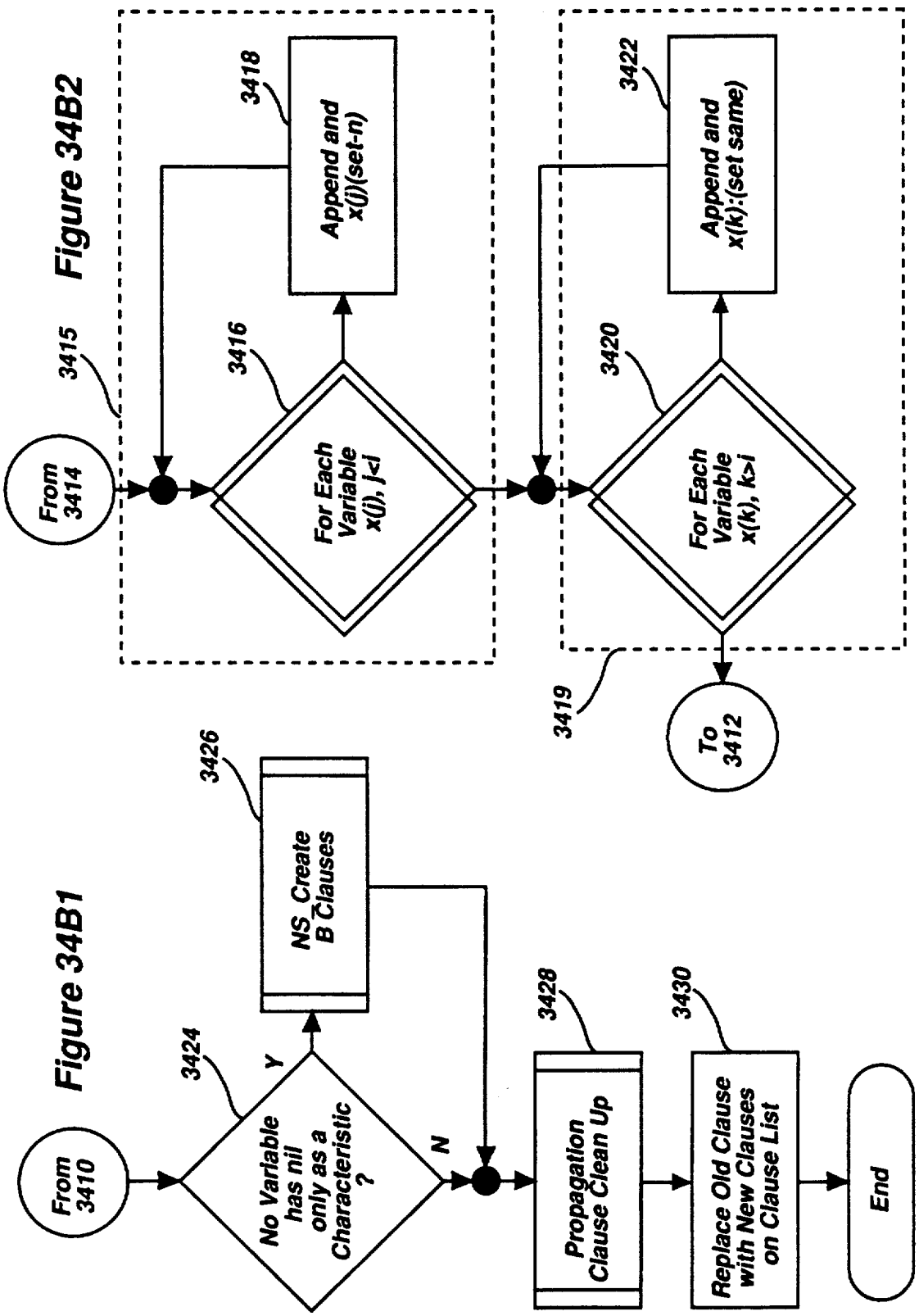

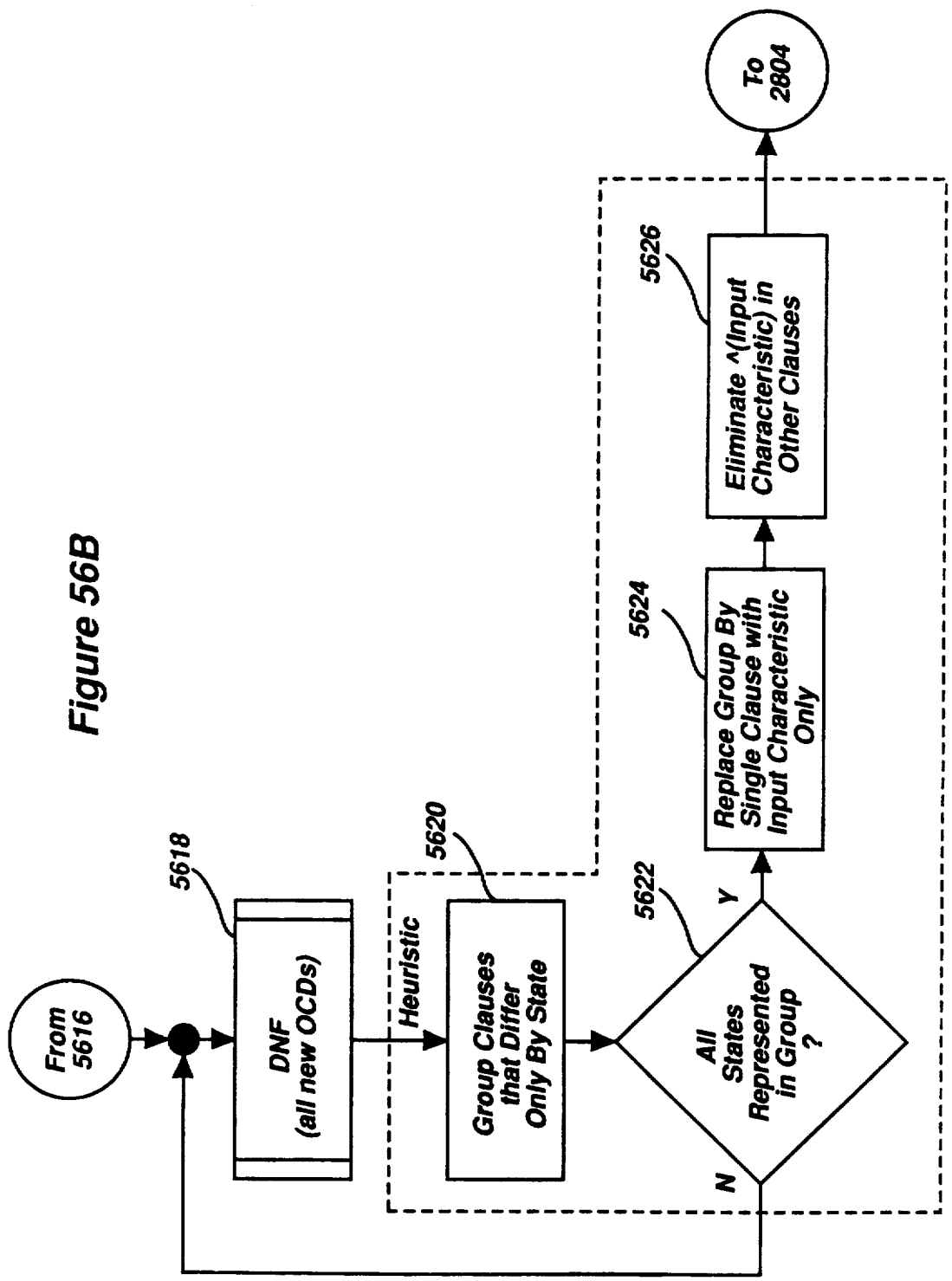

RELIABILITY MODEL GENERATOR

The invention described herein was made in the performance of work under NASA Contract No. NAS1-18099 and is subject to the provisions of Section 305 of the National Aeronautics and Space Act of 1958 (42 U.S.C. 2457).

FIELD OF THE INVENTION

This invention relates to the field of reliability analysis in complex systems and more specifically to a method and means of automatically generating a reliability model for use by a reliability evaluation tool.

BACKGROUND OF THE INVENTION

Reliability analysis can be defined as the analysis of events that contribute to the occurrence of undesirable conditions, and the application of probability theory to determine that the likelihood of these undesirable conditions falls within acceptable limits. In other words, reliability analysis provides a statistical basis for making decisions as to the relative safety or usefulness of a particular device or system.

Reliability analysis is especially important in complex systems such as flight control systems in aircraft as failure of a particular component or subsystem could cause the destruction of an entire aircraft or failure of a mission. As aircraft have become more sophisticated, control systems have become more vital to the operation of these aircraft. The use of digital systems and redundancy management schemes to satisfy flight control system requirements of high performance aircraft has increased both the number of implementation alternatives and the overall system design complexity. Consequently, a comprehensive reliability analysis of each candidate architecture becomes tedious, time-consuming and costly. Current methods for reliability analysis are discussed generally in a paper entitled "Methods for Evaluating Integrated Airframe/Propulsion Control System Architectures," Cohen, Lee and Palumbo, NAECON 87, vol. 2 (May 1987), pp. 569-575.

Currently, evaluation tools exist to aid in the analysis process. Given system reliability models such as fault trees or Markov Models, these tools quantify system attributes such as mean time between failures and component vulnerabilities for flight safety, or some other reliability condition.

To define the reliability model that serves as input to an evaluation tool, a failure mode effects analysis (FMEA) of the candidate system must be performed manually to determine the effects of component failures on the system. For advanced avionics systems incorporating complex redundancy management schemes, this can involve exploration of system component interrelationships which approaches combinatorial explosion. Using known reliability techniques, it is nearly impossible to completely analyze the reliability of a system before the system has been finalized and implemented. Furthermore, since current reliability models are generated manually, errors may be entered into the evaluation process which may not be discovered until well after the design is finalized.

In modern fault tolerant systems, the interrelationship between components are too complex to model. For example, modern aircraft employ multiprocessor real time computer systems which control the surface of the aircraft in flight based on inputs from sensors. The computer system then generates control laws which are used to control the surface actuators. Reliability of components in prior systems was largely based on experience, wherein block diagrams of components are manually mapped for each individual component. In complex systems, the time required to generate a reliability model often exceeds the allocated time for finalizing a system architecture, as noted above.

SUMMARY OF THE INVENTION

Briefly described, the present invention contemplates a reliability model generator which automatically generates a composite reliability model for a system of virtually any complexity. The reliability model generated by the present invention may then be analyzed by existing reliability analysis tools. The reliability model generator of the present invention includes a plurality of low level reliability models which represent the reliability characteristics for low level system components. The interrelationship of said low level models is defined via a system architecture description, and the present invention aggregates the low level reliability models into a single reliability model based on the desired system configuration. The present invention further includes means for manually inputting reliability paramenters (i.e., failure rates) for individual components, and automatically generating the low level reliability models based on the user defined reliability parameters for individual components.

Accordingly, it is an object of the present invention to provide a method and means of automatically generating a reliability model for a system or component, regardless of the complexity of the system or component.

It is another object of the present invention to provide a reliability model generator which can generate models for a plurality of system configurations using the same set of component descriptions.

It yet is another object of the present invention to improve the fidelity and accuracy of reliability models used by reliability tools.

It is still another object of the present invention to reduce the time required to generate reliability models.

It is another object of the present invention to automatically generate local reliability models for individual components based on user defined parameters.

It is another object of the present invention to automatically perform a failure mode effects analysis (FEMA) which is necessary in defining a reliability model.

BRIEF DESCRIPTION OF THE DRAWING

These and other objects may be completely understood through the description below and the accompanying figures of drawing in which:

FIG. 1A is a block diagram showing the environment of the present invention.

FIG. 1B is a block diagram showing a typical reliability model input to ASSIST.

FIG. 4D is a block diagram of a building block representation which may be analyzed in accordance with the present invention.

FIG. 4E is an internal representation of the hierarchical relationship between the components of FIG. 4D.

FIG. 4F is a building block description of the system shown in FIG. 4D.

FIG. 21 is a flow diagram detailing the operation of the option 2 subroutine called by the process of FIG. 19.

FIGS. 22A, 22B1, and 22B2 are flow diagrams detailing the operation of the Find Detractory Transitions subroutine called by the operation of the subroutine of FIG. 16.

FIG. 33 is a flow diagram of the propagation subroutine invoked by the process of FIG. 31.

FIGS. 34A, 34B1 and 34B2 are flow diagrams detailing the operation of the nil-sensitive subroutine invoked by the process of FIG. 33.

FIG. 56B is a continuation of the subroutine of FIG. 56A.

DETAILED DESCRIPTION OF THE INVENTION

Figure 1:
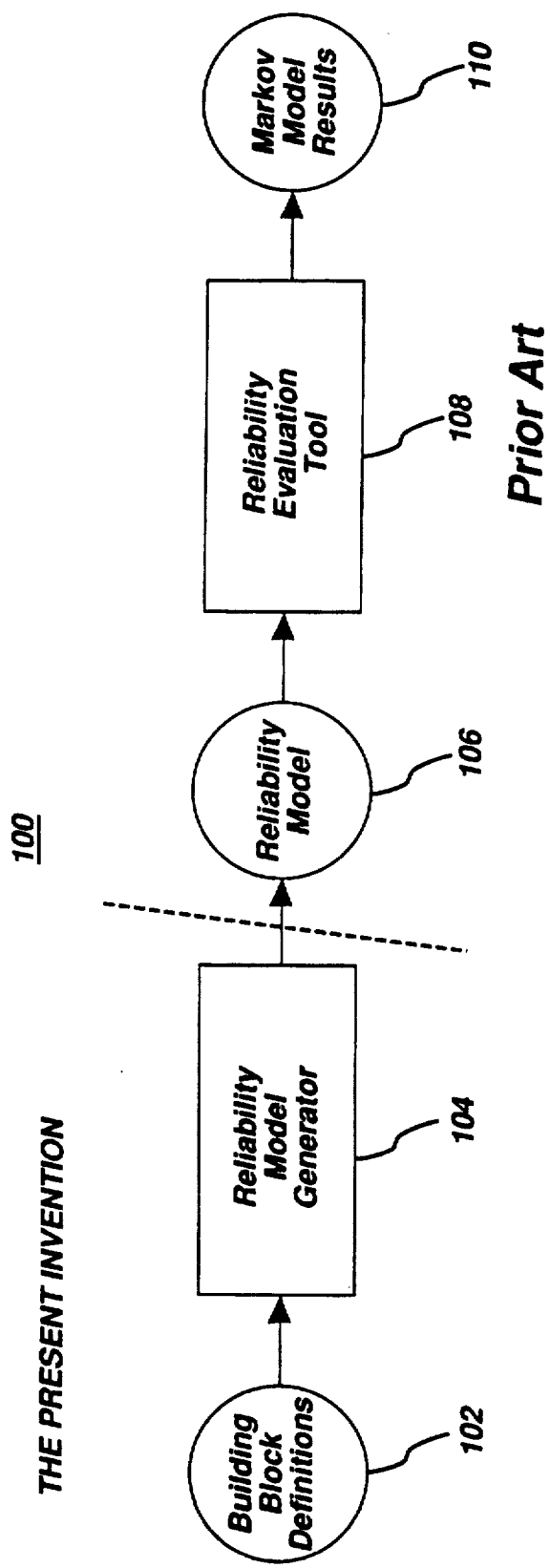

FIG. 1A is a block diagram showing the environment of the present invention. The present invention provides a reliability model for use by a reliability analysis tool. Reliability analysis can be defined as the analysis of events that contribute to the occurrence of undesirable conditions, and the application of probability theory to determine that the likelihood of these undesirable conditions falls within acceptable limits. Undesirable conditions are defined as a nonfulfillment of the system requirements being supported by a candidate architecture (e.g., loss of critical flight control functions). Furthermore, these conditions are a manifestation of component failures propagated through the interrelationship between system components. Therefore, to determine the sequence of component failures that contribute to a particular undesirable condition, a Failure Mode Effect Analysis (FMEA) is performed that traces the effects of component failures according to component interactions. For highly reliable systems, additional functions are incorporated into the architecture for failure detection, isolation, and recovery (FDIR). FMEA must identify these FDIR mechanisms and analyze their effects on overall system reliability. Another critical aspect of FMEA is concerned with the effects of multiple failures on the system and the effects of nearly simultaneous failures—a particular state of vulnerability in which a second failure may occur before the system can recover from the first failure. These time dependencies contribute to the difficulty of an accurate reliability analysis.

Once an analysis of critical failure modes is complete, a reliability model incorporating these characteristics is defined. The reliability model is then solved by an evaluation tool. One evaluation tool which may be used in association with the present invention is the Semi-Markov Unreliability Range Evaluator (SURE), developed by NASA. A system in SURE is defined as a state space description: the set of all feasible states of the system, given an initial state. State transitions, in SURE, describe the occurrence of faults and fault recovery actions that cause the system to change from one state to another. Given the state space description, including an identification of the initial state and those states that represent an unreliable system, SURE computes the upper and lower bounds on system reliability and provides an enumeration of all system failures. The sequence of component failures that contributed to each system failure is also identified.

An interface to SURE is provided by the Abstract Semi-Markov Specification Interface to the SURE Tool (ASSIST): a tool to aid in the specification of the reliability model. Input to ASSIST comprises a state space vector representing the attributes of the system. The failure modes and FDIR attributes are described to ASSIST as transitions in the form of logical statements. Each transition describes (in terms of the state space vector elements) a logical condition under which a change to the system occurs. The undesirable conditions, called death states, are identified by logical relationships among the state vector elements. From this specification, the SURE model is generated and solved. An example of an ASSIST description is shown in FIG. 1B.

Despite the user-friendly front-end to SURE provided by ASSIST, modeling expertise is needed to efficiently describe the reliability attributes in terms of a state space vector,."death" conditions, and transitions. In addition, if a model is not carefully defined, the state space for the system may culminate in an explosion of states that will require excessive computing resources to solve and validate the model.

The Reliability Model Generator of the present invention aids in analyzing the effects of component failures in the system and outputs a reliability model which may be in the ASSIST syntax. The present invention may also generate reliability models which are compatible with other types of reliability analysis tools. The reliability model then can be examined by the user or inputted to ASSIST and SURE to compute the reliability metrics.

In addition to the mechanics of reliability analysis, several environmental attributes are provided. Reliability analysis is performed at all phases of the design process. Consequently, models are often built incrementally, starting with limited or cursory knowledge of basic functions and critical failure modes, adding functional information and failure modes as implementation details become available. At any phase of the analysis, basic units of the architecture are identified, and failure modes postulated for them. These units may correspond to a physical hardware device or may refer to assemblies of units for which composite failure modes are identified. The units have been referred to in literature by various nomenclature including systems and subsystems, elements and subelements, modules and submodules, assemblies and subassemblies, components and subcomponents, structures and substructures, parts, etc. In the context of the present invention, each basic unit of the architecture is defined as a component. Components may consist of subcomponents, which themselves may be made up of other subcomponents. At some level of analysis, there is an identification of the highest level component and the lowest level subcomponents, and some multilevel hierarchy of subcomponent definition in between.

Failure modes are identified with the lowest level components. At level of design being analyzed, assumptions are made concerning the level of specification below this lowest level. For example, a multiprocessor system may define each processor as the lowest level component of the system with a single failure mode. Analysis at this level makes assumptions about the operation of the subcomponents of each processor. It assumes that no other failures of the processor can be manifested through interaction among a precessor's subcomponents. In theory, the more detailed the level of analysis, the more confidence the analyst has in the results. However, as the analysis includes more and more components at increasing levels of detail, the interactions among components through which failures are manifested become too numerous to easily analyze.

To manage the analysis complexity, a system may be divided into sets of components. The components in each set are analyzed separately at a detailed level (i.e., several levels of subcomponents), from which critical failure modes are ascertained. Failure modes of subcomponents are combined according to their severity and common effects on a higher level component. These failure modes are used to define a model of the component at the higher level. This component then becomes a lowest level component in a new aggregate model that also accounts for dependencies among the sets. Such incremental analysis allows detailed analysis without an explosion of states. However, care must be taken in this abstraction technique to ensure that an analyst does not overlook failure mode combinations within and between component sets that have a more severe effect on the system than identified. The credibility of the resulting reliability analysis is only as good as the validity of the assumptions made in the analysis. All assumptions must, therefore, be well understood.

In the system 100, a plurality of building blocks 102 describe the function, the failure characteristics and the structural relationship of the components. The building block definitions describe these characteristics in a hierarchical format which is shown in FIG. 4E. In systems which use components repetitively, the building block definition for the component need only be generated once and the building block definition may be reused as many times as necessary.

In prior systems, it is necessary to manually generate the description of each component every time the component appears in the system. This technique is extremely slow and manually generated descriptions are susceptible to errors. In the present invention, since the same building block definition may be reused, it is only necessary to edit or modify one definition for each type of component in the system and if an error is discovered or if it is necessary to refine the definition, only a single definition must be modified for each type of component. Building block definitions are discussed in more detail in conjunction with FIGS. 4A through 4E.

Once the building block definitions 102 are finalized, the reliability model generator 104 processes the definitions for any desired system configuration. The building block definitions 102 and the reliability model generator 104 are described in more detail in conjunction with the Figures of below. Once the building blocks are processed, the reliability model generator 104 outputs a reliability model 106 which can be analyzed by a preexisting reliability evaluation tool 108 to produce the model results 110. One existing reliability evaluation tool which is compatible with the reliability model generator of the present invention is referred to as the SURE system and is described in detail in a publication entitled "The SURE Reliability Analysis Program", by R. W. Butler, NASA Technical Memorandum 87593, February 1986. Currently, reliability models are generated manually with a tool referred to as ASSIST which is described in detail in a publication entitled "ASSIST User's Manual," by S. C. Johnson, NASA Technical Memorandum 87735, August 1986. The reliability model generator of the present invention produces a reliability model in the ASSIST syntax and is fully compatible with SURE. An illustration of the ASSIST syntax is shown in FIG. 1B.

Figure 2:
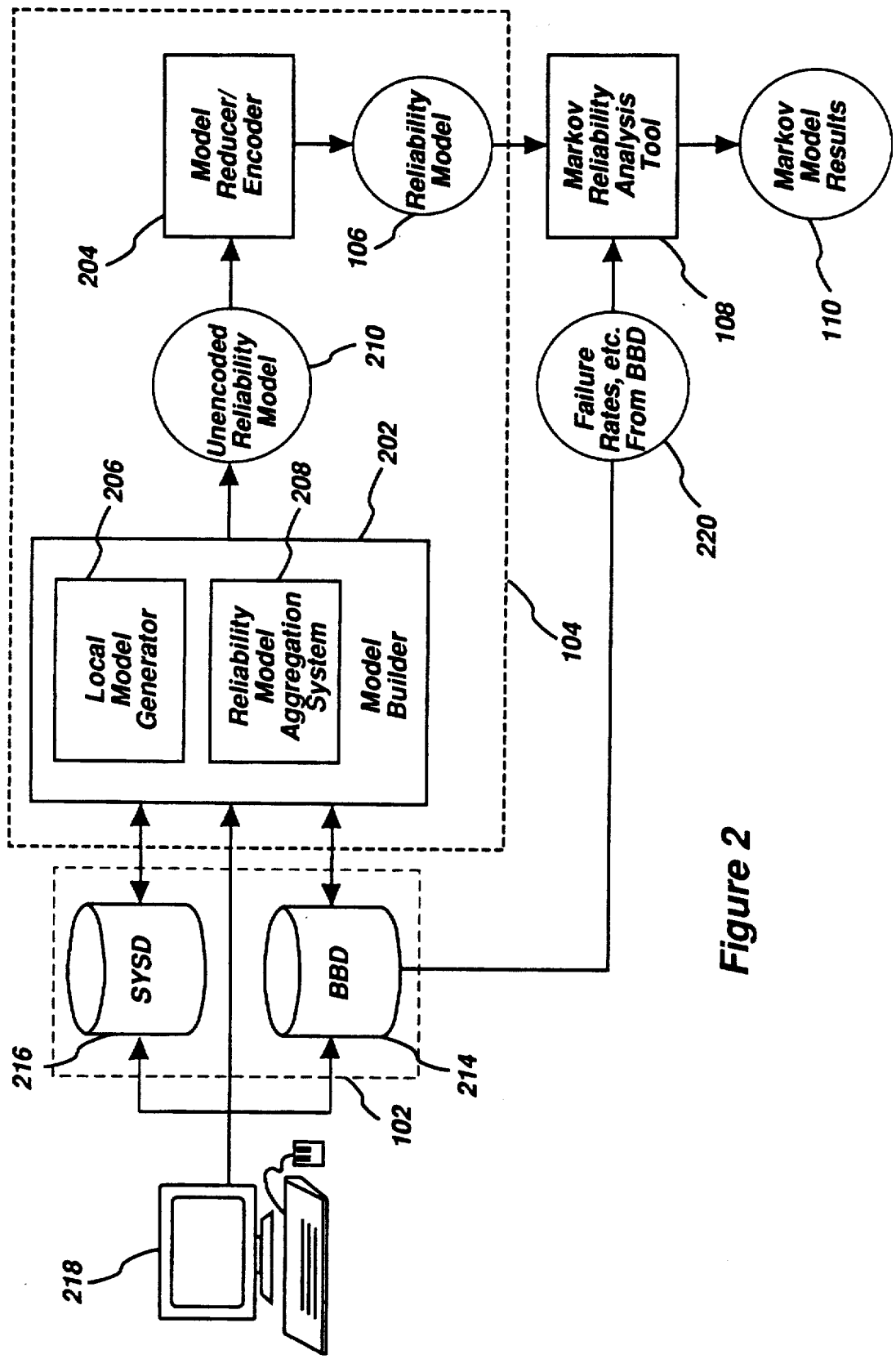
FIG. 2 is a block diagram showing the components of the present invention.

Referring now to FIG. 2, the reliability model generator 104 comprises two main subsystems referred to as the model builder 202 and the model reducer and encoder 204. The model builder 202 comprises two subsystems referred to as the reliability model aggregation system (RMAS) 208 and the local model generator (LMG) 206. The model builder 202 generates an unencoded reliability model 210 based on information contained in the knowledge bases 216 and 214. The inputs 102 consist of two knowledge bases 214 and 216 which provide a specification of the functional and structural characteristics of the system, respectively, and identify the failure modes for the components. Information may be stored and modified in the knowledge bases 214, 216 through a user interface 218 which may be any type of well-known computer terminal arrangement.

The knowledge base 214 is referred to as the building block definition (BBD), and it represents the set of components from which a candidate configuration may be designed. Associated with each component is a functional description that describes its behavior independent of any configuration. Once the building block definitions have been defined in the BBD 214, the user defines a candidate configuration or system definition (SYSD) in the knowledge base 216. Each component in the SYSD 216 is an instantiation of the component configuration defined in the BBD 214. The SYSD 216 defines the interconnections between the component instantiations. The distinction between the SYSD and BBD will be further described below.

The model builder 202 produces a reliability model 210 which is further processed by the model reducer/encoder 204 which converts the output of the reliability model 210 to a format 106 which is compatible with the reliability analysis tool 108. The BBD 214 also provides failure rates to the reliability analysis tool 108 to be used in analysis, as indicated by block 220.

Figure 3:
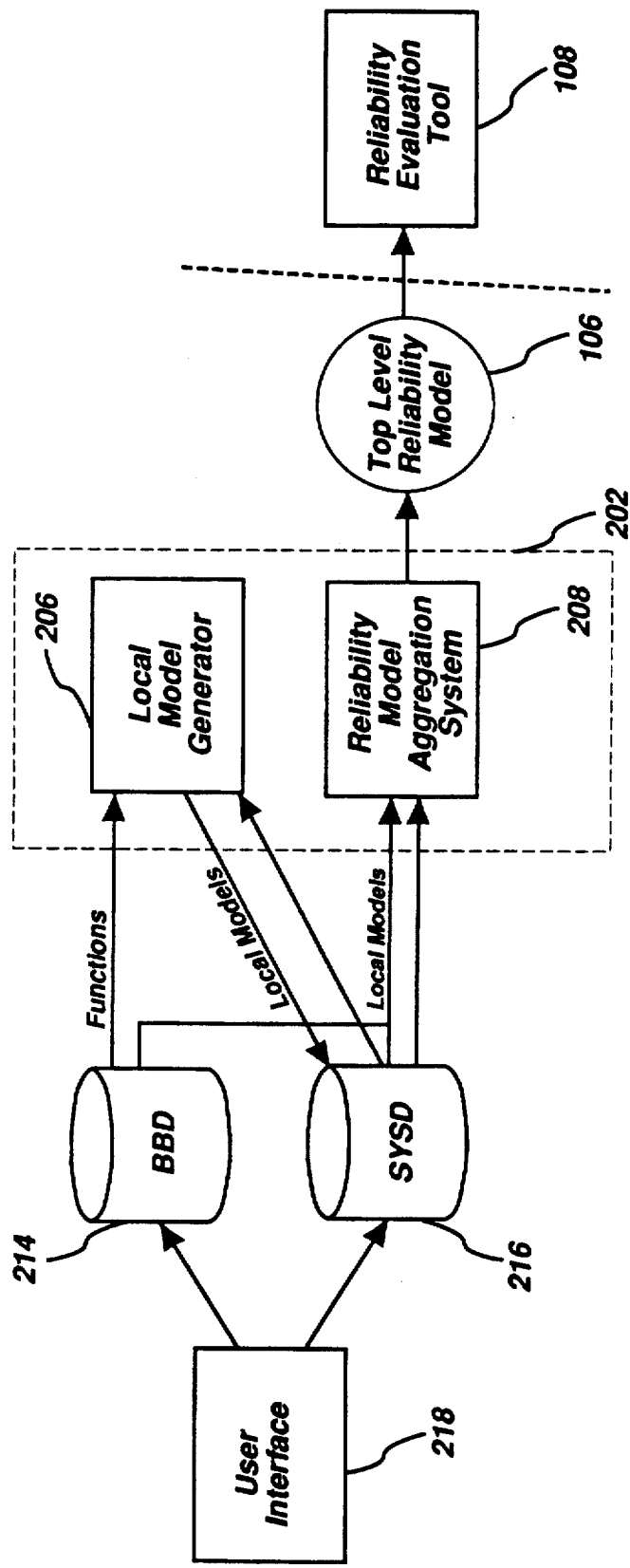
FIG. 3 is a block diagram detailing the interrelationship of the components of the present invention

Referring now to FIG. 3, the model builder 202 consists of two complementary tools: the Local Model Generator (LMG) 206 and the Reliability Model Aggregation System (RMAS) 208, which may be used separately or in conjunction. The Local Model Generator 206 traces the effects of lowest level component failure modes on other components in the system by following the interconnection description of the components which is defined in SYSD 206 and the functional description of the components described in the BBD 214. For each of the lowest level components in a system, the Local Model Generator 206 defines a local reliability model.

Each local reliability model, which is described in detail in conjunction with FIGS. 27 to 56, defines for the components of a desired system, all output effects as a function of the states of the components (i.e., failure modes) and the characteristics of the input to the components (e.g., corrupted and noncorrupted inputs). Component functions, failure modes, and local reliability models will be described further below.

The reliability model aggregation system 208 may use as input, the local reliability models, which are created by the LMG 206 or may be entered directly by the user at user interface 218, in conjunction with knowledge of the interrelationship between components which is provided by the BBD 214 and SYSD 216, to aggregate the local reliability models into a global reliability model for the system. Thus, the local model generator 206 and the reliability model aggregation system 208 together define a model of a system which maps the lowest level failure modes into the highest level unreliable condition.

Once a top level reliability model 210 is defined, further reduction techniques are applied by the model reducer/encoder 204 of FIG. 2, to reduce the model state space and encode the global model into the ASSIST syntax from which the SURE model is built. The model may then be solved by a reliability evaluation tool 108. An example of a reliability tool is SURE and ASSIST discussed in conjunction with FIG. 2.

The building block descriptions 214 represent the set of components from which candidate configurations may be designed. Each component of the BBD has a specific representation describing its behavior independent of any system configuration. The representations define, for each component, its functions, the ways in which the component may fail, and the probability associated with that failure (i.e., failure rates, etc.), which are stored in the form of data in block 220.

BBD components are defined hierarchically, with each level corresponding to a different view of the component. At the top level, a component is defined most generally, and at the lowest level, in the most detail. The highest and intermediate levels define the scope of the function for that level, identifying the subcomponents involved in that function, and describing the way in which the subcomponents interact.

Figure 4A:
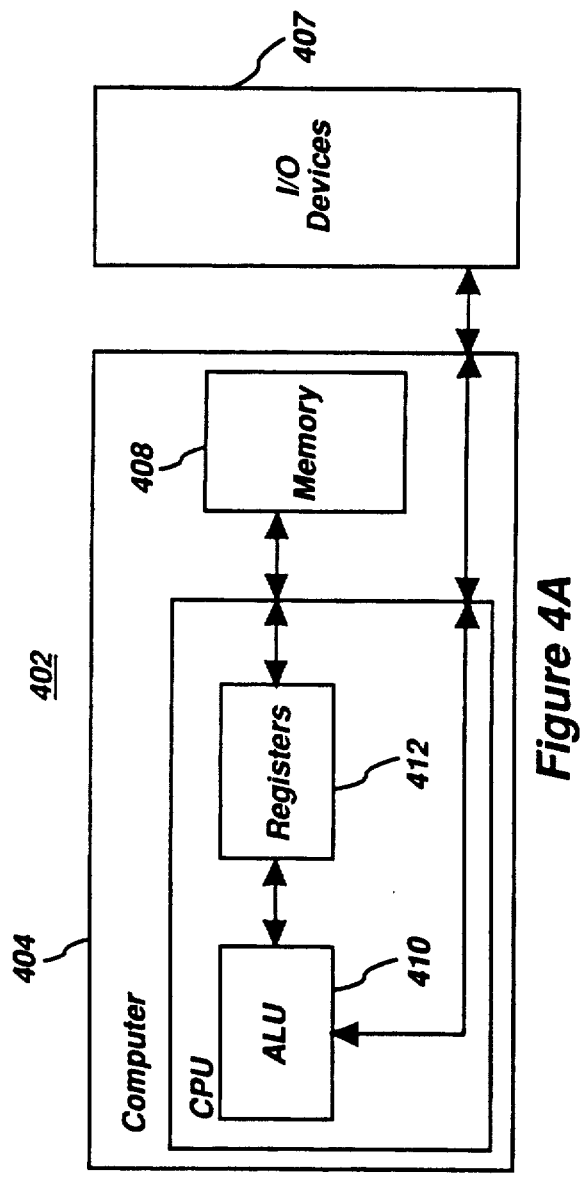
FIG. 4A is a block diagram showing one possible system which may be analyzed in accordance with the present invention.

FIG. 4A shows a typical computer system which may be represented in the BBD 214. It is contemplated that an interactive user interface 218 allows the user to specify the building blocks graphically, as shown in FIG. 4A. The graphic building block may then be mapped into an internal representation of the BBD 214 organized as a hierarchy of components such as the components shown in FIG. 4B.

Figure 4C:
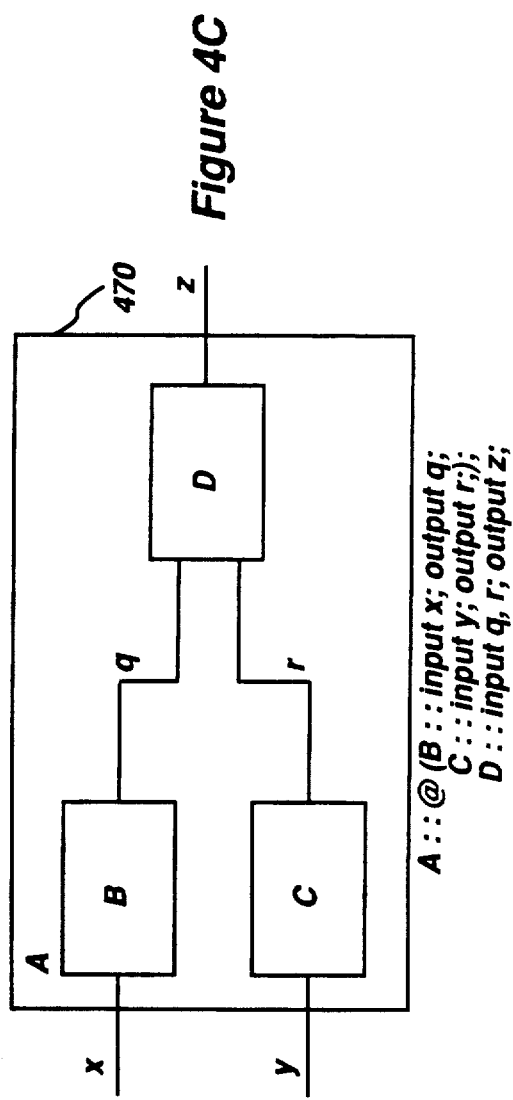
FIG. 4C is a block diagram showing a building block representation of a plurality of components in a system.
Figure 4B:
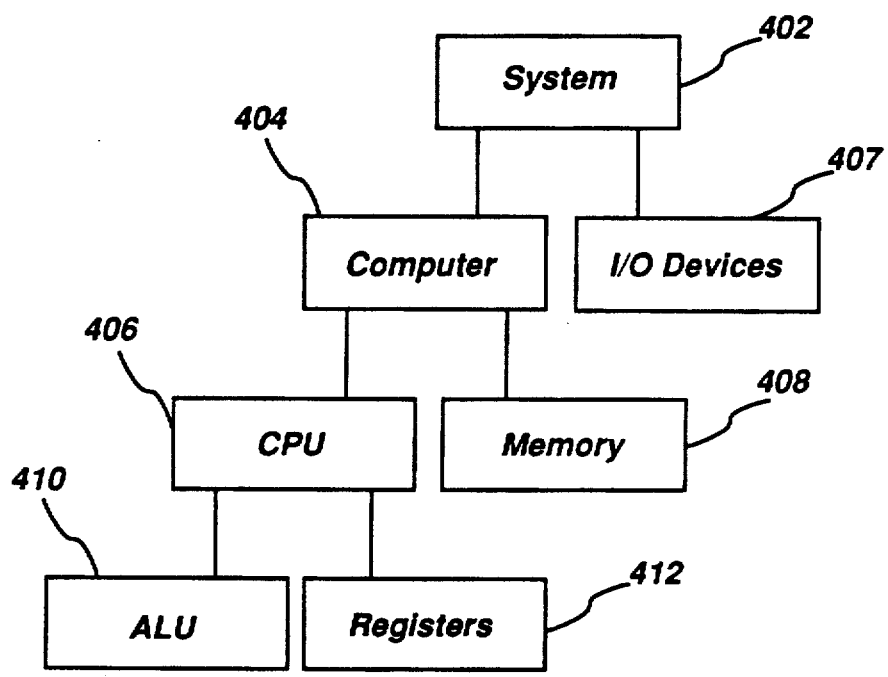
FIG. 4B is an internal representation of the hierarchical relationship between the components of FIG. 4A.

As shown in FIG. 4B, at the highest level, the system 402 is represented by two types of components, the computer 404 and the I/O devices 407. In other words, at this level, only the interrelationship between the computer 404 and the I/O devices 407 is defined. That is, the computer is represented as a functional block whose function is to receive information from and output to I/O devices 407. To specify the internal function of the computer 404 at the next level in the hierarchy (i.e., the computer's BBD component), the BBD 214 identifies two subcomponents, CPU 406 and memory 408, and defines their interrelationship within the computer 404. The third level defines the function of the CPU 406 and the memory elements 408, which are the subcomponents of the CPU. At this level, function of the registers 412 and the ALU 410 are identified and their interrelationship is defined. This hierarchical definition may continue to the most detailed level, such as gates or transistors, which may be analyzed.

FIG. 4C shows an example of a BBD specification for a component 470, designated A, which may be a subcomponent of the system 402 of a completely different architecture than the one represented in FIGS. 4A and 4B. FIG. 4C illustrates the syntax of an intermediate level component in the BBD. Component 470 (A) is composed of three subcomponents: B, C, and D. Subcomponents B and C execute inputs in parallel based on inputs x and y, respectively. The outputs of B and C (q and r, 470 respectively) are sent to subcomponent D which outputs the final value, z.

The representation of component A in the BBD is defined as follows. The functional flow between individual subcomponents is defined using a semicolon to indicate a sequence and the @ symbol to indicate parallelism. Parallelism among redundant components may also be specified by using the FA (for all) universal quantifier. In the following description, each subcomponent is identified in the functional flow by its name and 2 colons, and following the name is a specification of its inputs and outputs. The function performed by each subcomponent of component A is not specified in the BBD for component A, but rather is specified in a separate BBD component module for each subcomponent at the next lower level in the BBD hierarchy.

The hierarchical definition of components in the BBD 214 corresponds to the way in which systems are normally characterized, by subdividing complex systems into simpler ones. This also allows for flexibility in analyzing systems at all levels of design, thus supporting the iterative nature of reliability analysis during the life cycle of the design process.

At early stages of design when few implementation decisions are known, a high-level view of the system may be defined and analysis of critical failure modes may be performed on this high-level view. When further design details are known and needed in the reliability analysis, subcomponents are defined to expand the functional description, and failure modes are modeled at a more detailed level. As will be discussed in more detail below, this top-down structuring of component functional requirements also allows the present invention to trace the role a lower level component plays in a top-level unreliable condition.

The lowest level component definition defines the function of a component and any failure modes that are to be analyzed. The definition of the function and the failure modes are used by the LMG 206 to analyze any effects of component failures on other components in the system. Before defining the functional specification for the lowest level components, however, it is necessary to introduce the concept of input and output characteristics which is a central theme in the model builder processes.

Input/output characteristics are used to represent the effects of component failure modes on information flowing to other components in the system. In other words, a component's failure modes affect its outputs which are propagated to other components in the system. Only for certain cases does the effect of a failure mode identify the value of the output for a component that fails. In general, only certain characteristics of the output can be defined. For example, total component failure is a commonly modeled failure mode in which the expected component output is incorrect or corrupted in some manner. The exact value outputted is not so evident in the analysis as the fact that the value is not the expected value. The output of this component may be propagated to another component, whose behavior is affected by the presence of this ambiguous input aberration. The model builder 202 processes must therefore "reason" about the effects of corrupted input data on components, regardless of the value inputted. To address this, qualitative characteristics of inputs and outputs, and not values, are propagated. Typically, for these characteristics, information may be used to define the effects of failure modes on interactions between components based on the following conditions:

(1) GOOD (y:g) characterizes a value (for variable: y) as that expected under normal (not failed) conditions.

(2) BAD (y:b) characterizes a value as corrupted in some unspecified manner whereby the value is not the expected value.

(3) NIL (y:n) characterizes a variable that is undefined or whose value was not received on time.

For example, a failure mode effect in which the component's output y is corrupted may be represented as y:b.

This characterization of inputs and outputs is sufficient to describe the effects of most failure modes. However, there are some instances in which additional information is needed.

For example, consider a "threshold analyzer" component. A "threshold analyzer" is a component that outputs the value it receives if that value is within some predefined threshold limits, and outputs an error signal otherwise. The reaction of this component to an erroneous input is dependent on whether the corrupted input lies within the predefined threshold limits. However, given only that the input is corrupted in some manner, this value may not be known. Reliability analysts, under these circumstances, estimate the likelihood of each type of corruption based on any one or more of the following assumptions:

1. Assume the worst effect so that the overall model is conservative.

2. Use measurement data for the failure mode that caused the erroneous output to:
   a. Model each possibility, adjusting the failure rates of the possible effects by their likelihood of occurrence.
   b. Model the most likely possibility and ignore extremely unlikely ones. This may not be conservative if the disregarded condition causes a worse effect.

The criteria for selection of an appropriate approach are dependent on the failure mode that caused the effect and therefore cannot be determined by the tool of the present invention. To resolve this problem, the input and output characteristics for components may be specified non-deterministically such that multiple effects of a failure mode are modeled, and a percentage, representing "likelihood of occurrence," may be associated with each distinguishing effect. Associating a percentage with an input characteristic makes an assumption on the failure mode characteristics that may not be accurate. Therefore, a list of such assumptions may be presented to the user with the final model.

As another example of the need for additional information on inputs and outputs, in an error signal generated by a threshold analyzer, assume an input is not corrupted and is within the tolerance of the predefined threshold limits. A signal whose value is "no error" would be generated and the characteristics of the error signal would be GOOD (i.e., not corrupted). In another case, assume the input is corrupted and not within the tolerance of the threshold. A signal whose value is "error" is then generated to another component. The characteristic of the error signal is still GOOD (i.e., not corrupted). However, the component receiving the error signal needs to distinguish a "GOOD" signal that indicates error from a "GOOD" signal that indicates no error in order to determine its course of action. Therefore, propagating only a "GOOD" characteristic for the error signal is not sufficient to analyze the effect of the error signal that resulted from a detection of a failure (threshold violation). In this situation, it is desirable that the actual "value" of the signal be propagated in addition to its characteristic.

In summary, the characteristics of GOOD, BAD, and NIL are used to represent the effects of failure modes on interactions between components. In addition, likelihood of occurrence may be associated with an input characteristic, or the value propagated may be specified with the input characteristic in order to provide compatibility of input and output characteristics between components.

When defining a functional specification syntax for the lowest level components of the BBD 214, it is desirable that the specification of the low level models be sufficient to represent the component functionality. The relationship between the information that is input to the component and the information that is produced by the component is defined by the functional specification in the BBD 214 so that the effects of inputs which have been influenced by other component errors on the component function may be analyzed.

The present invention provides a functional specification which is concise and unambiguous. The functional syntax is easy to understand and a reliability analyst is able to specify the component function in the most natural way. Furthermore, when the component functional definition is not well defined, as in early stages of design analysis, the functional syntax does not require a definition of a specific implementation.

For the purposes of describing the present invention, each component function may be mathematically defined by a series of sentences separated by a semicolon to indicate sequential flow. Within each sentence, one or more clauses may be defined, wherein each clause represents a condition under which the function occurs. Each phrase is delineated by a "|". For example:

$$y = x \mid x > z \qquad [1]$$
$$z \mid x\,y \neq z;$$

This phrase states that the variable y will equal x if $x > z$ and will be z if $x \neq z$.

In defining component functions, however, the user must ensure that the component is completely defined on all input combinations, and that clauses within a sentence do not have overlapping conditions. For example, the function:

$$\text{output } y \quad 1 \mid x = 3$$
$$2 \mid x > 0$$

must be defined as:

output y  1 | x = 3                           [9]

2 | x > 0 and NOT (x = 3)

so that the two clauses do not overlap.

Input variables, which may be information received from another component, and output variables, which are information that can be seen by another component, are explicitly defined; for example

```
Ex: INPUT x:
    INPUT z:
    OUTPUT y =  x | x > z                     [2]
                z | x ≠ z:
```

This phrase indicates that the variables x and z are received from other components. The variable y contains information that is sent to other components.

In addition to variables, functions may be specified to the left of the | sign. For example:

```
Ex: INPUT x:
    INPUT z:
    OUTPUT y = (+ x z) | x > z                [3]
               (− z x) | x ≠ z:
```

This series of phrases states that the output y will be the sum of x and z if x>z and the difference of z and x otherwise. In order to provide a more user-friendly functional specification, macros may be defined once and, thereafter, used by the user. For example, instead of function [1]above, a macro MAX may be defined:

```
MAX(x y) →  x | x > y                         [4]
            y | x ≠ y:
```

The "−>" symbol indicates that the MAX function is equivalent to this sentence.

With this macro definition, function [2] may be specified by the user as follows:

```
Ex: INPUT x:
    INPUT z:
    OUTPUT y = MAX(x z);                      [5]
```

However, internally, the representation of the function would be converted to that of [2].

The Model Builder of the present invention provides macros for the following functions:

1. logical comparators (e.g., <, >, =, ≠)
2. #(<set> <cond>)
which is the number of elements in <set> satisfying condition <cond>.
3. ALL(<set> < cond >)
which is a Boolean phrase that determines if all elements of set satisfy condition.

The function for the lowest level components is defined in order to be able to trace the effects of input characteristics through the function and define output characteristics. These output characteristics then become input characteristics for other components. Most functions define the output value as a result of input values. However, for this reliability analysis, functions must define the output characteristics as a result of input characteristics. For example, an adder component outputs the sum of its inputs. The function "+" is defined on integer inputs. However, the inputs are (g,b,n). Rules must define output characteristics of (g,b,n) for all possible input characteristics, (g,b,n).

Two rules for this translation are straightforward:
1. If all operands for a function are "g", then the output of the function is "g".
2. If one or more inputs to a function are "b", and all other inputs to the function are "g", then it can be assumed that the output of the function is "b".

In some situations, it is necessary to determine the output of a function if one input is "n" and another input is "b". Functions of this type are categorized according to the type of operation: either nil-sensitive or non-nil-sensitive.

In the case of nil-sensitive (NS) operations, the output value of the function is "sensitive" to the presence of nonexistent inputs such that if any input is "n", the output is "n".

For example, in the case of model mathematical functions (e.g., +, −, etc.) as producing no output if all operands are not available, the rules for defining output characteristics for nil-sensitive functions are:

```
OUTPUT  "g" IF all inputs are "g"
        "n" IF any input is "n"
        "b" IF any input is "b" and no input is "n".
```

In the case of non-nil-sensitive (NNS) operations, the output value is not sensitive to nil input values such that any "n" inputs are ignored in the calculation of the output.

For example, a majority function may ignore nil or nonvoting inputs and determine the majority based on the available inputs. The rules for defining output characteristics for non-nil-sensitive functions are:

```
OUTPUT  "g" IF all inputs are "g"
        "n" IF any input is "n"
        "b" IF any input is "b"
```

All mathematical functions, such as +, −, etc., are assumed to be nil-sensitive functions. Therefore, a sentence containing these operations are internally translated into NS operations. For example, the sentence in [3] would be:

```
[6] Ex: INPUT x:
        INPUT z
        OUTPUT y = NS(x z)|x > z
                   NS(x z)|x <= z:
```

If preferred, the user may specify functions using the NS and NNS function directly. This type of specification is ideal at early stages of design when functional implementation details are not known. However, the user may prefer to specify the function itself as in [3]. The specific rules regarding nil- and non-nil-sensitive functions are discussed in more detail below.

For some components, it is sufficient to define the function in the procedural manner described above. However, for other components, the procedural specification is not easily defined, nor is it necessary to define it in such a manner.

For example, in describing the function of a VOTER component, which is a component outputting the value that is the majority of its inputs, the user may wish to specify only that the voter outputs the majority of the inputs. At a high level of design, it may not be known what implementation is involved in the computation of the majority. However, in defining majority in a procedural format, the specification results in a nested looping structure with variables for counting the number of occurrences of each input value. While it may not be important for the analysis that the means of obtaining the majority is defined, it is important that the definition of a majority be 'understood' by the system.

In order to add to the flexibility of the system to account for non-procedural functional specifications, an enhancement to the specification allows the use of universal and existential quantifiers. These quantifiers may be used to define outputs of the component in terms of the inputs.

As an example of this, the VOTER function could be defined as:

[7] OUTPUT   $y$ = nil    | ALL($x(i)$):nil $y = t$    | FA $x(i)$:(NOT nil)::

($x(i)$     = $t$) > #($x(i) \neq t$)

This function states that the output, y, will be nil (i.e., no output) if all inputs are nil, and the output, y, will be the value of t if for all inputs not equal to nil, the number of inputs equal to t will be greater than the number of inputs not equal to t.

The procedural specification differs from the non-procedural specification by the presence of quantifiers in non-procedural clauses. The universal quantifier specifies an attribute that is applicable to a set. The set usually represents redundant or replicated variables. Although similar, the universal quantifier is not equivalent to the ALL ((cond)) predicate. For example, the voter specification in [8] is redefined as:

[8]   output $y$:nil:    | ALL($x(i)$):nil output $y = t$    | #($x(i) = t$) > #($x(i) = z$)
AND ALL ($x(i)$:NOT $n$) AND ALL ($z < > t$):

is not defined on all inputs (e.g., when some x(i):n), but not ALL(x(i):n)). In other words, a simple predicate is "checked" to verify the validity of the clause, and a quantifier alters the inputs so that the clause is valid. For this reason, the quantifier is eliminated from the final OCD whereas all predicates remain in the final model. Analogously, the existential quantifier is not equivalent to a AT_LEAST_ONE(<cond>) predicate.

Another example of the use of quantifiers is a type of voter that outputs a plurality of the inputs. A value outputted may not be the clear majority, but there may be a greater number of these values than any other value inputted. This function would be specified as:

[9] OUTPUT   $y$:nil    | ALL($x(i)$):nil $y = t$    | FA $z < > t$, $x(i)$:(NOT nil)::

($x(i)$    = $t$) > #($x(i) = z$)

This function states that the output, y, will be nil (i.e., no output) if all inputs are nil, and the output will be the value of t if for all values z not equal to t and for all inputs not equal to nil, the number of inputs equal to t will be greater than the number of inputs equal to z.

Using a macro definition for majority, the user need only specify:

OUTPUT $y$ = MAJ($x(i)$);

OR

OUTPUT $y$ = PLU($x(i)$);

Failure modes are defined as a change to or an aberration of the component function. Thus at the lowest level, there is a definition of the component function under normal operation and a definition of the function or change to the function for each component failure mode. Most failure modes are defined by a change to the outputs produced by the component function rather than a change to the function itself.

For example, a component X may have a failure mode in which any outputs are corrupted regardless of the inputs. This failure mode would be defined by specifying a component state, X_BAD, whose function is simply to output corrupted data:

OUTPUT $y$:b IF X_BAD (for output $y$).

For all failure modes, transitions are defined from a non-failed component state. These transitions become part of the local reliability model for the component. A transition is defined for the failure mode as follows:

IF X_NOF TRANTO X_BAD by

<failure rate>

This states that if component X is not failed (in state X_NOF), then it may enter a failed state X_BAD according to some probability of occurrence of the failure mode. In other words, the system state changes to a state in which the new state is indicated. It is assumed that a component can fail only from an unfailed state.

It is not necessary to specify the system below the level at which failure modes are defined, since it is the effects of component failure modes on the system that are of interest. Conversely, if the reliability of a system is to be analyzed given a set of failure modes, the system components must be defined at least to the level at which failure modes are identified.

Referring now to FIG. 4D, a block diagram of another example system is shown. The system 480 includes a plurality of input subcomponents 482, 484, 488 and a voter 490 which comprise the component 492 (A). Component 492 cooperates with component 494 on the same hierarchical level. A typical building block functional specification for the system 480, generated in accordance with the above guidelines, is shown in FIG. 4F.

Referring now to FIG. 4F, the BBD component description of the system of FIG. 4E is shown. Component 480 is the root or top level component which defines the system inputs and outputs (x and y, respectively) the two subcomponents 492, 494 (components A and B) and their interrelationship are defined at the next level. Component A inputs x and outputs q. Component B inputs q and outputs y. The internal function of components A and B is not defined at this level; rather, a separate BBD component details this. For component A, the next level of subcomponents designates 482, 484, 488 and 490 are identified. Components 482, 484, 488 are identified as P and correspond to redundant components and component 490 is identified as a voter.

The subcomponent structure for A:

FA(P(I))::INPUT x OUTPUT w; VOTER::FA
(P(i))::INPUT w(i); OUTPUT q;

specifies that all invocations of component P receive the same input, x, and output a variable w. The voter component receives all w(i) from the redundant components, P, and outputs a value q, which is identified as the output of the component A also. The specifications of components, P, and Voter do not specify more than their input and outputs at this level.

Component P is specified in FIG. 4F. Since P is a component defined at the lowest level in the BBD, two failure modes are identified. The first failure mode is called NO-OP and it specifies that when P fails in this manner, the output w is "n". The second failure mode called BAD, specifies that the output w is "b" regardless of the inputs.

The voter component is also specified in FIG. 4F. The function defined is equivalent to the statement shown in [9]. There are no failure modes represented for the voter, even though the voter is a lowest level component.

Component B is also specified in FIG. 4F. A single failure mode, NO-OP, is specified. This failure mode is identical to the NO-OP failure mode for component P.

Figure 5A:
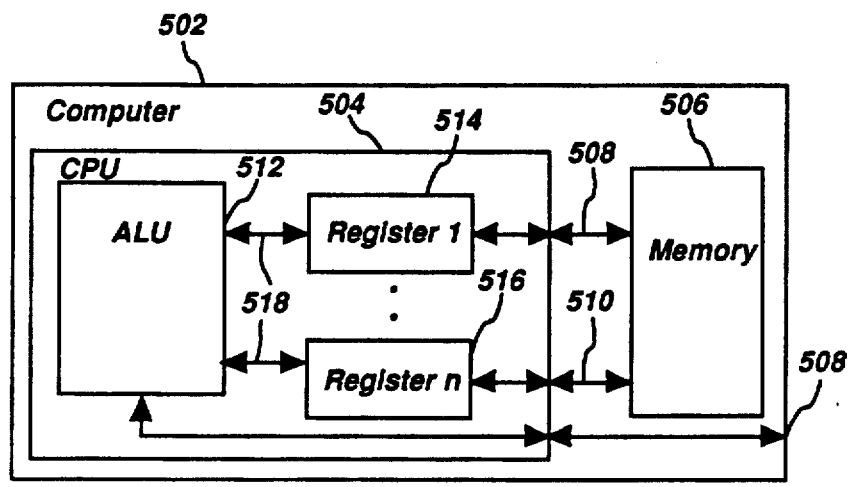
FIGS. 5A-C are system diagrams showing several possible system definitions which may be configured with the building blocks referred to in FIGS. 4A through 4E.
Figure 5B:
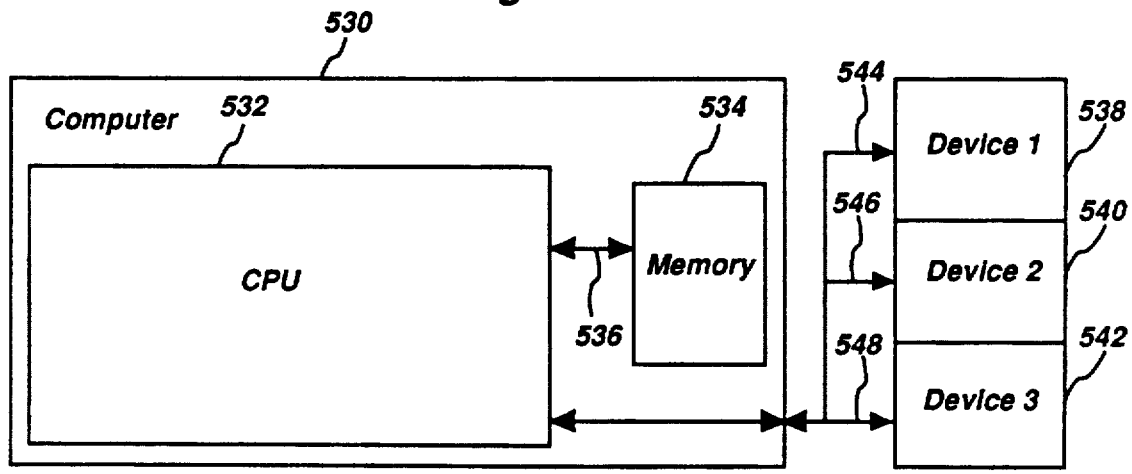
Figure 5C:
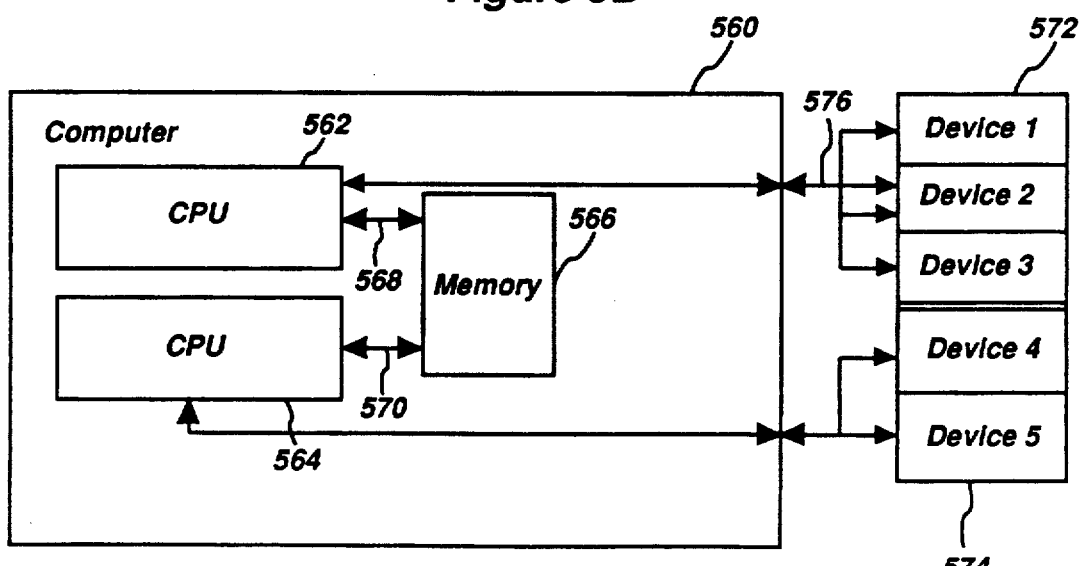

Referring now to FIGS. 5A-5C, once the building block component definitions 214 have been defined, the user defines a candidate configuration or system description in SYSD 216. Each component in the SYSD 216 is an instantiation of a component defined in the BBD 214. There may be several instantiations of a single BBD component in the SYSD 216. The SYSD 216 delineates the scope of the system to be analyzed, such that components in the BBD 214 not instantiated in the SYSD 216 are not included in the analysis. This allows system subsets to be analyzed separately, if required. When a component is selected for instantiation, all subcomponents for that component are instantiated with it to the level at which failure modes are represented in the BBD 214. This defines the lowest level of abstraction selected for analysis. The top-level unreliable condition to be analyzed is defined with respect to the highest level of the SYSD 216. By changing the highest and lowest level in the SYSD 216, a system may be modeled at varying levels of detail without altering the BBD. This permits easy modification for critical failure mode analysis.

The BBD/SYSD distinction allows a functional specification of components independent of their roles in a system. Generally, the BBD 214 and SYSD 216 enforce separation of function and structure so that alternative configurations can be analyzed simply by altering the SYSD 216. A component's definition may, however, include structural constraints with respect to other components that are common to all instantiations of that component. For example, a multiprocessor may have ports that are always intended to connect to I/O devices. By specifying these constraints in the BBD description of the component, an instantiation of the component in the SYSD enforces these constraints, thereby disallowing improper configurations.

FIGS. 5A through 5C show three possible configuration alternatives for analyzing a simple computer system such as that shown in FIGS. 4A and 4B. The present invention is adapted for use with a graphical interface to specify instantiation of BBD components into the SYSD 216 and will allow the user to graphically select the connections between components (e.g., mouse and menu). One graphical interface which is adapted for use with the present invention may be generated by the KEE expert system manufactured by Intellicorp. The KEE expert system is adapted for converting the input graphical information into an implementation of the present invention in the well-known LISP computer language which is particularly useful for implementing aspects of the present invention.

Referring now to FIG. 5A, a system may be configured in the SYSD 216 as a computer system 502 at the highest level. At an intermediate level, computer system 502 may be defined as having a CPU 504, which communicates with memory 506 through a plurality of bus lines 508 and 510. At the next level of detail, the CPU 504 may be defined as including an arithmetic logic unit 512 and a plurality of registers 514, 516 which are coupled to memory bus lines 508 and 510 and which communicate with ALU 512 through bus line 518.

Referring now to FIG. 5B, an alternate system may be configured in the SYSD 216 as a computer system 530 at the highest level. At an intermediate level, system 530 may be defined as having a CPU 532, which communicates with memory 534 through a bus line 536, and which communicates with a plurality of external devices 538, 540, and 542 through I/O ports 544, 546, and 548, respectively.

Referring now to FIG. 5C, another alternate system may be configured in the SYSD 216 as a multiprocessor computer system 560 at the highest level. At an intermediate level, system 560 may be defined as having a plurality of CPUs 562 and 564, which communicate with memory 566 through bus lines 568 and 570, respectively, and which communicate with a plurality of external devices 572 and 574 through I/O ports 576 and 578, respectively.

Figure 6:
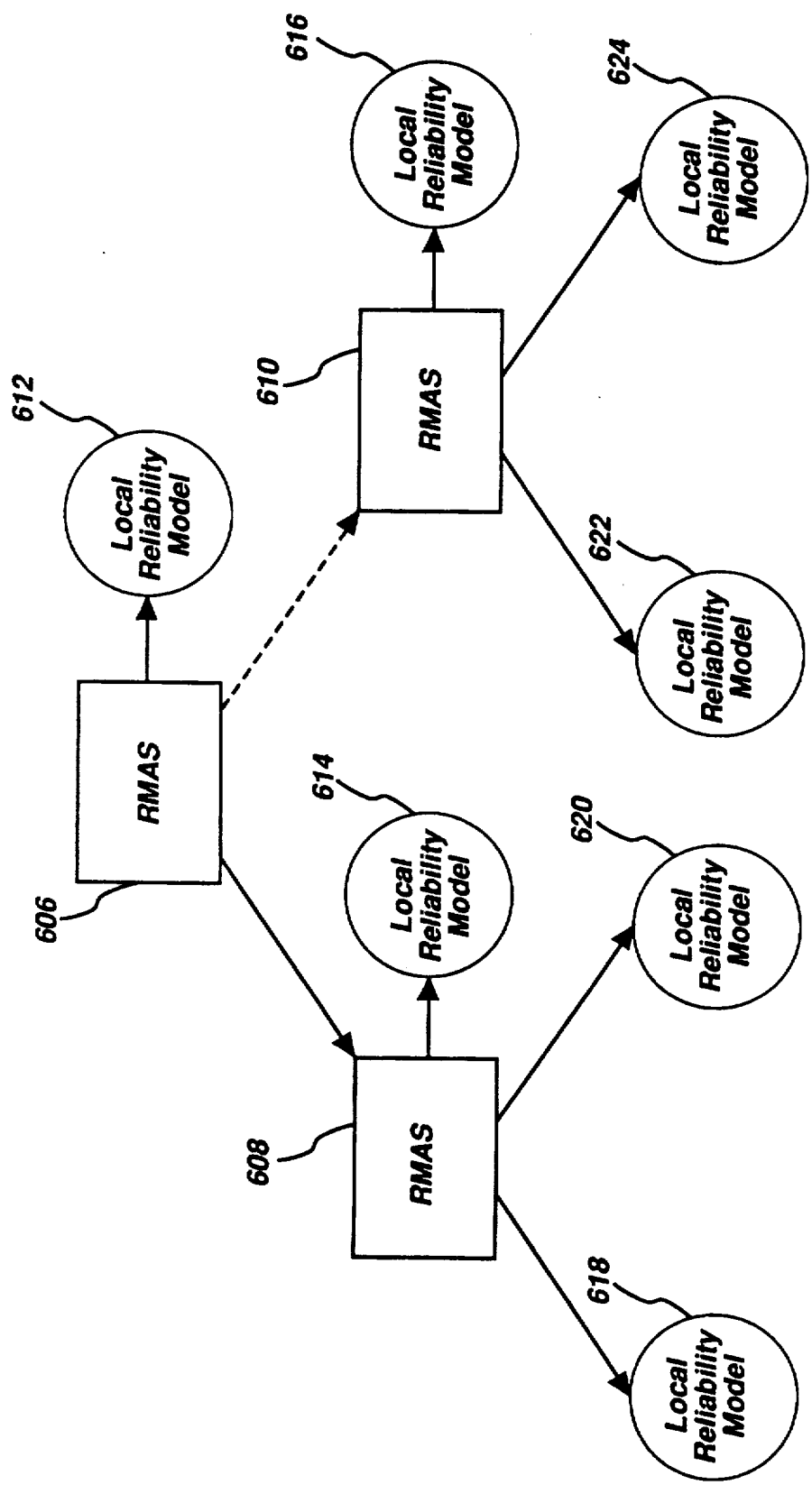
FIG. 6 is a diagram showing the hierarchical structure of the reliability model aggregation system.

Referring now to FIG. 6, given a userdefined SYSD configuration, a supporting BBD with local reliability models defined at the lowest level components, and an unreliable condition, models are defined for the failure mode and recovery transitions that contribute to the unreliable condition. The local model generator 206 may also introduce models at different levels.

As stated above, the SYSD defines the highest and lowest level view of the system to be analyzed, and at the lowest level, local reliability models generated by the LMG 206, define the effects of the component failure modes and input characteristics on the output characteristics of the components. The local reliability models may be defined by the user or generated by the local model generator. An unreliable condition is a definition of the state of the component at the highest level that constitutes an unreliable system. Therefore, the analysis tool of the present invention provides a global reliability model of a highest level unreliable condition from the lowest level local reliability models.

FIG. 6 shows a hierarchy of Reliability Model Aggregation System modules 606, 608 and 610 in which each respective module corresponds to a separate component abstraction, defined by the BBD/SYSD, beginning at the root 606, or highest level of component description. For the purpose of describing the present invention, each respective RMAS module is used to define a reliability model for the component level that comprises an aggregate of the lower level modules 608, and 610, respectively. Initially, a RMAS module is instantiated for the highest level component 606. Given an unreliable condition specified in terms of an undesirable output defined at the highest level, RMAS module 606 identifies the intermediate level subcomponents. If the subcomponent is an intermediate level component also, a second level RMAS module is instantiated for the subcomponent. Every subcomponent is identified, and for each successive intermediate level component abstraction, a separate RMAS module is instantiated according to the subcomponent interdependencies defined in the BBD/SYSD for the respective component level.

If the subcomponent is a lowest level component, a local reliability model is defined which identifies for each output characteristic conditions:

(1) component failure modes on component outputs; and (2) erroneous input characteristics that contribute to the output characteristic.

Each such condition is analyzed by the corresponding parent component RMAS module. For failure modes, transitions are defined explicitly in the local reliability model for the subcomponent that failed. Each input characteristic corresponds to an output characteristic of some other subcomponent that interacted with the subcomponent.

Figure 8:
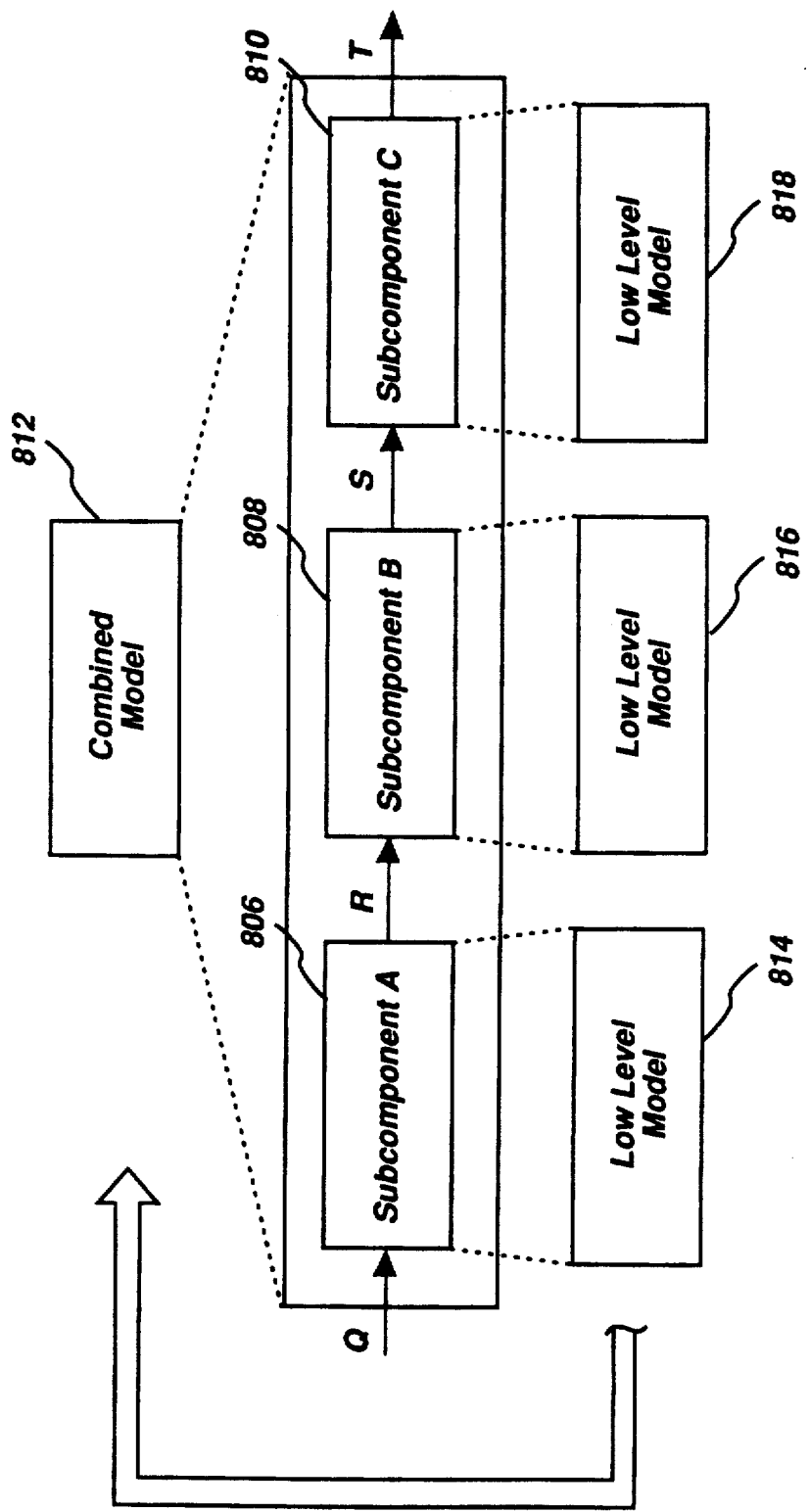
FIG. 8 is an illustration of the input/output structure of the reliability model aggregation system of the present invention.

For example, in FIG. 8, the input characteristic for component 810 (C) corresponds to the output characteristic for component 808 (B). The RMAS model for the parent component, therefore, must investigate the model for component 808 (B) to find transitions that contributed to its output characteristic which, in turn, served as an input characteristic to component 810 (C). If component B is an intermediate level component, then, as stated above, a RMAS module 816 is invoked for it (at the lower level in the hierarchy). This RMAS module creates a reliability model of component B that defines the states and input characteristics that contribute the B's output characteristic being analyzed by the parent component.

If component 808 (B) is a lowest level component, then its reliability model is interrogated directly. Component B's output characteristic may be dependent on its state and its input characteristics, etc. At each iteration of this backtracing, transitions are defined for component state changes, and analysis of input conditions is deferred to the component from which the input was generated. This backtracing continues until:

1. the output characteristic being analyzed is not derived from an input characteristic,
2. the input of the parent component is reached, or
3. a completed cycle is detected.

Upon reaching one of these conditions, the "chain of conditions" (i.e., input/output characteristics and failure modes) found among the respective subcomponents are aggregated into a single, local reliability model for the parent component. The failure mode transitions found may be changed to reflect changes to the parent component rather than the outputs local to the subcomponent that failed. Furthermore, failure recovery transitions involving multiple subcomponents (and therefore, not represented in any single subcomponent model) may be detected. The parent's model, created in this way, is thus an aggregation of the subcomponent models. This model is returned to the next higher level where the tracing continues to other components in the tree. Therefore, the reliability models are "bubbled" up to the highest level component which defines the model for the system.

Instantiation of RMAS modules proceeds in a top-down fashion rather than bottom up. This is because the focus of the global reliability model is the unreliable condition which is defined at the highest level. If aggregation were to proceed bottom-up without regard to the high-level unreliable condition, the resulting model may contain transitions and state space elements which are irrelevant to the unreliable condition being analyzed.

Reliability models returned from each level in the problem-solving hierarchy adhere to the same format. That is, each model defines, for the component, the characteristics of its outputs given a relationship between the characteristics of its inputs and the states of the components (as a result of failures). Also, transitions define changes to the component as a result of failures or recoveries from failures (FDIR schemes).

Figure 7:
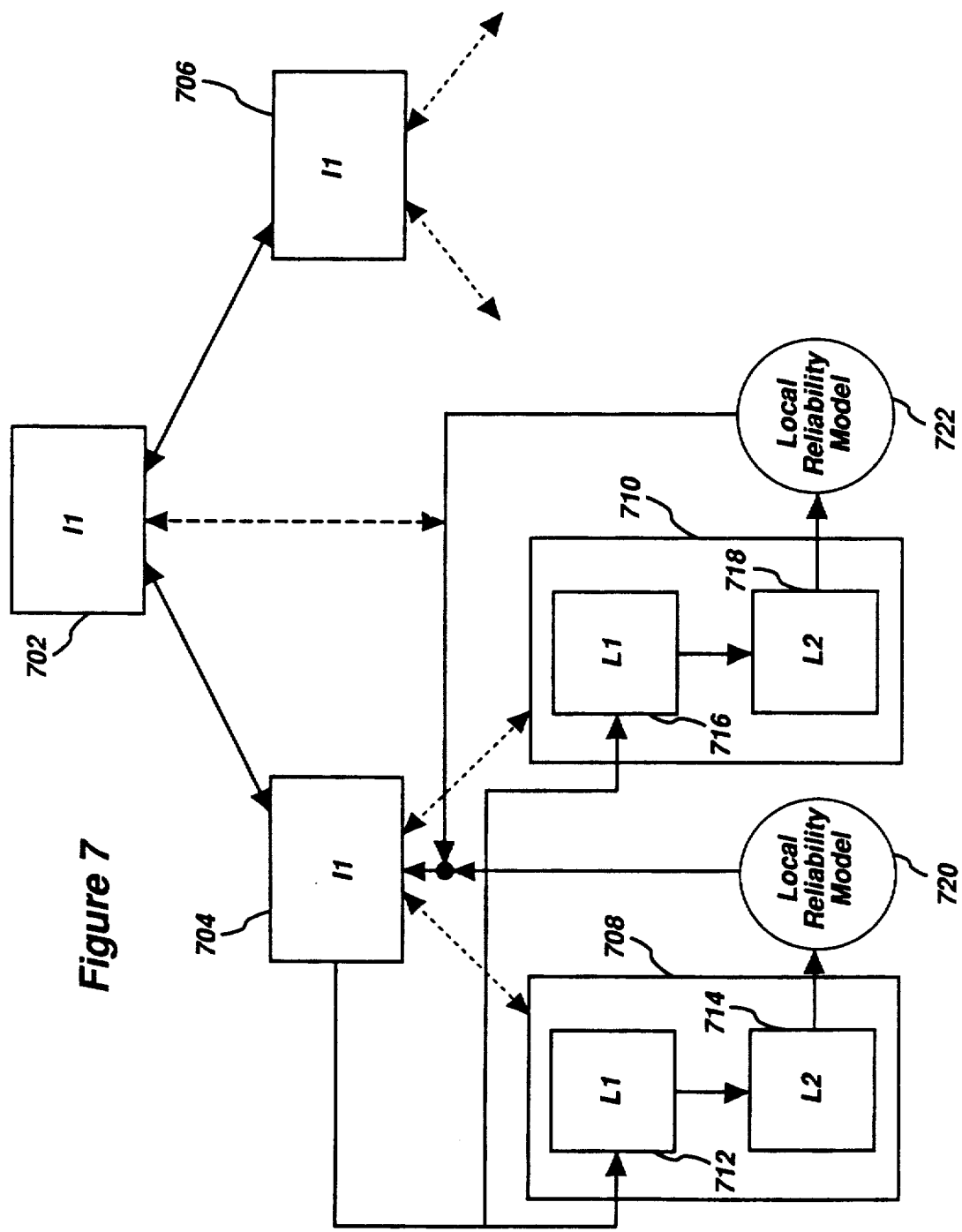
FIG. 7 is a block diagram showing the hierarchical structure of the local model generator.

Referring now to FIG. 7, assuming a hierarchical description of a candidate architecture (represented in the BBD and SYSD) in which component functions are defined at the lowest level of description and a high-level system unreliable condition for which the reliability is to be established, the present invention defines for each of the lowest level components, a local reliability model. Each local reliability model defines for the component all output characteristics as a function of the states of the component (i.e., failure modes) and the characteristics of the input to that component (e.g., corrupted or noncorrupted inputs).

The Local Model Generator consists of 3 processes: one process (I1) is invoked for each intermediate level component and two processes (L1 and L2) are invoked for each lowest level component. These are shown in FIG. 7. Like the RMAS processes, the LMG processes are instantiated in a hierarchy corresponding to the components defined in the SYSD (and supporting BBD). Initially, the highest level component module 702 (I1) is instantiated. This process is involved primarily with controlling the order of invocation of the other LMG processes. Given the unreliable condition specified in terms of the function defined at this level, process I1 identifies the intermediate subcomponents involved in the function. Separate reasoning modules for each subcomponent are then instantiated by process I1 in an order according to the functional flow described in SYSD and shown in FIG. 7.

For each successive intermediate level component abstraction 704 and 706, process I1 is performed as in the highest level module to identify subcomponents involved in the function. Separate modules for each subcomponent are instantiated by process I1 according to the functions defined in the BBD/SYSD for that component level.

If the first subcomponent in the function is a parent component also (i.e., has subcomponents defined in the BBD 704), another invocation of process I1 is invoked for it to identify the next lower level subcomponents involved in the function.

If a subcomponent is defined at the lowest level in the BBD where component failure modes are modeled, process L1 is invoked for 708 and 710. Recall that failure modes are modeled as a change to the function, such that at the lowest level, there is a functional definition for the component under normal operating conditions and a functional definition for each possible failure mode. At the lowest level, where component failures are modeled, process 712 (L1) inputs a set of possible input characteristics received from its parent component. For each operational state of the component (non-faulted and faulted mode), process 712 (L1) traces the effects of all input characteristics through the function to determine the resulting output characteristics. Transitions for each possible failure mode are also defined. Process 714 (L2) then combines failure mode states and input characteristic conditions that cause a common output effect, so that a single output characteristic definition (OCD) for each output characteristic is defined. These output characteristic definitions together with the transitions comprise the component's local reliability model 720 which is returned to process I1 704 of the parent component. Process I1 passes the output characteristics 722 to the subcomponent module which inputs these characteristics. If that subcomponent is defined in the BBD at an intermediate level, then process I1 is invoked for it. Otherwise, L1 is invoked and a local reliability model is defined. This depth-first trace proceeds through the hierarchy until eventually, the outputs of the system are reached.

The resulting local reliability models for each of the lowest level components 720, 722 can be interrogated by the user or given to the RMAS processes discussed in the previous section in order to define a global model for the system.

The following text describes RMAS modules in more detail. Since there are several intricate details of this process that inhibit a comprehensive description, an overview of the tasks involved in RMAS is initially described. The following description also includes details underlying each task.

Referring now to FIG. 8, the input characteristic for component C corresponds to the output characteristic for component B. The RMAS for the parent component, therefore, must investigate the model for component B to find transitions that contributed to its output characteristic which, in turn, served as an input characteristic to component C. If component B is an intermediate level component, then, as stated before, a RMAS module is invoked for it (at the third level in the hierarchy). This RMAS module must create a reliability model of component B that defines the states and input characteristics that contribute to the component B's output characteristic being analyzed by the parent component.

If component B is a lowest level component, then its reliability model is interrogated directly. Component B's output characteristic may be dependent on its state and its input characteristics.

Figure 9:
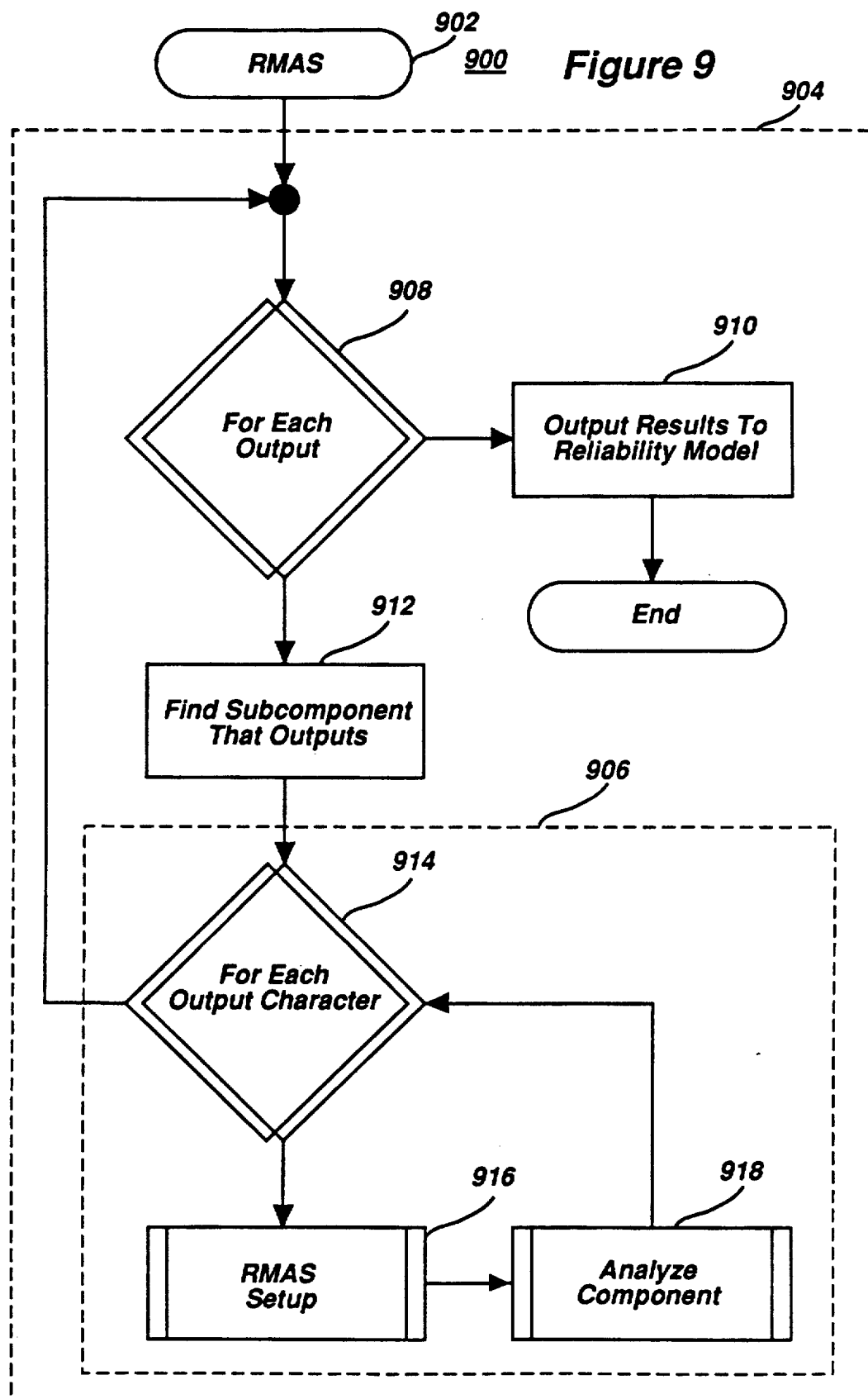
FIG. 9 is a flow diagram detailing the overall operation of the reliability model aggregation system of the present invention.

FIG. 9 is a flow diagram which describes the high-level function control flow of the reliability model aggregation system (RMAS) 902. In the following description, the terms "process" and "subroutine" are used interchangeably. The term "conditional block" is used to refer to a process step which tests a condition or state. The term "iterative block" is used to refer to a recursive process step wherein the step is repeated until a group of conditions or other paramenters have been processed. In other words, in each block which indicates "for each" and then has some condition, implies that when control returns to the block, the next condition is executed or the next element is instantiated and the loop repeats until the last condition has returned. At that point process control exits the loop to end or to some other designated pointer.

The RMAS 902 combines local reliability models defined at the lowest level of the BBD into a top level reliability model for the system. Upon user initiation, RMAS enters iterative loop 904 (an iterative loop performs a function for many instances of an element, such as a variety of input and output conditions) to determine the reliability models for each output of the top level component. Iterative loop 904 includes a nested iterative loop 906 which determines an output characteristic definition for each output characteristic of the output. Once initiated, RMAS 902 enters iterative block 908 which determines whether all outputs have been tested. Once outputs have been tested, RMAS 902 enters item 910 to output the results to the reliability model 106 and exit the RMAS. If all outputs have not been tested, iterative block 908 takes the next output and enters item 912 to find the subcomponent that generated the output. Conditional block 914 tests the output to determine whether all output characteristics have been analyzed. If all output characteristics have been analyzed, conditional block 914 returns control to conditional block 908. If all output characteristics have not been analyzed, conditional block 914 enters process 916 which initializes the program environment for process 918. Process 918 is executed to determine the output characteristic definition (OCD) for the output characteristic.

Figure 10:
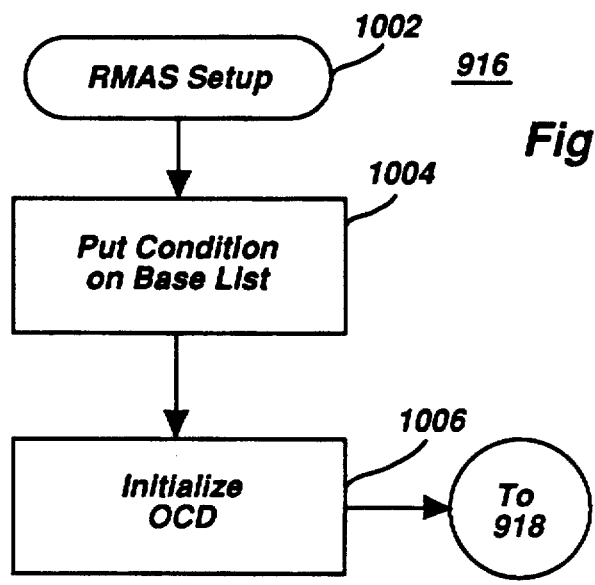
FIG. 10 is a flow diagram detailing the RMAS setup routine of the present invention.

FIG. 10 is a flow diagram of the RMAS setup process subroutine 916. RMAS setup subroutine 916 is invoked to initialize the program environment for process 918. The environment consists of the output characteristic currently being analyzed, and a plurality of stacks of conditions comprising a stack of past conditions, a stack of conditions scheduled for analysis called future conditions, and a stack of conditions currently being analyzed called present conditions, and a list of base conditions which are referenced in the final reliability model and array of logical conditions which are conditions equivalent to a set of base conditions (base list).

Once initialized, RMAS setup process 916 enters item 1004, which puts the condition on the base list referred to in the discussion on environment above. Item 1006 then initializes the parent output characteristic definition to the subcomponent output characteristic definition. Control flow then returns to process 918.

Figure 11:
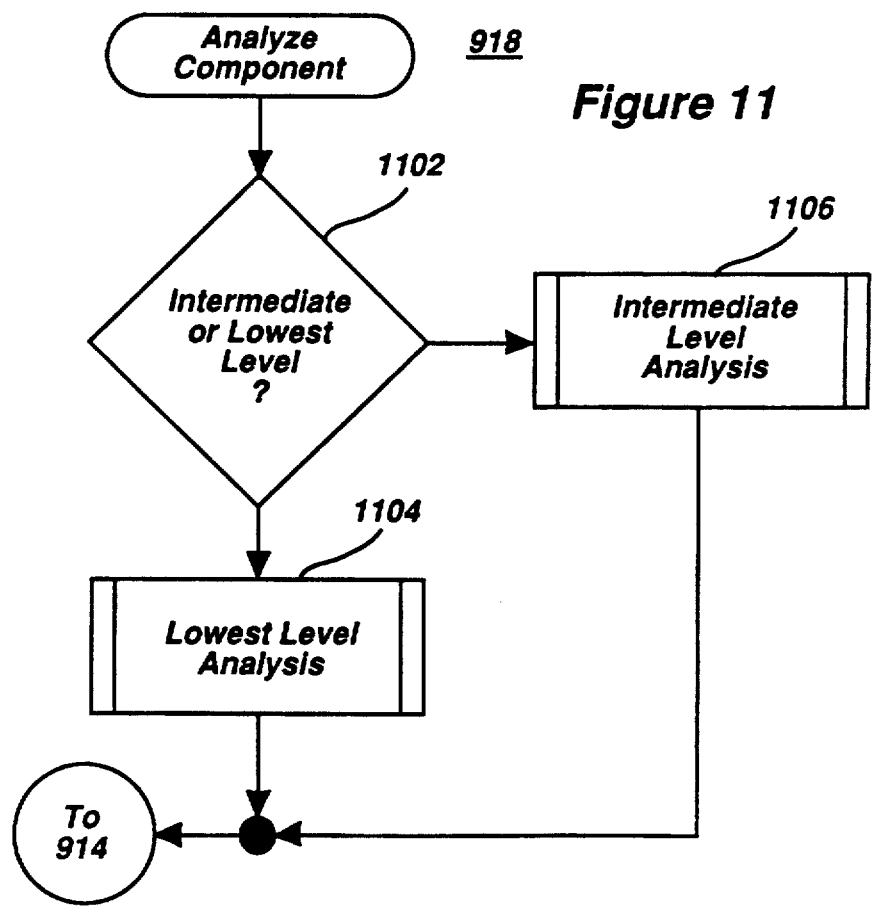
FIG. 11 is a flow diagram detailing the analyze component subroutine called by the subroutine of FIG. 9.

Referring now to FIG. 11, once control passes to process 918, conditional block 1102 tests the subcomponent to determine if it is defined at an intermediate level or at the lowest level in the BBD. If the subcomponent is defined at the intermediate level, then process 1106 is executed. If the subcomponent is defined at the lowest level, then process 1104 is executed. Process 1104 determines the output characteristic definition (OCD) for the lowest level analysis. Process 1106 determines the output characteristic definition (OCD) for the output characteristic for intermediate level analysis. While low level analysis is done on components on the most basic level, intermediate level analysis involves recursive execution of the RMAS processes for all its subcomponents thus providing a top-down hierarchical structure.

Figure 12:
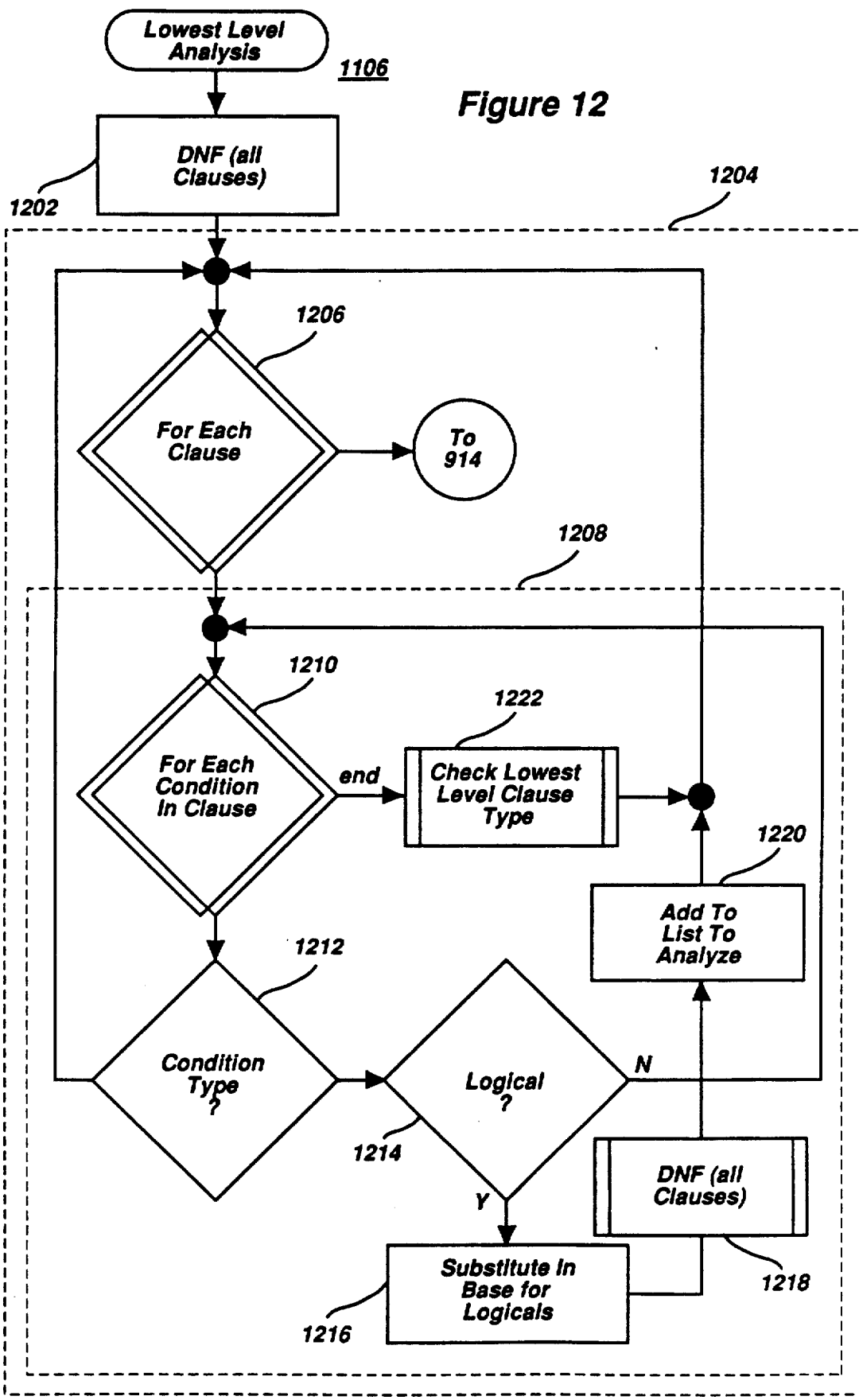
FIG. 12 is a flow diagram detailing the lowest level analysis subroutine called by the subroutine of FIG. 11.

FIG. 11 describes the function and interrelationship of intermediate and low level components. FIG. 12 is a flow diagram which describes the lowest level analysis process 1104. When invoked, item 1202 converts the data set output characteristic definition to a sum of products form, also called disjunctive normal form (DNF). Processes for converting data sets to disjunctive normal form are well known to those skilled in the art.

When an OCD is first reordered into disjunctive normal form (DNF), each clause is analyzed separately. Enforcing this ordering has several advantages that will be discussed in more detail below. When transitions are found that contribute to a condition in the OCD, the conditions in the OCD are sometimes changed. By ordering the OCD in DNF form, the changes made to a clause are localized to that clause. Further, the algorithms for changing the OCD require that the OCD be in DNF form. DNF clauses also allow detection of cycles in the analysis. Furthermore, DNF clauses provide a uniform ordering that minimizes ambiguity.

To translate a Boolean expression into DNF form, the following rules are applied iteratively on the expressions.

1. $A$ AND $B$ → one clause
   | $A$ AND $B$

2. $X$ OR $Y$ → separate subclauses
   | $X$
   | $Y$

3. $(X$ OR $Y)$ AND $Z$ →
   | $X$ AND $Z$
   | $X$ AND $Z$ where | delineates the clause boundaries, A and B are individual conditions, and X and Y are subclauses or individual conditions.

In the absence of parentheses, it is assumed that logical OR has the lowest precedence, logical AND is next, and Boolean comparators ($<$, $>$, $=$) have the highest precedence. Therefore, $A$ OR $B > C$ AND $D$ is equivalent to:
$A$ OR $((B > C)$ AND $D)$ which, in DNF is:
$A$ | $(B > C)$ AND $D$ Once converted to DNF form, the loop 1204 iterates for each clause of the output characteristic definition. The number of clauses which are in the output is dependent on the output characteristic definition. Each clause is separated by a logical OR condition represented here interchangeably by the symbol "|" or the word "OR", after conversion to disjunctive normal form. In other words, clauses are a series of conditions which are concatenated by a logical AND within a single clause. The clauses are concatenated by a logical OR condition to make up the output characteristic definition. The output characteristic definition may be defined with some characteristic good, bad or nil; together with "IF"; and a series of clauses, wherein each clause is delineated by the logical OR and conditions within each clause are delineated by the logical AND.

The conditions can be either input conditions, which are good, bad and nil, or they can be component states, or they can be predicates on inputs, such as the number of inputs that are good or that all inputs are good, predicate on the input characteristics.

Block 1206 iterates for each of the output clauses in the output characteristic definition. In the context of the present invention, a typical number of clauses associated with an individual condition may be three or four. When the process is completed, process control returns to item 914. If not completed, process control then passes to iterative loop 1208, which iterates for each condition within a particular clause. In other words, a smaller loop is invoked that is a nested loop within loop 1204. Loop 1208 is a nested loop which iterates for all conditions within a particular clause. Therefore, a clause is selected and the process defined by loop 1204 iterates all the conditions for that clause before going to the next clause. Conditional block 1210 is invoked to select the next clause, which is stored in a list of clauses, to perform a precheck on the conditions. The process calls a procedure block 1212, which for each condition checks to determine whether the condition is listed on the current list of conditions being analyzed or if it's listed on the past list of conditions which have already been analyzed. If the condition being analyzed is a past condition, the condition had already been analyzed at some earlier iteration of this low-level analysis. Therefore, the present invention confirms in 1214 whether this condition has a logical equivalent, and if it does, then substituted into the clause is the logical equivalent for the set of bases for that logical expression in 1216.

In some cases, when the final output characteristic definition is completed, some conditions can be referenced equivalently by other conditions. In these cases, conditional block 1214 reduces the final output characteristic definition and number of variable by substituting some conditions for other conditions to produce a reduced state space model. In earlier iterations, if that decision to substitute a logical in for the base has already been made, and if listed on the past condition list, the base equivalent is substituted for the logical. Conditional block 1214 therefore examines the condition type and if it's a logical, control then passes to process 1216, which substitutes the logical in the base for logicals. Once the substitution in the clause has been made, the clauses are reformatted into DNF format again by process block 1218 because, when substituted, the clause may not be in disjunctive normal form, if there wasn't a logical it is not necessary to perform DNF. If it's not a logical control returns to iterative block 1210 to continue analyzing the next condition. In other words, if it is a logical then the base equivalent is substituted for that logical and then the clauses are reorganized by calling the DNF subfunction 1218 which may create more than one clause for that one clause. In that case, the new clauses need to be analyzed and therefore added to the list of clauses to be analyzed in item 1220.

Process 1218 is a DNF process which, in some conditions, will generate another clause. Item 1220 then adds the new clause to the clause list to be analyzed, and that list is then added to all the lists of clauses that have to be analyzed and control returns to conditional block 1206 to analyze each clause. When a past logical type condition is detected, process control passes to item 1216. If a current condition type is detected in conditional block 1212, process control passes to iterative block 1206 because the entire clause doesn't need to be analyzed. Conditional block 1206 then passes that clause and selects the next one. The iteration process continues until all the clauses have been examined and all the conditions within a particular clause have been analyzed, except for the case where one of the conditions was on the current list. If a clause is on the current list, that clause is ignored. For all the other clauses, once the conditions within a clause have been analyzed, process control passes to process 1222 which calls the check lowest level clause type subroutine to check the clause type and determine for each condition within the clause, the transitions that contribute to the condition in the clause.

For example, in the case of an input condition, such as the condition input being bad, process 1222 analyzes the transitions that contribute to that input being bad. The transitions which contribute to an input being bad occur prior to this process. This process begins with a model for a component based on the assumption that the output of the model is good if certain conditions exist. The output of the model is bad if other conditions exist and the output of the model is nonexistent if still other conditions exist for this component. Therefore, the present invention determines, for each condition, which transitions contributed to those conditions. The transitions may be a part of other models for other components.

By way of review, a local reliability model, for each component at the lowest level has an output characteristic definition (OCD) and a set of transitions for each failure state of the component. Transitions are catalogued ahead of time in the form of a table. The transitions and the OCD are either entered by the user, or created by the other processes such as the local model generator which is further described below. The reliability model aggregation system employs the local reliability models as input to the RMAS system. Transitions take the form:

If a set of conditions are true, then there is a transition to a new set of conditions.

Conditions can also be state conditions to failure states. In summary, once new information for a particular input has been generated in the form of transition data, control returns back to conditional block 1206 to analyze the next clause. Once all the clauses have been analyzed by loop 1206, program control returns to conditional block 914.

FIG. 12 includes two processes which are invoked by the subroutine of FIG. 12. Items 1202 and 1218 invoke the same subroutine in alternate process steps.

The main process of FIG. 12 is process 1222, which is invoked to check the lowest level clause type. This process is described in detail in conjunction with FIG. 13. The subroutine of FIGS. 13A and 13B begins with a conditional block 1302 which is labeled case 1. Process 1222, check lowest level clause type, examines a valid clause to analyze, and for each condition determines the transitions that contribute to the condition. The case control conditional blocks, shown in FIGS. 13A and 13B, analyze each clause to determine what type of clause it is and process the clauses. Case 5 is the most often invoked case and is invoked when the conditions for cases 1-4 fail.

Figure 13A:
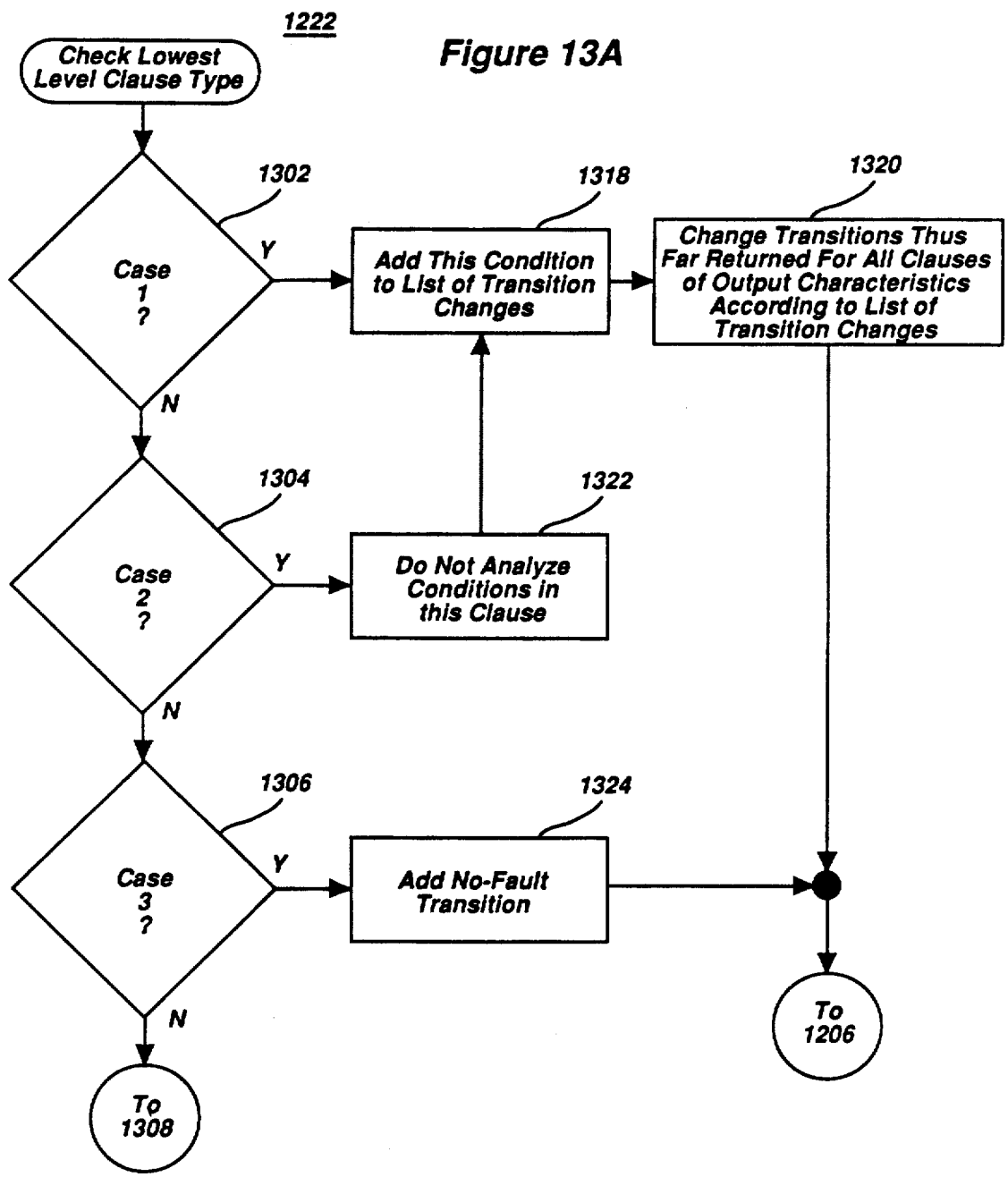
FIG. 13A is a flow diagram detailing the operation of the check lowest level clause-type subroutine called by the subroutine of FIG. 12.
Figure 13B:
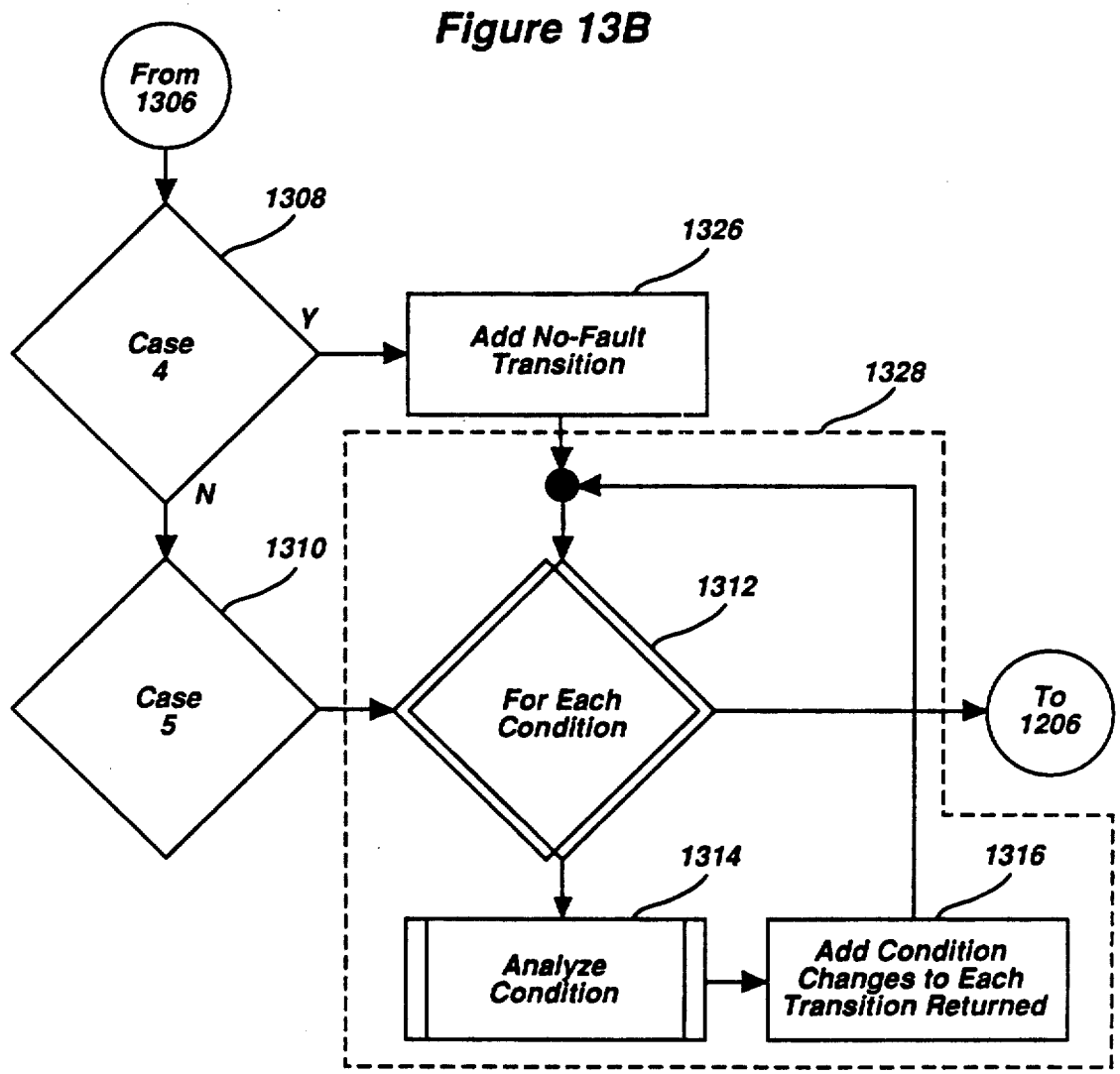
FIG. 13B is a continuation of the subroutine of FIG. 13A.

Referring now to FIGS. 13A and 13B, when the process of subroutine 1222 is invoked, a series of conditional blocks 1302, 1304, 1306, 1308 and 1310 test case type. Case 5 is the normal case, and if not detected by conditional blocks 1302, 1304, 1306, or 1308, program control passes to conditional block 1310. Case 5 is a clause type in which the output condition characteristic is not referenced in the clause. In this case, the output characteristic definition clause states:

OUTPUT condition characteristic: "IF": (a particular set of conditions).

In case 5, these conditions do not include the condition of the characteristic. Normally, given an output characteristic definition:

OUTPUT is good: "IF": (component state is failed in a particular way) "AND": inputs are good.

However, in some cases, because this process is iteratively called to trace the effects of conditions on an output characteristic, and because the conditions may be determined to be logicals and substituted in by the bases in process block 1216 of FIG. 12, the present invention may produce a condition wherein the output characteristic condition which is being analyzed may be substituted in to the left-hand side of the condition statement. This occurs when the BBD components that interrelate, interrelate in a cycle. By substituting conditions, eventually a condition may be substituted on the right-hand side of the output characteristic definition which is the same as the condition being analyzed previously because of the iterative nature of the process. Cases 1 through 4 process those types of clauses in cases wherein, in an iterative cycle, a condition is represented on both sides of the output characteristic definition. Case 5 is the normal case wherein there are no cycles. In other words, special consideration must be given to cycles which are processed in cases 1 through 4, each for a different type of clause.

Referring again to FIGS. 13A through 13B, in consideration of case 5, in which there is no cycle in the interaction, this type of clause is a type wherein the output characteristic definition is defined in terms of input characteristics and component states. In this case, conditional block 1310 is invoked and process control passes to iterative block 1312. Under case 5, iterative block 1312 iterates for each condition in the clause and it calls process block 1314 to analyze each condition in the clause. The function of process block 1314 is to find transitions that contribute to the condition being analyzed, and those transitions returned. Item 1316 changes the transitions returned to a list of changes created by analysis of other clauses that adhere to types 1-4. The changes that are made in item 1316 will be discussed with reference to cases 1-4.

Referring now to case 1, conditional block 1302 detects a clause which states:

<output condition> IF <condition> where <condition> is an output characteristic.

In other words, conditions were substituted such that the process is analyzing the condition which contributed to an output characteristic being true and in the process of analyzing this, the process has come through a complete cycle and through the substitution of bases for logicals, the condition that is being analyzed on the left side of the OCD is also represented on the right side of the OCD. The present invention determines what conditions contributed to output x being bad, and the clause states that the output is bad when the output is bad. This indicates a cycle in which no changes occurred. For example:

x:b IF x:b

This indicates there are no transitions through this clause which can be analyzed to determine if x is bad, and the clause may be deleted from the final local model which is created. In order to drop this clause and make the other clauses complete and correct for the output characteristics, it is necessary to NOT(condition) to any other transitions from other clauses which indicates that this condition, x:b isn't true in the other clauses. This is done in item 1316.

In case 1, the present invention can ignore the clause, and so other clauses being analyzed through the iterative loop 1204, any transitions returned through this analysis must include NOT(condition) for the current output characteristic condition in the transitions. Item 1318 adds NOT condition to a list of condition changes, then the list of transitions currently identified for previously analyzed clauses is updated by item 1320. If there are no changes, item 1320 takes no action. Item 1320 then checks all transitions that were returned prior to this clause and makes the changes to those transitions that were already returned. This is similar to the function of item 1316, with the difference being that it does it to all prior transitions, whereas item 1316 processes new transitions. When complete, all transitions for all clauses will have been updated with new changes.

Case 2 is detected by conditional block 1304. Case 2 is similar to case 1 and is defined by the clause:

output <condition> IF <condition>

AND <other conditions> where <condition> is an output characteristic and <other conditions> contain conditions that does not include the output characteristic.

A clause may have many other conditions. This is also a case wherein no changes occurred and, regardless of the additional conditions, the same result is still produced. In this case, the entire clause is dropped. It is not necessary to analyze the other conditions in the clause because this clause states the condition is true "IF" the condition is true and the other conditions are true. There is no need to determine how all these other conditions happened because it is elementarily known that the clause is true. Therefore, item 1322 ignores the other conditions in the clause and program control passes to item 1318 so that the NOT (condition) can be added to the list of changes to transitions that are applied to other elements.

Referring now to conditional block 1306, when case 3 is detected, the output condition is defined as follows:

OUTPUT <condition> IF NOT <condition>

In this situation, substitutions were made and at the completion of a cycle, the output condition changed from a NOT condition to a condition being true. For example, the output condition may have changed from some variable being bad to some output variable being nil or nonexistent. This result occurs when some action was taken on the part of the components to compensate for other failed components. These are generically termed "nonfault transitions". Recall that the local model which is used as input to define all fault transitions does not define nonfault transitions.

An important aspect of the present invention is that it detects nonfault transitions by denoting a change to some variable or condition because it is known that the change didn't occur because of a fault. By default they are nonfault transitions and they denote a failure recovery. When a nonfault transition is detected, item 1324 adds a nonfault transition to the list of transitions. Therefore, the description of this component is enhanced. In the course of processing components, component descriptions are continuously modified by modifying the output characteristic definition by exchanging bases for logicals and by adding conditions to transitions. In this case, nonfault transitions are added to the transition list. In generating a combined model for a parent component, both an output characteristic definition and a set of transitions are generated. In the present process, output characteristic definitions are continuously modified to encompass all the subcomponents wherein the transitions are also continuously modified.

Case 4 is detected by conditional block 1308 and is defined by the following clause:

OUTPUT <condition> IF NOT (<condition>)

AND <other conditions>

The relationship between cases 2 and 3 is analogous to the relationship between case 1 and case 2 except that in case 4 the other conditions must be analyzed. In other words, a transition contributed to the other conditions which must be true for clause to transition to the new condition. In this case, after statement 1326 process control passes to conditional block 1312 to analyze each condition by calling process block 1314 to analyze each condition iteratively. Because each condition must be analyzed because a change was detected, the process control passes from Item 1326 to the loop 1328 which analyzes each condition.

Figure 14:
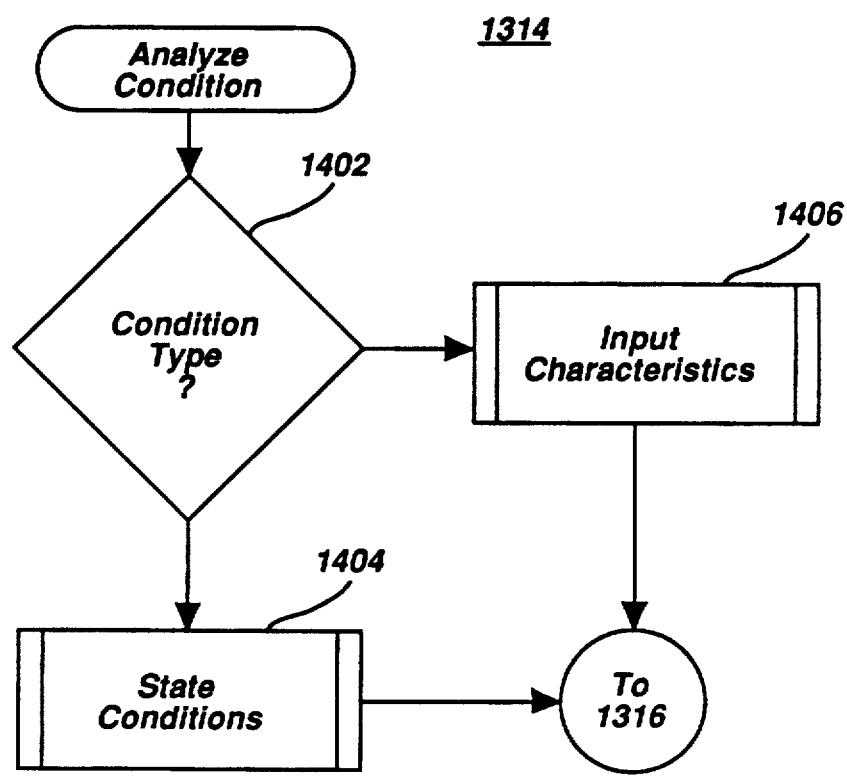
FIG. 14 is a flow diagram detailing the operation of the analyze condition subroutine called by the process of FIG. 13B.

Referring now to FIG. 14, the subroutine 1314 is generally described. When invoked, subroutine 1314 analyses conditions within a clause. Initially, conditional block 1402 determines condition type. There are two general types of conditions, either input conditions or component statements, which are failure statements. If an input condition is detected, then process 1406 is invoked. Process 1406 locates transitions which contribute to a particular input characteristic being analyzed.

If a component statement is detected, then process 1404 returns the transition associated with that component state. The local reliability model which is defined as input by the user. Both 1496 and 1404 return to process 1406.

Figure 15:
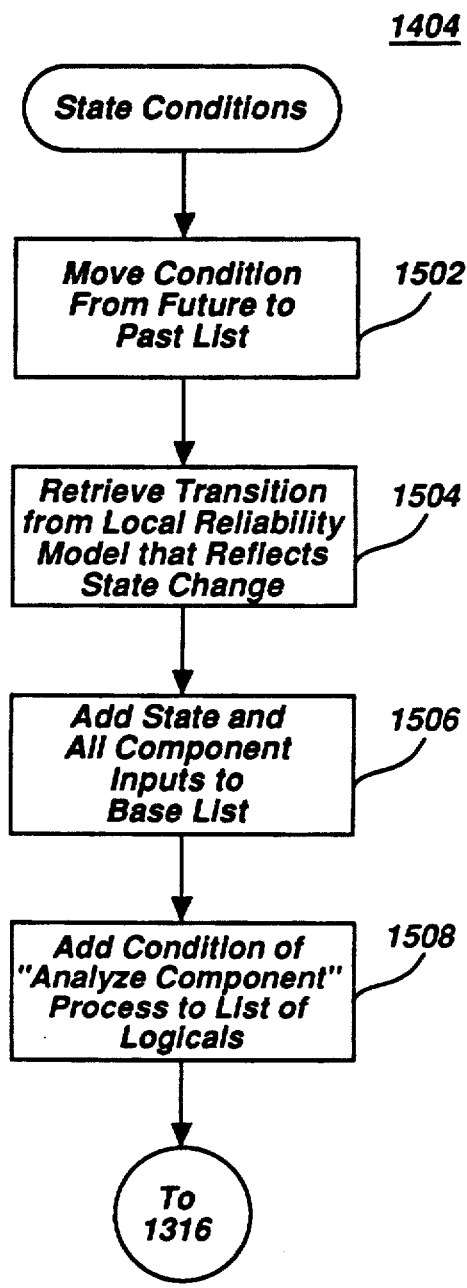
FIG. 15 is a flow diagram detailing the operation of the state conditions subroutine called by the process of FIG. 14.

FIG. 15 shows a process 1404 which is used to define transitions or return a transition that reflects the state condition to normal which would normally be a failure state. When invoked, item 1502 moves the condition being analyzed from the future condition list to the past condition list, so that if this condition is ever analyzed in another clause it will not be necessary to go through the procedure again. Typically, conditions are moved from the past to the present list, the future to present list and then after being analyzed from the present to past list. In this case, because the type of "component state" is a relatively short process, the present process moves directly from the future list. The condition lists may be considered as global lists wherein any particular module or component has access to them.

Item 1504 then retrieves the transition for this state from the local reliability model which reflects the state change. This state is represented as a variable in the output characteristic definition and that variable is added to the base list by item 1506. The transition processed by item 1504 takes the following form:

IF x <not failed>(wherein x is the component name) then transition to x: <new state>

There may be several states. A "not failed" state is indicative of an unfailed component. In addition, the user may define a name for a failure state to indicate each failure mode associated with the component. One common state is "BAD", which states that a component failed in such a way that all its outputs are corrupted or bad. Another common state is a "NO-OP" which states that a component failed in such a way that it doesn't work and outputs nothing. Hereinafter component states are specified in all capital letters.

Often a component will have more than one failure mode. For example, for a particular component, it continues outputting, but it is outputting corrupted data and in another state, it ceases outputting altogether. Whether a component outputs corrupted data when failed depends on the device. For example, in some cases, a communications node may not respond only to inputs and in other cases, a communication node may respond only to inputs but doesn't provide correct information at the output. The effects of these two different failures are quite different in the system or can be different in the system.

Item 1506 is invoked to add the component state variable to the base list. This state condition must be included in the base of conditions. Also, all input conditions for this component may be added to the list of bases. Further, the output characteristic condition may be placed on the logical list by item 1508 since it may be represented equivalently by the component state and input conditions on the base list. In other words, the output characteristic condition may be replaced by a logical equivalent of other base conditions.

The preferred form of describing a condition is as a logical relationship of other conditions to reduce the number of variables that are produced in the final output characteristic definition and transitions. Therefore, wherever possible it is desirable to replace variables by their logical equivalents. In some cases, such as failure states, this is not possible and these are represented explicitly.

Figure 16:
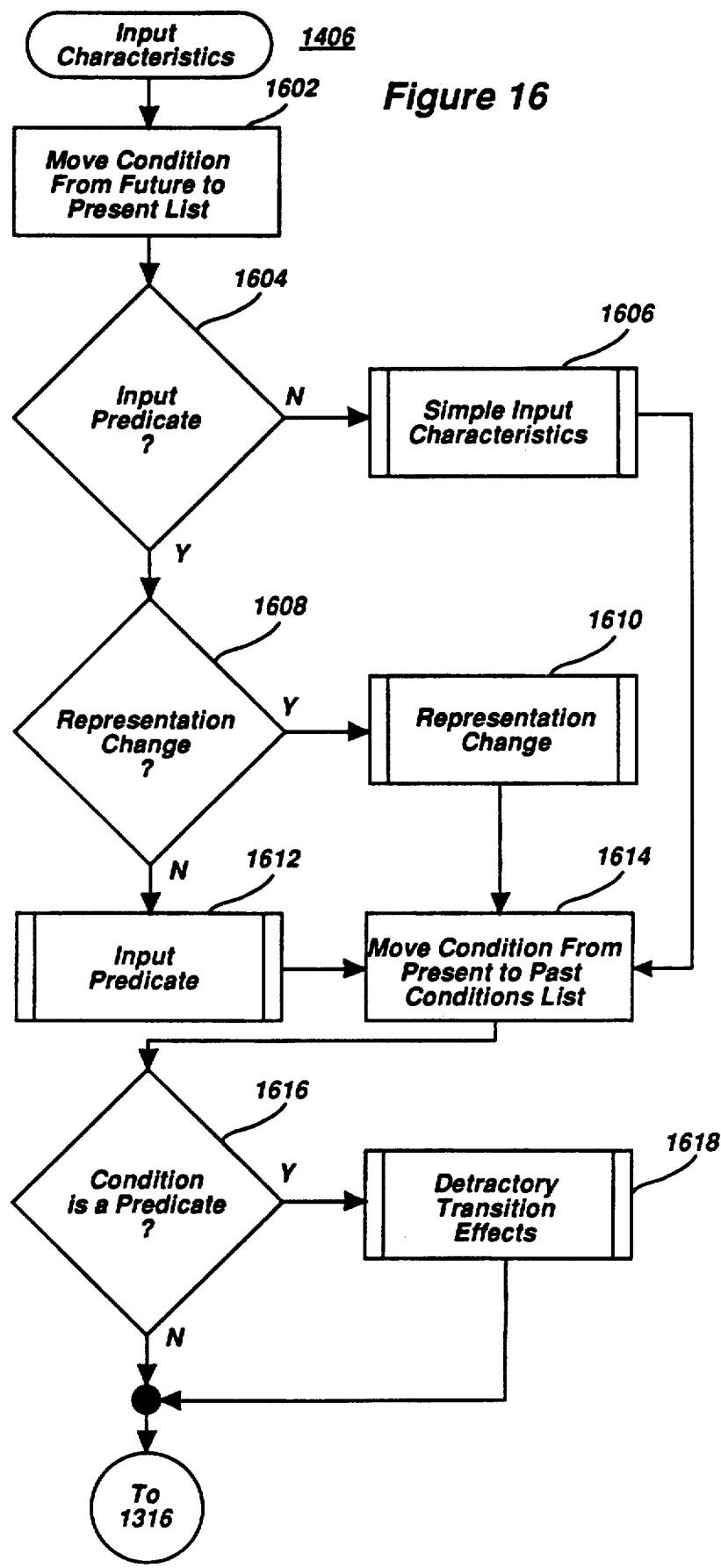
FIG. 16 is a flow diagram detailing the operation of the input characteristics subroutine called by the process of FIG. 14.

The input characteristic process 1406 is described generally in conjunction with FIG. 16. Item 1602 moves the condition from the future condition list to the present condition list being analyzed. There may be other conditions that are analyzed which affect the present condition so this condition may not finish analysis until other conditions do.

Process control then passes to conditional block 1604, which checks the condition to see if the condition is an input predicate or if it's a simple input characteristic.

Before defining the algorithm detailed in FIGS. 16, 17 and 18, an overview is presented in the paragraphs immediately below.

For some components, defining an OCD in terms of simple Boolean relationships among input characteristics is not sufficient. This is especially true when inputs are redundant and the effects of single and multiple redundant component failure modes on other components are analyzed. It is therefore necessary to allow input characteristics to be defined by predicates. For example, define a VOTER as a component that outputs the majority value of the inputs it receives from redundant components. In specifying the OCD for the voter's corrupted output as a function of its corrupted inputs, one might define the "number" of inputs that are corrupted (i.e., #x(i):b for all x(i) inputs to the voter). By allowing this specification, the output definitions for components may contain conditions of input predicates. In the case of a voter, the OCD may be:

OUTPUT y:b if #x(i):b > #x(i):g

This states that the voter's output, y, is corrupted if the number of corrupted inputs exceeds the number of noncorrupted inputs. In the absence of the # predicate, an equivalent specification must be defined as:

OUTPUT y:b IF x1:b and x2:b

OR x1:b and x3:b

OR x2:b and x3:b

OR x1:b and x2:b and x3:b for a voter component with three inputs. Thus, being able to specify input predicates is beneficial. Further, the final aggregated model benefits from specifying the state space elements in terms of predicates. ASSIST contains a rich set of primitives for specifying state space elements and transitions that change those elements. For example, the "#" predicate may be represented as a single state space integer whose range is from zero to three. The ASSIST syntax for this is:

X:[0 ... 3] /* state space */
DEATH IF X < 2. /* specification of
unreliable states */ where x represents the number of inputs that are corrupted. The Death statement represents the state of the system in which the output of the voter is corrupted. Contrast this with the ASSIST model:

STATE=X1[0..1], X2[0..1], X3[0..1]

DEATH IF (X1=1 AND X2=1)

OR (X1=1 AND X3=1)

OR (X2=1 AND X3=1)

OR (X1=1 AND X2=1 AND X3=1)

where X1, X2, and X3 represent whether or not input 1, 2 or 3, respectively, is corrupted.

In order to specify input predicates, RMAS requires guidance in finding transitions that contribute to predicates. Therefore, internal to RMAS are a set of templates, each template indicating how a predicate should be analyzed and represented in the aggregate model. For example, the model of the # predicate might consist of:

MODEL: #(<cond>)
COI: <cond>
Change rep: no change necessary:
Contributory transitions:
replace IF (<cond>)
with IF #(<cond>) > 0
replace TRANTO <cond>
with TRANTO #(<cond>)=#(<cond>) + 1
Detractory transitions:
replace <cond> with #(<cond>)=#(<cond>) - 1
ASSIST CONVERSION: #(<cond>):integer The template first specifies the condition of interest (COI). The COI is a simple input characteristic that is to be traced to find transitions that contribute to the predicate. The COI for #(X(i):b) is X(i):b—find transitions that contribute to a particular input to the voter being corrupted. The contributory transitions field indicates the changes that are to be made to the transitions found for the COI to reflect changes to the predicate. Here, the transition:

IF X(i):B TRANTO is changed to:

IF #(X(i):B)>0 TRANTO

Similarly, the transition:

IF ...tranto x(i):b is changed to:

IF ...TRANTO #(x(i):b)=#(x(i):b)−>1;

A similar change is defined for detractory transitions. The definition and use of detractory transitions is described in conjunction with FIGS. 22B1 and 22B2

The template also defines the ASSIST representation of the function to be used to encode the aggregate system model into ASSIST primitives. For the "#" predicate, the template defines a state space element whose name is indicative of the condition and the function and whose type is integer. Further specification may be added to define the bounds on the integer.

Finally, the change rep{representation} field indicates that a predicate cannot explicitly be represented in ASSIST syntax and, therefore, a representation in ASSIST using a different predicate must be substituted. ASSIST allows integer state vector variables and, therefore, the predicate # can directly be represented in ASSIST using an integer variable as shown above. However, in representing the predicate, ALL, for example, an analyst would encode in ASSIST using an integer variable also by comparing the number to the total number of elements possible (i.e., ALL(X-(i):b)=#(X(i):b)=N where N is the number of X(i)). The template for ALL therefore includes a "change rep" field that refers to the "#" predicate:

```
MODEL ALL(<cond>)
COI: <cond>
Change rep: #(<cond>)=?get max(obj)
from BBD where obj is component (or
component of data) in <cond>
Contributory transitions:
    replace IF (<cond>)
    with IF #(<cond>) = Max(obj)
    replace TRANTO <cond>
    with TRANTO#(<cond>)=#(<cond>)+ 1
Detractory transitions:
    replace <cond>
    with #(<cond>)=#(<cond>) − 1
ASSIST CONVERSION: #(<cond>) :
    [0..max(obj)]
```

Recall that transitions and the OCD returned from analysis of an input condition are aggregated with the current OCD from the inputting component. Two options were described for this aggregation, with the preferred option (option 1) replacing the input characteristic in the aggregated model with an equivalent definition from the OCD of the outputting component. However, if the input characteristic is a COI for a predicate, it must not be eliminated from the model. Instead, the reference to the input characteristic is replaced by the changes as specified by the contributory and detractory transitions fields, and must not be eliminated. Therefore, option 2 must be used to combine models in order to preserve the COI variable until it is replaced by the appropriate representation.

Referring now to FIG. 16, if an input predicate is not detected, then conditional block 1604 invokes process 1606, designated "simple input characteristics", which analyzes the condition to find the transitions which contribute to that condition. If an input predicate is detected, control passes to conditional block 1608 which determines if there is a representation change in the final model.

Item 1610 is selected to analyze the predicate to look up a model defined for that predicate to determine how that predicate will be represented in the final reliability model.

Process 1612 is selected in situations where the input predicate is already in the correct syntax and it is not necessary to refer to the knowledge base to convert the input predicate to the proper syntax. Process control then passes to item 1614, which moves the condition from the present list to the past conditions list as the conditions have been analyzed. Process control then passes to conditional block 1616, which checks to determine whether the condition just analyzed is an input predicate. If it's a predicate, then process control block 1618 is invoked to examine the lists of transitions already defined and define transitions that may need to be changed to reflect changes to currently defined transitions that reflect a detraction of previously defined predicates. Also, previously defined transitions are changed to reflect detractions of currently defined predicates. These changes are discussed further with respect to FIG. 22a.

Figures 17, 18:
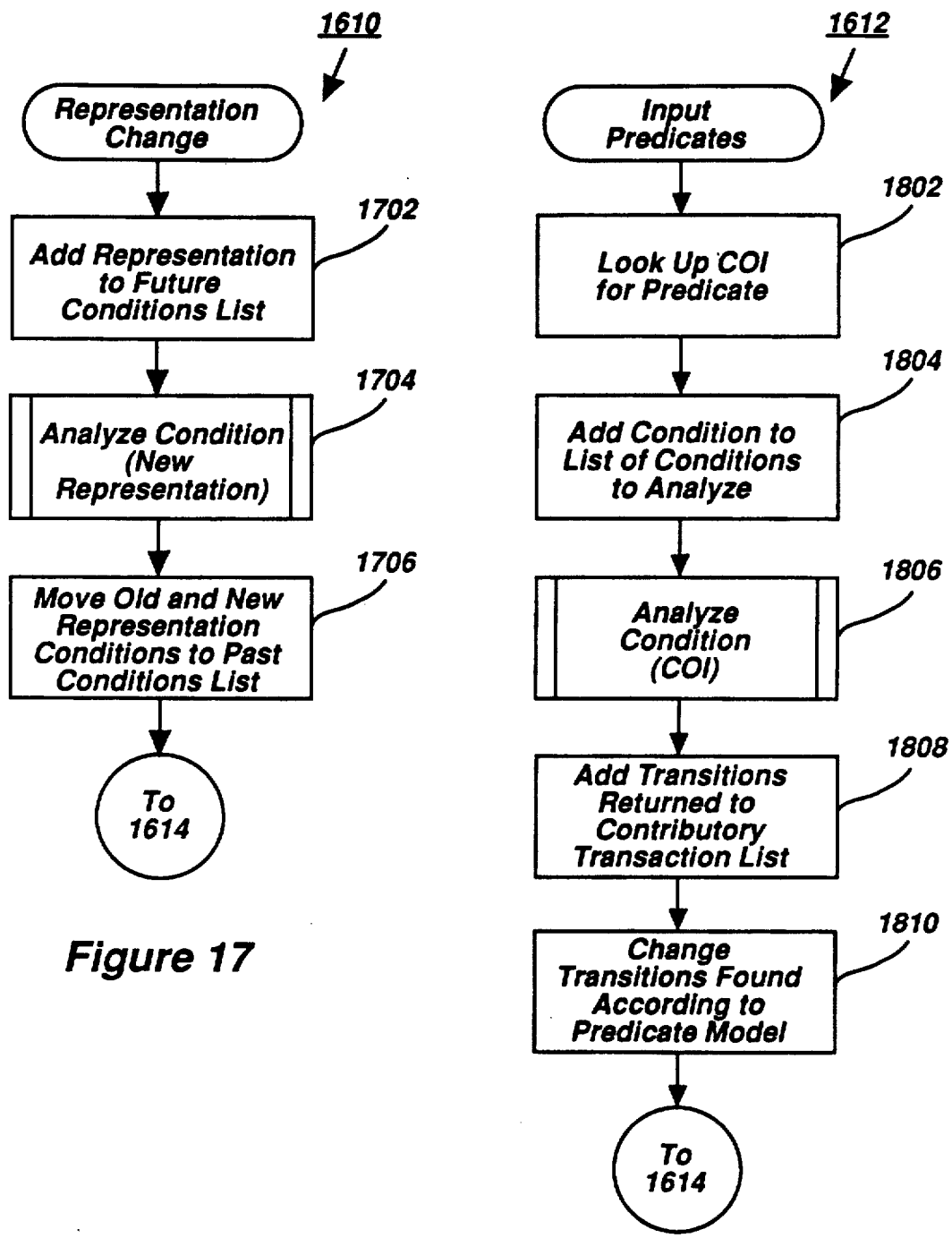
FIG. 17 is a flow diagram detailing the operation of the representation change subroutine called by the process of FIG. 16.
FIG. 18 is a flow diagram detailing the operation of the input predicates subroutine called by the process of FIG. 16.

The process of FIG. 16 invokes process 1610, designated representation change, which is shown in detail in conjunction with FIG. 17. The representation change process 1610 begins with item 1702. For an input predicate, item 1702 looks up an internal model for that predicate, determines the new equivalent representation for that predicate and adds this new representation to the list of conditions to be analyzed on the future conditions list. Analyze condition process 1704 is then invoked to analyze the new representation. Process 1704 is equivalent to process 1314. Once complete, program control passes to Item 1706 which moves both the old and the new representation conditions to the past conditions list because if some other clause references that old representation, the process refers to the past condition list to indicate that processing this condition has already been done. It is not necessary to modify anything previously analyzed. Process control then returns to item 1614.

The process 1612, designated input predicate, is shown in detail in conjunction with FIG. 18. Process 1612 begins with Item 1802. Item 1802 looks up in the internal representation for an input predicate, the condition of interest (COI) for that predicate. The condition of interest, as discussed in the overview of FIGS. 16, 17 and 18, is a simple input predicate equivalent that is analyzed to find transitions that contribute to that simple input predicate and that simple input predicate is passed to Item 1804 which adds that simple predicate condition or Boolean combination of input predicate conditions to a list of conditions to analyze.

For example, the input predicate may be the number of x:(i) equal to the number of x:(i) that are good. The model then states that in order to find the transitions that contribute to the number of the condition, the conditions are retrieved which contribute to the condition and any transitions that were returned are changed to make up changes to the whole predicate. Therefore, the input predicate has a model which was referred to previously, including the condition of interest. That condition of interest is added to the list of conditions analyzed in 1804, and then process control block 1806 is invoked to analyze that condition. Process 1806 is equivalent to process 1314. Once analysis of that condition has returned the internal model for the input predicate, process control passes to item 1808 to add transitions to the contributory transition list (CTL). Once those conditions are returned, the transitions are changed according to the predicate model and item 1810 is invoked to change those transitions returned to reflect changes to the predicate if necessary.

Figure 19:
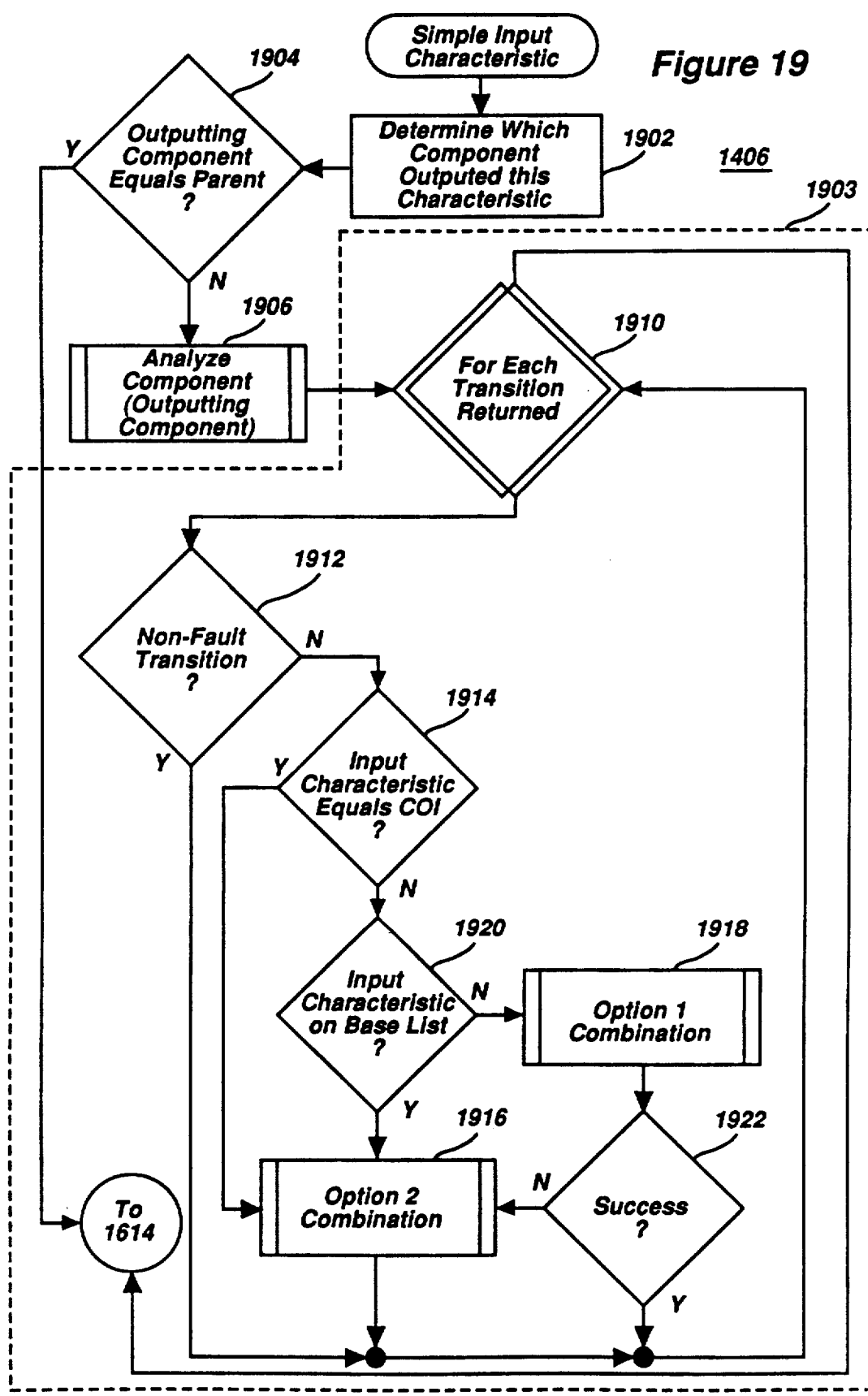
FIG. 19 is a flow diagram detailing the operation of the simple input predicate subroutine called by the process of FIG. 16.

FIG. 16 refers to process 1606 designated "simple input characteristic" and this process is described in more detail in conjunction with FIG. 19. FIG. 19 begins with item 1902, which examines the input characteristic and locates the component that outputted the characteristic. In order to analyze the conditions which contribute to the input characteristic, the component must be located which outputted the characteristic to determine what changes occurred in that component or other components that contributed to an output being bad (which became the input characteristic. Once the component is located, process control passes to conditional block 1904. Conditional block 1904 examines a component to determine whether the component that outputted the characteristic is a parent component.

Recall that the function of an RMAS module is to define for a parent component a reliability model which is the combination of its subcomponent's models. The process begins at the output of the parent and continues by tracing through the subcomponents until returning to the input of the parent. At this stage the process returns to the input of the parent and so the final model for the parent is an output characteristic definition based upon subcomponent states and input to the parent. This comprises the end of processing for this module.

If processing for a particular module is complete, process control returns to item 1614 to move conditions from the present to the past conditions list. If not at the parent component level, further analysis must be done and control passes to process 1906 which recursively calls the same subroutine as process 918. In the present process, the outputting component is analyzed and within that component, subcomponents are analyzed, and when the inputs to the subcomponents are reached, if the component is not a parent component input then the present procedure is invoked recursively to analyze the next component. In other words, there is an analyzed component and within this component there may be a subprocedure analyzing a condition. For each such condition of the OCD, analyze component subroutine 1904 is called to analyze the component for this output condition. This process repeats until the input of the parent component is reached. Once process 1906 is complete, control passes to conditional block 1910. Once analyze component process 1906 is complete, program control enters loop 1908.

When loop 1908 is entered iterative block 1910 examines each transition that is returned, or iterates for each transition returned. If necessary, if certain attributes of the transition exist, the transition is changed as follows. If the transition returned is a nonfault transition, indicated by conditional block 1912, then no changes need to be made to the transition. If no changes are made, the process iterates for the next transition according to conditional block 1910.

If a fault transition is detected in conditional block 1912, then the characteristic for the model returned by process control block 1906 is combined with the existing OCD for the partial outputs in one of two ways (recall that the initial OCD is always the parent's output characteristic definition as defined in 1006). The parent's output characteristic definition is initialized to the output characteristic definition or OCD of the subcomponent that finally outputted the characteristic. Thus, the OCD returned from analyzing an input characteristic is combined with this OCD). The first option is executed in process control block 1916 and the second option is executed through process control block 1918. Option 1 replaces the input characteristic definition from the existing parent model with the OCD returned from 1906.

This is the preferred model because the number of state space variables is reduced. In other conditions, such as when the input characteristic is a condition of interest as checked in conditional block 1914, this condition must be retained for further processing. "Condition of interest" means that the variable is a variable currently being used for analyzing an input predicate wherein a transition may be altered through the input predicate process discussed in FIG. 18, because this condition of interest cannot be discarded. If transitions are found for this variable, the reference to the variable is replaced in the transition by the predicate to which it refers according to the predicate model. Under this condition, the input variable cannot be discarded. In this state, process control block 1916 is invoked.

Another situation where process 1918 is not required is when the input characteristic is on the base list as checked by conditional block 1920. Here, it is not desirable to eliminate the input characteristic. In this option, process control block 1916 is invoked to combine the two output characteristic definitions, by changing the transitions returned rather than the OCD. Processes 1916 and 1918 will be further discussed below. When process control block 1918 is invoked and through its processing the models were not successfully combined, then decision block invokes process block 1916 to combine the models. Regardless of which option is chosen, the output characteristic definition for the current input characteristic is combined into a single output characteristic definition before returning to block 1614.

Figure 20:
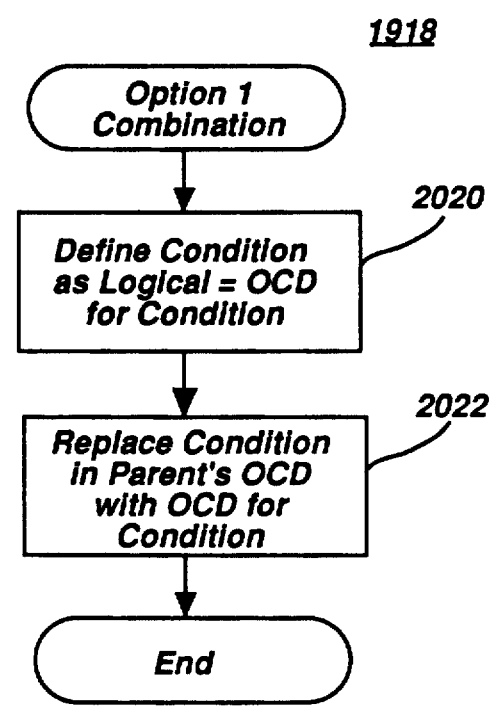
FIG. 20 is a flow diagram detailing the operation of the option 1 combination subroutine called by the process of FIG. 19.

In FIG. 19, process "option one combination", block 1918 is invoked and this process is discussed in more detail in conjunction with FIG. 20. When invoked in process 1918, item 2020 defines the condition as a logical equal to the output characteristic definition for the condition for the component analyzed in process 1906. Process control then passes to item 2022, which replaces the reference to that condition in the parent's output characteristic definition for the output characteristic for that condition.

The "option two combination" process 1916 is described in more detail in conjunction with FIG. 21. Process 1916 begins with iterative block 2101, which iterates for all transitions returned from OCD in 1906. When all transitions have been analyzed, control passes to 1614. Otherwise, control passes to conditional block 2102, which examines the subcomponent's output characteristic definition format returned from 1906 as it exists. If it is of the form:

OUTPUT P IF A AND b then conditional block 2104 is selected.
Otherwise, if its output condition is of the form:

output condition: P: "IF" A OR B then conditional block 2112 is selected.

P is a generic output condition in both of the above statements.

When invoked, conditional block 2104 determines if the transition format is:

IF q TRANTO A and r where A is referenced in the subcomponent OCD and "r" may be any other conditions. Then the transition changes according to item 2106.

Therefore, not only is transitioning to A defined but also transitioning to output characteristic P which is also:

IF q TRANTO A and r
IF B TRANTO P
endif.

Process control then returns to conditional block 2101.

The rationale for this is that before the transition, the transition A was true, but the process transitioned to NOT A, and if before this transition A and B were true, then P would have also been true. But after this transition P is also not true. Process control then returns to block 1614.

Condition block 2108 checks for the transition format:

IF q transition to NOT(A) and r;

if detected, the following substitution is made in item 2110:

IF q transition to NOT(A) and r
IF B TRANTO NOT(P)
endif;

The rationale for this is that before the transition, the transition A was true, but the process transitioned to NOT A, and if before this transition A and B were true, then P would have also been true. But after this transition P is also not true. Process control then returns to conditional block 2101.

If the subcomponent's OCD is of the form:

OUTPUT P IF A or B.

then selected conditional block 2112 examines all transitions of the format:

IF q transition to A AND r.

Which is identical to the test provided by conditional block 2104, wherein one is analyzed within:

OUTPUT P IF A OR B and one is analyzed within:

OUTPUT P IF A AND B

Under this situation when transitioning to A, the program adds to the nested transition:

IF q TRANTO to A AND r.
IF NOT B TRANTO to P
ENDIF;

The rationale for this is that when the OR condition (A OR B) wasn't true and it becomes true, then P also becomes true.

If conditional block 2112 determines that condition was satisfied, then item 2114 is selected to change the transition and return for all transitions of that format. If the testing in conditional block 2112 is not passed, then conditional block 2116 is selected which iterates for all transitions of the form:

IF q TRANTO NOT(A) and r

For this type of transition, a nested transition is substituted by item 2118 which states:

IF q TRANTO NOT(A) and r
IF NOT(R) TRANTO NOT (P)
ENDIF;

In FIG. 16, process 1618, labeled detractory transition effects, was invoked by conditional block 1616. The detractory transition effects process 1618 is described in more detail in conjunction with FIGS. 22B1 and 22B2. This process is invoked after an input characteristic has been analyzed to determine whether it is a simple characteristic or a predicate. For those transitions that were found which contributed to that predicate, all previous transitions must be analyzed to determine whether they detract from that predicate condition.

The rationale behind this process is as follows. A given transition may also detract from the presence of other conditions, and this effect must be reflected in the transition also. For simple conditions such as simple input characteristics that are modeled as bases and for component states, no changes are necessary.

For example:

IF P_NOF TRANTO P_BAD is a contributory transition for PBAD, but it is also a detractory transition for PNOF. Since it is implicitely assumed that a component can not be in more than one state simultaneously, there is no need to change the transition to:

IF P_NOF TRANTO P_BAD, NOT (P_NOF)
BY P_BADRT

The same holds true for simple input conditions that are modeled as bases:

IF x:(g) TRANTO x:(b)

When a variable x has a characteristic "b", it is not "g". But for predicates (#(<cond>), for example), the detraction is not identified:

For example:

IF PNOF TRANTO PBAD, #(x:(b)) = #(x:(b)) + 1 BY

When #(x:(b)) increases by 1, #(x:(g)) decreases by 1. To reflect this change:

IF PNOF TRANTO PBAD, #(x:(b)) = #(x:(b)) + 1
(x:(g)) = #(x:(g)) − 1 BY

To accomplish this, a procedure, FIND DETRACTORY TRANSITION, is called for each condition. The procedure determines if any previously defined transitions detract from the current condition (if the current condition is a predicate) and if any currently defined transitions detract from previously defined predicate conditions.

Returning to FIG. 22A, when invoked, conditional block 2204 iterates for all new predicate bases. Conditional block 2202 examines previous transitions that were defined to determine whether any of those transitions detracted from that predicate. Decision block 2206 then reviews the condition of interest (COI) for the predicate to determine if it is the base and if so the logical for that condition is examined by item 2208. Otherwise, the COI is examined by item 2210. In other words, decision block 1206 determines whether the condition of interest is a base. If not, then item 2208 recalls the base equivalent for the logical. If it is a base, then a search is conducted on that COI according to item 2210.

Once determining what base is being searched for in the previously defined transitions (called by the search key), conditional block 1214 examines the condition part of the transition and searches for the key for the conditional portion of the transition determines if the key is violated in the consequent part of the transition. If so, a detractory transition has been located for that key. Therefore, item 2216 adds to the transition according to the detractory rule of the predicate. The detractory rule of the predicate depends on the predefined model currently being used for the predicate. The models for predicates was discussed previously. Process control then returns to 2204.

The nested loop 2201 iterates for all new predicate bases and and within it is a nested loop 2203 which iterates for all previously defined transitions accordingly to conditional block 2204. After loop 2201 ends, control passes to loop 2218, which iterates for all new transitions according to conditional block 2220. For all new transitions a nested loop 2222 iterates for all previously defined predicate bases accordingly to conditional loop 2224. Therefore, for all previously defined bases for each new transition, the following process is performed. Conditional block 2226 determines whether the condition of interest a base (which is similar to the function of conditional block 2206) and if it is not a base, then the logical equivalent is substituted in by item 2228. If it is a base, then the search key, according to item 2230 is the COI itself.

The search itself is checked according to conditional block 2232 which checks to determine if the key is in the condition portion of the transition and is violated in the consequent part of the transition. If so, then the transition is modified according to item 2234, which states that the transition is added to according to the detractory rules of the predicate base. That is, the predicate base is iterated according to block 2224 and if the test in conditional block 2232 is negative then control passes to conditional block 2224 to get the next predicate base.

In summary, up to this point, what is defined is what is necessary to aggregate a set of subcomponents models into a single model per parent. This is sufficient to analyze an entire system that is two levels deep. One level for the parent and the second level for subcomponents. However, the BBD and SYSD are a hierarchy of many levels. In FIG. 11, analyze component process control block 918, because of the hierarchy, when particular component is analyzed, a slightly different operation is performed if the component is not a lowest level component, or if the subcomponents are not identified at its lowest level. Process control block 1106 processes components defined on the intermediate level.

Figure 23:
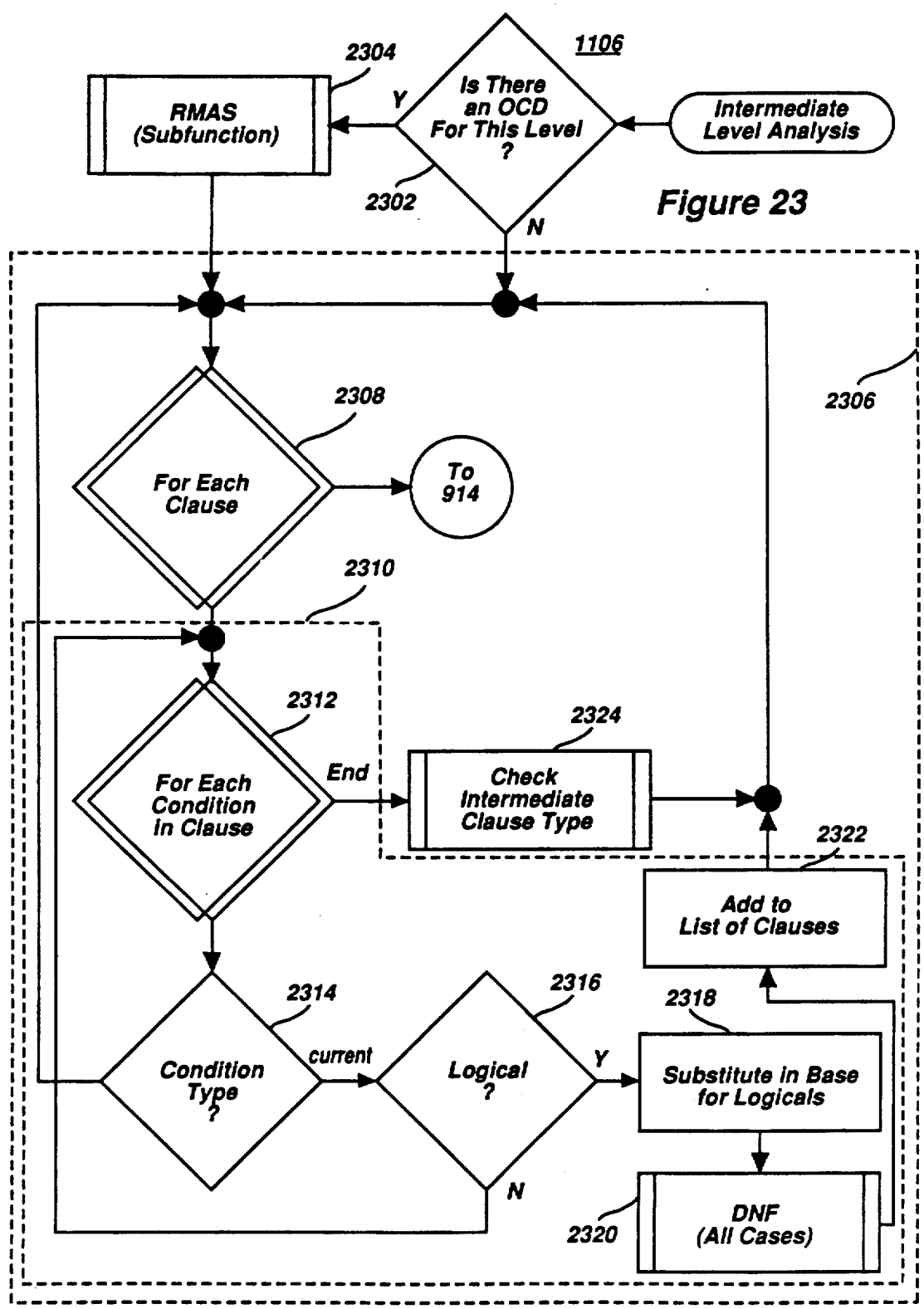
FIG. 23 is a flow diagram detailing the operation of the intermediate level analysis subroutine called by the process of FIG. 11.

Process control block 1106 of FIG. 11 is shown in greater detail in FIG. 23. FIG. 23 which begins with conditional block 2302. Conditional block 2302 determines if an intermediate level model has been analyzed previously. If so, the reliability model for the intermediate level exists it is passed to loop 2306 which begins with conditional block 2308. If an intermediate level model does not yet exist for this intermediate level component, control passes to process 2304 to invoke the highest level RMAS model for that subcomponent which is described in conjunction with FIG. 9. This is the highest level iterative structure of the RMAS tool.

Once that model is determined, it is passed to iterative loop 2306, which iterates for each clause in the output characteristic definition according to iterative block 2308. For each clause, control passes to conditional loop 2310, which iterates for each condition in the clause according to iterative block 2312. For each condition, the condition type is checked by conditional block 2314 to determine whether it is a current condition. If so, then that entire clause need not be analyzed and the next clause is analyzed, according to conditional block 2308. If it is not a current condition, according to conditional block 2314, then control passes to conditional block 2316, which determines if the condition is a logical or a base. If it is a logical, control passes to item 2318, which substitutes the base equivalent for the logical and control passes to process control block 2320 which reorders the single clause into one or more clauses according to DNF form. These clauses are then added to list of clauses by item 2322 and control passes back to the conditional block 2308 to iterate those new clauses and the rest of the clauses. If it wasn't a logical condition according to control block 2316, control passes to conditional block 2312 which reiterates for the next condition.

After all conditions have been analyzed according to iterative block 2312, control passes to process block 2324, which invokes the check intermediate clause type subroutine. This is within the loop 2306 for each clause that passes the test. In other words, block 2324 is executed for all clauses that don't include a current condition.

Figure 24A:
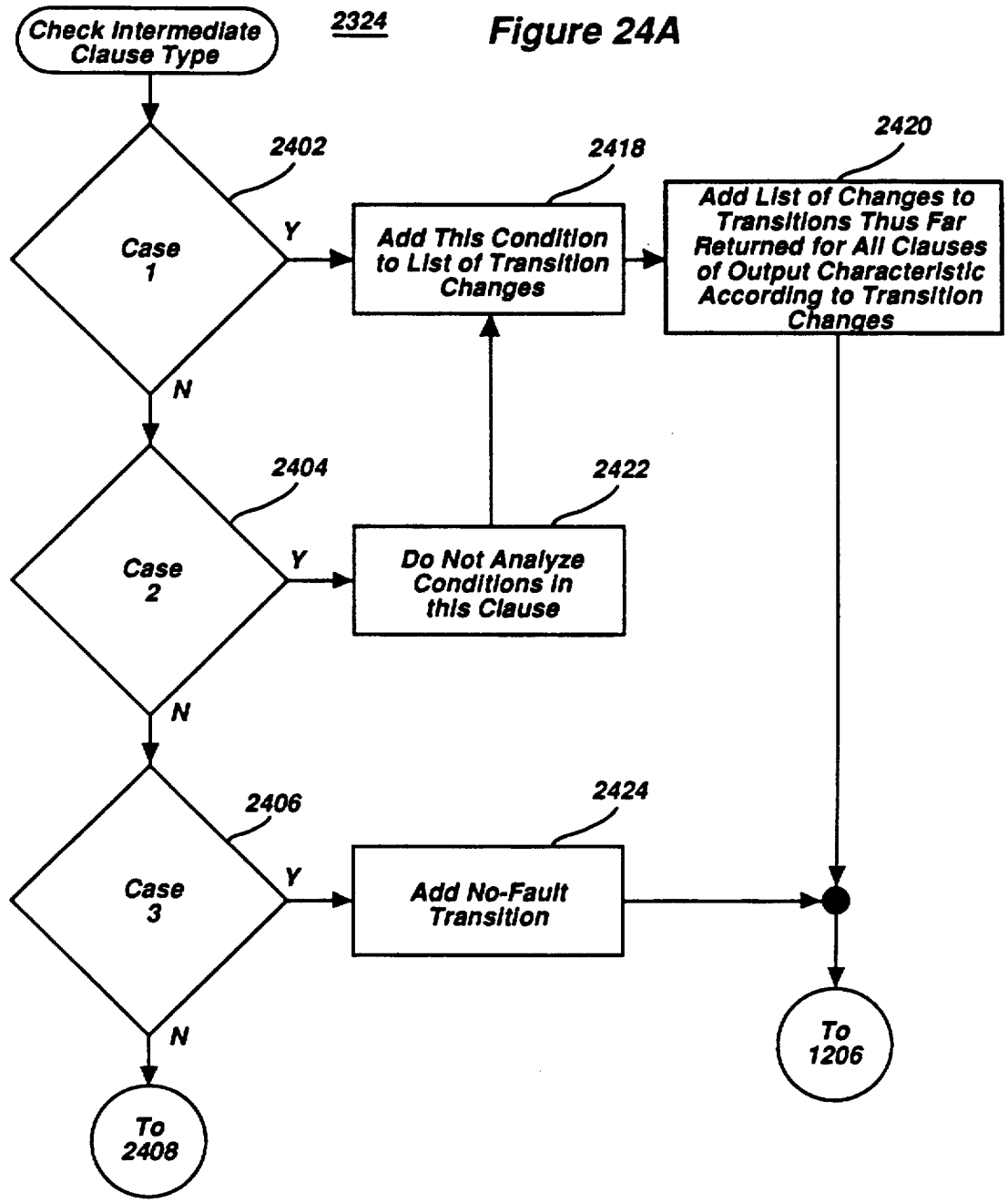
FIG. 24A is a flow diagram detailing the operation of the check intermediate clause type subroutine called by the process of FIG. 23.
Figure 24B:
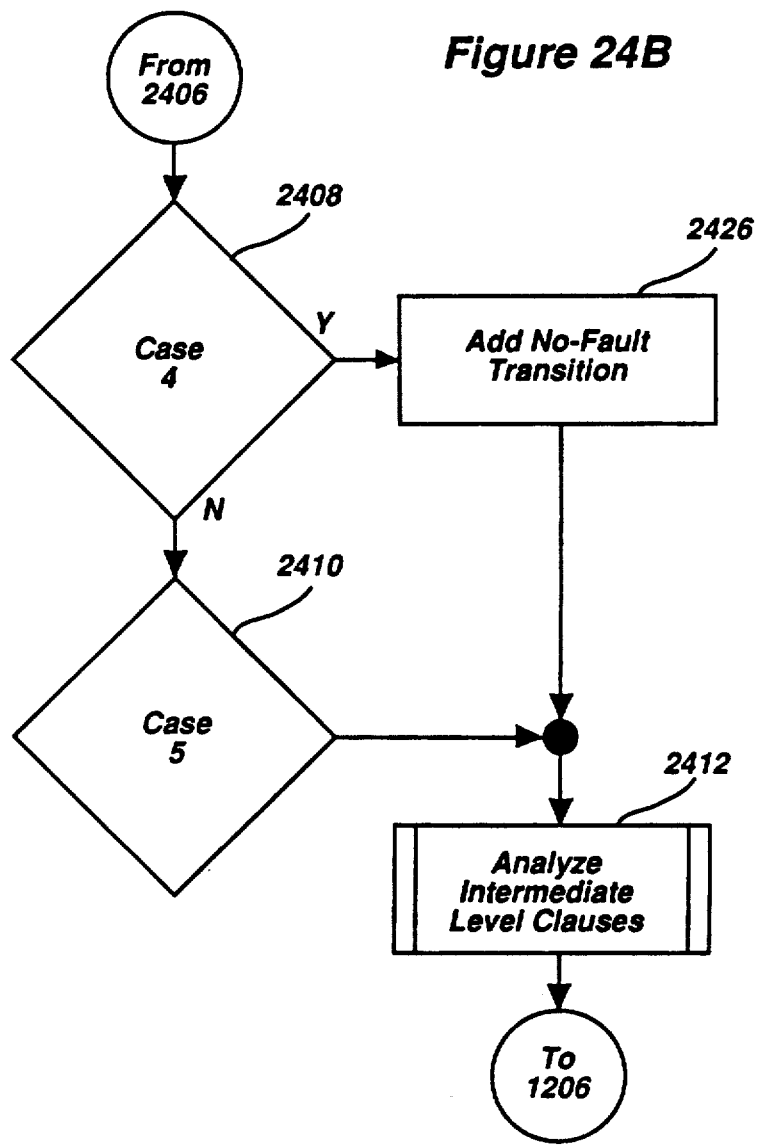
FIG. 24B is a continuation of the subroutine of FIG. 24A.

Referring now to FIGS. 24A and 24B, the check intermediate level clause type process is shown in detail. In case 5, in which there is no cycle in the interaction, this type of clause is a type wherein the output characteristic definition is defined in terms of input characteristics and component states. In that case, process block 2412 is invoked.

Referring now to case 1 conditional block 2402 detects a clause which states:

<output condition> IF <condition> where <condition> is an output characteristic.

In other words, conditions were substituted such that the process is analyzing the condition which contributed to an output characteristic being true and in the process of analyzing this, the process has come through a complete cycle and through the substitution of bases in for logicals, the condition that is being analyzed on the left side of the OCD is also represented on the right side of the OCD. The present invention determines what conditions contributed to output x being bad, and the clause states that the output is bad when the output is bad. This indicates a cycle in which no changes occurred. For example:

x:b IF x:b

This indicates there are no transitions through this clause which can be analyzed to determine if x is bad, and the clause may be deleted from the final local model which is created. In order to drop this clause and make the other clauses complete and correct for the output characteristics, it is necessary to NOT(condition) to any other transitions from other clauses which indicates that this condition, x:b isn't true in the other clauses. This is done in item 2416.

In case 1, the present invention can ignore the clause, and so for other clauses being analyzed through the iterative loop 2404, any transitions returned through this analysis must include NOT(condition) for the current output characteristic condition in the transitions. Item 2418 adds NOT condition to a list of condition changes, then the list of transitions currently identified for previously analyzed clauses is updated by item 2420. If there are no changes, item 2420 takes no action. Item 2420, then, checks all transitions that were returned prior to this clause and makes the changes to those transitions that were already returned. This is similar to the function of item 2416 with the difference being that it does it to all prior transitions whereas item 2416 processes new transitions. When complete, all transitions for all clauses will be updated with new changes.

Case 2 is detected by conditional block 2404. Case 2 is similar to case 1 and is defined by the clause:

output <condition> IF <condition>

AND <other conditions> where <condition> is an output characteristic and <other conditions> contain conditions that does not include the output characteristic.

A clause may have many other conditions. This is also a case wherein no changes occurred and, regardless of the additional conditions, the same result is still produced. In this case, the entire clause is dropped. It is not necessary to analyze the other conditions in the clause because this clause states the condition is true "IF" the condition is true and the other conditions are true. There is no need to determine how all these other conditions happened because it is elementarily known that the clause is true. Therefore, item 2422 ignores the other conditions in the clause and program control passes to item 2418 so that the NOT (condition) can be added to the list of changes to transitions that are applied to other elements.

Referring now to conditional block 2406, when case 3 is detected, the output condition is defined as follows:

OUTPUT <condition> IF NOT <condition>

In this situation, substitutions were made and at the completion of a cycle, the output condition changed from a NOT condition to a condition being true. For example, the output condition may have changed from some variable being bad to some output variable being nil or nonexistent. This result occurs when some action was taken on the part of the components to compensate for other failed components. These are generically termed "nonfault transitions". Recall that the local model which is used as input to define all fault transitions does not define nonfault transitions.

An important aspect of the present invention is that it detects nonfault transitions by denoting a change to some variable or condition because it is known that that change didn't occur because of a fault. So, by default they are nonfault transitions and they denote a failure recovery. When a nonfault transition is detected, item 2424 adds a nonfault transition to the list of transitions. Therefore, the description of this component is enhanced. In the course of processing components, component descriptions are continuously modified by modifying the output characteristic definition by exchanging bases for logicals and by adding conditions to transitions. In this case, nonfault transitions are added to the transition list. In generating a combined model for a parent component, both an output characteristic definition and a set of transitions are generated. In the present process, output characteristic definitions are continuously modified to encompass all the subcomponents wherein the transitions are also continuously modified.

Case 4 is detected by conditional block 2408 and is defined by the following clause:

OUTPUT <condition> IF NOT (<condition>)

AND <other conditions>

The relationship between case 2 and 3 is analogous to the relationship between case 1 and case 2 except that in case 4 the other conditions must be analyzed. In other words, a transition contributed to the other conditions which must be true for the clause to transition to the new condition. In this case, after statement 2426 process control passes to conditional block 2412 to analyze each condition by calling process block 2414 to analyze each condition iteratively. Because each condition must be analyzed and because a change was detected, the process control passes from Item 2426 to process block 2412.

Figure 25:
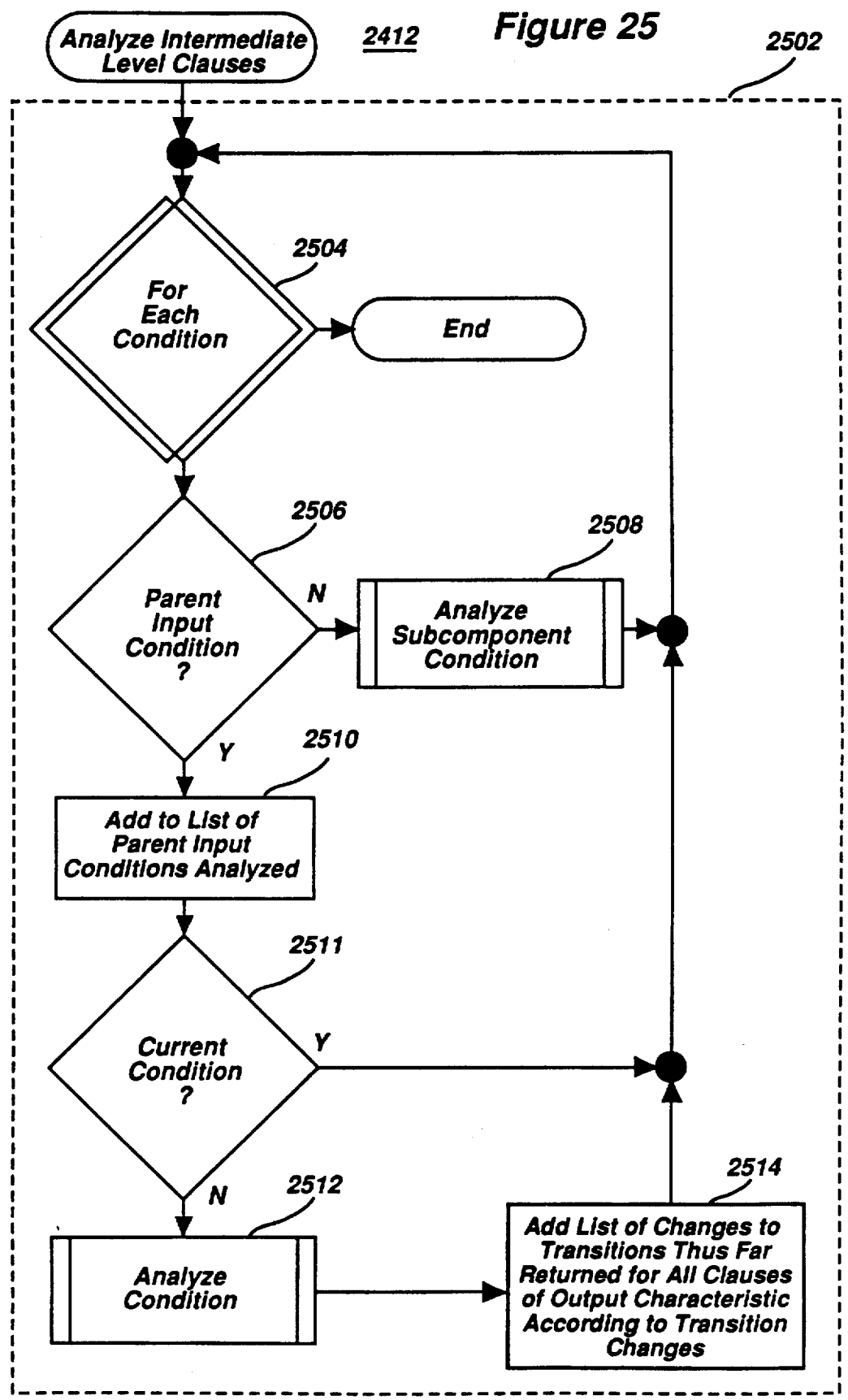
FIG. 25 is a flow diagram detailing the operation of the analyze intermediate level clauses subroutine called by the process of FIG. 24B.

Referring now to FIG. 25, when selected, conditional loop 2502, iterates, for each condition of the output characteristic definition of the clause being analyzed by the intermediate level of output characteristic definition, according to conditional block 2504. For each condition, the condition is interrogated by conditional block 2506 to determine if its a parent input condition. If its not a parent input condition, then subprocess 2508 is invoked to analyze subcomponent condition. If it is a parent input condition, then it is added to the list of parent input conditions to be analyzed according to item 2510. Control then passes to conditional block 2511 which determines if the condition is on the past or present condition list. If so, control returns to iterative block 2504. Otherwise, control then passes to process 2512, analyze condition, which is equivalent to conditional block 1314 in FIG. 14. Once analysis of that condition is returned by that process, the transitions returned are changed according to the list of changes on the transition list in item 2514, which is equivalent to item 2420 in FIG. 24. Control then returns for the next condition in iterative block 2504.

Figure 26:
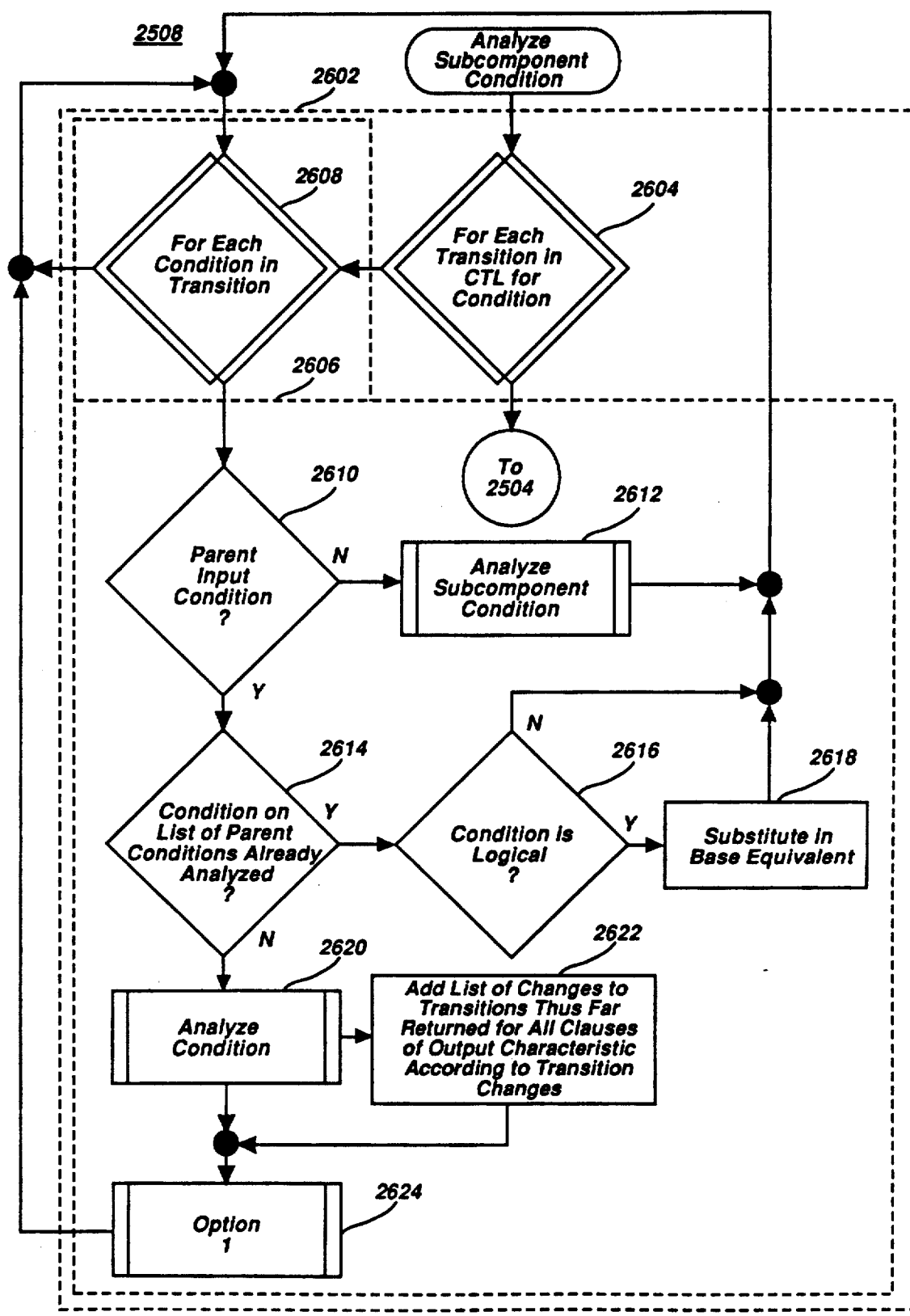
FIG. 26 is a flow diagram detailing the operation of the analyze subcomponent condition type subroutine called by the process of FIG. 25.

FIG. 26 shows more detail of process 2508 which includes iterative block 2608 which iterates, for each transition defined for the subcomponent condition being analyzed. Recall that there is a list of transitions for that subcomponent condition on the contributory transition list generated by invocation of process "analyze condition" of FIG. 14. For each of those transitions, according to iterative block 2604, a subloop 2606 is invoked for each condition in that transition. Control block 2608 iterates each condition and passes control to conditional block 2610 which checks to see, if the condition is a parent condition or not. If it is not a parent condition, then process 2612 recursively invokes this process to analyze a new subcomponent condition. Thus, process 2612 is analogous to process 2508 of FIG. 25.

If the input condition is a parent input, then it checks to determine whether the condition is already on the list of parent conditions to be analyzed by conditional block 2614. If it is already on the list of conditions to be analyzed, then conditional block 2616 checks to determine whether the condition is logical and if so item 2618 substitutes the basic equivalent in for the logical. In either case, control returns to conditional block 2608 for the next condition. If in conditional block 2614, the condition is not already on the list of conditions already analyzed, then process control block 2620 is executed to analyze the condition.

Process 2620, which analyzes a condition, is analogous to process 1314 of FIG. 14. Once the transitions are returned from process 2620, control passes to item 2622, which adds the conditions on the list of changes to transitions returned and control passes to process 2624 to combine the OCD returned for the condition just analyzed in 2620 with the existing OCD for the parent. This combination was discussed above and is identical to process 1918 in FIG. 20. Control then returns to control block 2608 to iterate for the next condition. When all conditions have been analyzed according to control block 2608, control returns to the beginning of the loop 2602 for analysis of the next transition according to control block 2604. When all transitions on the contributory transition list for the subcomponent condition have been analyzed, then control returns to control block 2504 of FIG. 25.

Figure 27:
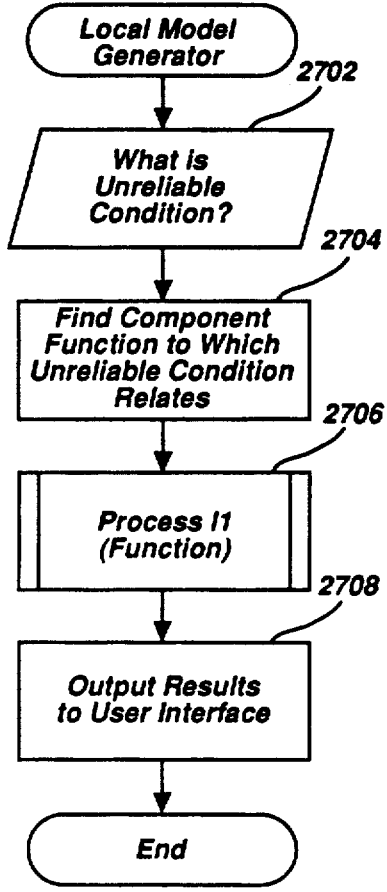
FIG. 27 is a flow diagram which shows an overview of the operation of the local model generator of the present invention.

FIG. 27 is an overview of the process flow of the local model generator. The function of the local model generator is to examine some high level unreliable condition and trace the function that the condition relates to. The local model generator traces it through all the components which are defined hierarchically in order to define at the lowest level where failures occur, the local reliability model for each lowest level subcomponent.

Recall that RMAS also traced through components. However, RMAS traces components backwards from the outputs to the inputs of the system. In contrast, the local model generator traces components from inputs to the outputs of the system. The output of the local model generator is the local reliability models for the lowest level components and these models may be used as direct inputs to RMAS.

The problem instance for the Local Model Generator (LMG) may be defined as follows. Given a hierarchical description of the candidate architecture (represented in the BBD and SYSD) in which component functions are defined at the lowest level of description and a high level system unreliable condition for which the reliability is to be established, define for each of the lowest level components, a local reliability model. Each local reliability model defines for the component all output characteristics as a function of the states of the component (i.e., failure modes) and the characteristics of the input to that component (e.g., corrupted or noncorrupted inputs).

The Local Model Generator consists of 3 processes mentioned in conjunction with FIG. 7. One process (I1) is invoked for each intermediate level component and two processes (L1 and L2) are invoked for each lowest level component. Like the RMAS processes, the LMG processes are instantiated in a hierarchy corresponding to the components defined in the SYSD (and supporting BBD). Initially, the highest level component module (I1) is instantiated. This process is involved primarily with controlling the order of invocation of the other LMG modules. Given the unreliable condition specified in terms of the function defined at this level, process I1 identifies the immediate subcomponents involved in the function. Separate reasoning modules for each subcomponent are then instantiated by process I1 in an order according to the functional flow.

For each successive intermediate level component abstraction, processes I1 is performed as in the highest level module to identify subcomponents involved in the function. Separate modules for each subcomponent are instantiated by process I1 according to the functions defined in the BBD/SYSD for that component level.

If the first subcomponent in the function is a parent component also (i.e., has subcomponents defined in the BBD), another invocation of process I1 is invoked for it to identify the next lower level subcomponents involved in the function.

If a subcomponent is defined at the lowest level in the BBD where component failure modes are modeled, process L1 is involved for it. Recall that failure modes are modeled as a change to the function, such that at the lowest level, there is a functional definition for the component under normal operating conditions and a functional definition for each possible failure mode.

At the lowest level, where component failures are modeled, process L1 inputs a set of possible input characteristics received from its parent component. For each operational state of the component (non-faulted and faulted), L1 traces the effects of all input characteristics through the function to determine the resulting output characteristics. Transitions for each possible failure mode are also defined. Process L2 then combines failure mode states and input characteristic conditions that cause the same output effect, so that a single output characteristic definition (OCD) for each output characteristic is defined. These OCDs together with the transitions comprise the component's local reliability model which is returned to process I1 of the parent component. Process I1 passes the output characteristics to the subcomponent module which inputs these characteristics. If that subcomponent is defined in the BBD at an intermediate level, then I1 is invoked for it. Otherwise, L1 is invoked and a local reliability model is defined.

This depth-first trace proceeds through the hierarchy until eventually, the outputs of the system are reached. The resulting local reliability models for each of the lowest level components can be interrogated by the user or given to the RMAS processes discussed in the previous section in order to define a global model for the system. Several implementation details have been omitted in the general overview just presented. The next sections discuss each process in detail.

As stated above, process I1, for each intermediate level component, manages the trace of the functional flow between its subcomponents. First process I1 invokes the module for the subcomponent who receives the parent's inputs. The module invoked is either an intermediate level module (I1) or a lowest level module (L1 and L2) depending on the level at which the corresponding subcomponent is defined in the BBD.

Both modules return a list of output characteristic possibilities for each subcomponents' outputs. Process I1 determines the next subcomponent to receive these output characteristics and determines the order of invocation of those subcomponents. The next subcomponent module is then invoked and given the possible input characteristics to analyze.

When the output characteristics of this parent's outputs have been returned by the last subcomponent, process I1 passes these characteristics to the parent module, I1, from which it was invoked.

If the subcomponents interact in a cyclic manner within the parent module, process I1 must keep track of the input characteristics given to a subcomponent module so that when no new input characteristics are to be analyzed, the trace ends.

At the lowest level, where component failures are modeled, process L1 inputs a set of possible input characteristics received from its parent component. For each operational state of the component (non-faulted and each failure mode) L1 determines the effects of the erroneous input characteristics on the component output characteristics. Thus, a given set of input characteristics is compared against each possible failure mode for the system, and the output effects for all combinations are generated.

The next section introduces the algorithm for process L1 through an example function. Afterwards, a detailed discussion of several aspects of the algorithm is given.

Consider a component that performs the following function:

[1]  input x1, x2, r;
     IF r=0 THEN z=x1+3;
     If r=1 THEN z=x2+4;
     output y =z IF x1>x2
     y=x2 IF x1<=x2;

Using the nil-sensitive operation default (discussed in section 3.1.2.2), this function is encoded as:

[2]  input x1, x2, r;
     z = NS(x1) | r = 0     (* z = x1 + 3; *)
         NS(x2) | r = 1;    (* z = x2 + 4; *)
     output y = z | x1 > x2
              x2 | x1 <= x2;

Consider input characteristics: x1:(g,b,n), x2:(g,b) and r=0,1. Process L1 defines the possible output characteristics (g,b,n) given this function and the possible input characteristics. The output characteristic definition that is produced by L1 for this function and the input characteristics is:

OUTPUT CHARACTERISTIC DEFINITION FOR Y:

[3]  output g   IF x1:(g) and x2:(g) and r = 1
                OR x1:(b) and x2:(g) and r = 1
                OR x1:(g) and x2:(g)
     output b   IF x1:(b) and r = 0 OR
                OR x1:(b) and x2:(b)
                OR x1:(g) and x2:(b)
     output n   IF x1:(n)

If any failure modes are to be modeled for this component, then the additional function definitions for each failure mode would have been defined in the BBD, and these would be analyzed in the same manner by process L1. For this illustration, assume that no failure modes are modeled, and therefore, the OCD in [3] is the only output of process L1.

Figure 29:
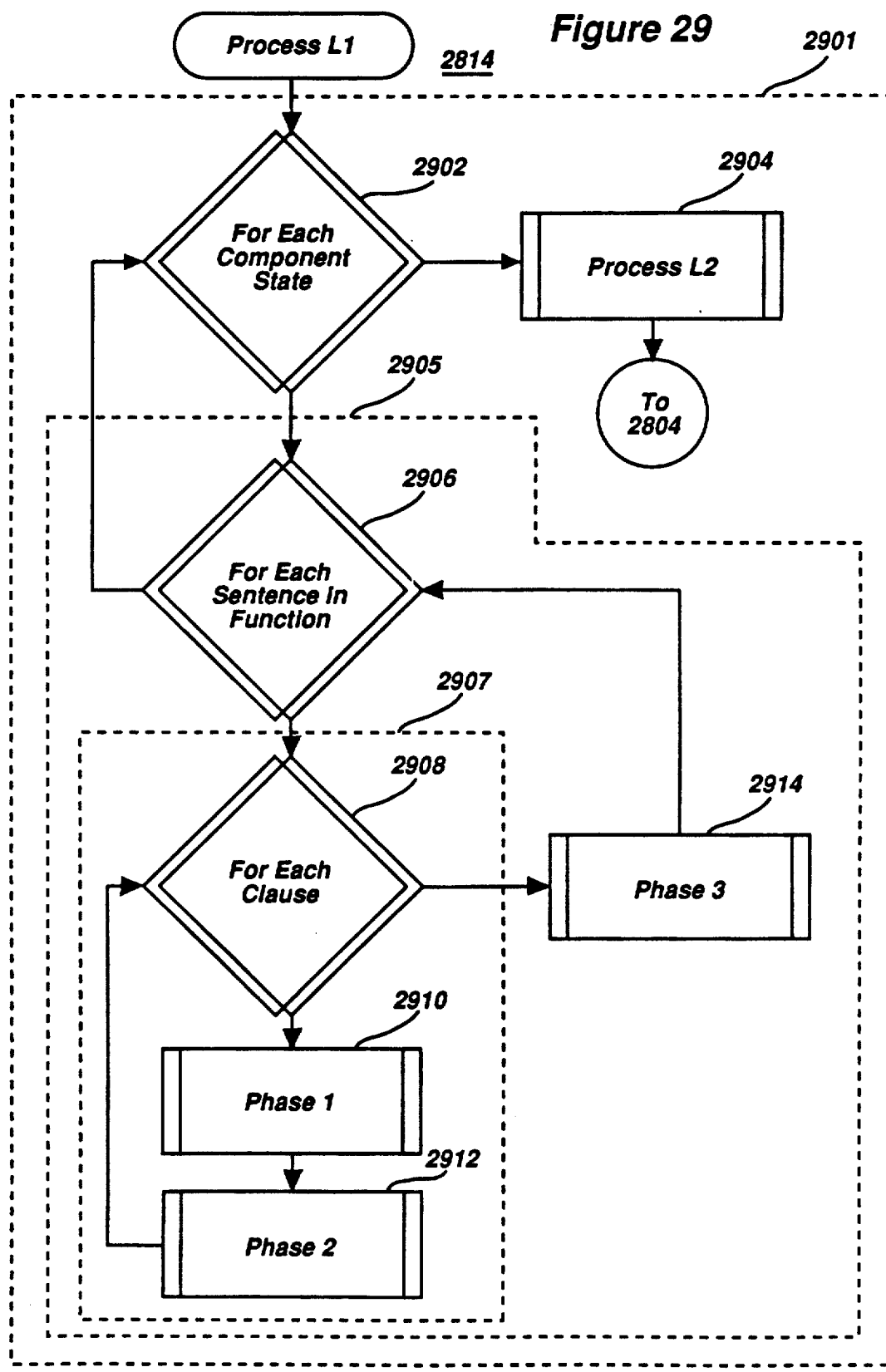
FIG. 29 is a flow diagram of the process L1 subroutine invoked by the process of FIG. 28.

The subroutine for process L1 is shown in FIG. 29. Process L1 has a nested looping structure that iterates over all sentences within a function, and all clauses within a sentence. Three phases are distinguishable.

In the first phase, the characteristics for each variable are substituted into a given clause. Initially, only input characteristics are known. These characteristics are then propagated through the conditions and functions defined in the clause. Each propagation results in a generation of characteristics for other variables. These new characteristics are substituted in for all other occurrences of the variable, and propagated until no new substitutions may be made. The manner and order of this propagation/substitution phase will be illustrated for the example above. At the end of phase one, the possible output characteristics of a given clause are known.

In the second phase, each output of the clause is instantiated for each possible output characteristic. This substitution triggers a reiteration of propagation/substitutions until each output characteristic is defined in terms of input characteristics. The definition of each output characteristic as a relationship to the input characteristics is known as the output characteristic definition (OCD).

After all clauses for a sentence have been analyzed, phase three combines OCDs for a common output characteristic.

These OCDs are then modified so that:

1. The resulting OCDs for a sentence do not overlap between characteristics. Overlaps might lead to an erroneous model for the component. For example:

output g if x:(g)
   output b if x:(g) OR y:(b)

is not acceptable because the output cannot be both g and b when x:(g). Therefore, phase 3 ensures that no overlaps occur between OCDs.

2. Overlaps within a particular output characteristic should also be eliminated if possible. For example:

output g IF x:(g) OR
            IF x:(g) AND y:(b)

could be simplified to:

output g if x:(g)

3. Conditions such as x1>x2 or x1<=x2 are not included in the OCD, since the values of x1 or x2 that determine the truth or falsity of the condition are not known. Rather, the condition is separated from the variable characteristics in the OCD.

4. The output characteristic definitions must be defined in terms of the input characteristics without reference to intermediate variables. For example, the OCDs in [3] do not include reference to variable z since z is an intermediate variable dependent on the inputs x1 and x2. Therefore, after the conditions are separated from the characteristics, the characteristics of intermediate variables are removed from the OCD (but the variables remain in the conditions).

5. For each clause within the resulting OCD, any variable whose characteristic set includes all possible characteristics (g,b,n) can be eliminated from the clause since the characteristic of that variable is not a determinant of the characteristic output for the clause.

The next sections describe the three phases of process L1 for the example shown above. The correlation to the exact phases and steps of the algorithm will not be maintained for this illustration. For instance, for the sake of brevity, two clauses within a sentence are often analyzed concurrently, even though the algorithm analyzed each sequentially. Rather, the intent of this example is to give the reader an understanding of the operations of substitutions, propagations, and the general goal of process L1.

The sections following this example detail the underlying mechanics of the process.

PHASE 1: For each sentence of the function (delineated by ;)

1. Substitute all input characteristics in for input variables.

2. Propagate the input characteristics through the conditions and operations of the function until the output characteristics are defined.

FIRST SENTENCE:

$$[4]\ z = \ NS(x1)\ |\ r = 0\ \ (*\ z = x1 + 3\ *)$$
$$NS(x2)\ \ |\ r = 1;\ \ (*\ z = x2 + 4\ *)$$

1. Substitute x1:(g,b,n) and x2:(g,b) in for variables x1 and x2, respectively:

$$z = \ NS(x1:(g,b,n))\ \ |\ r = 0\ \ (*\ \text{clause 1}\ *)$$
$$NS(x2:(g,b))\ \ \ \ \ |\ r = 1;\ \ (*\ \text{clause 2}\ *)$$

2. Propagate the input characteristics of x1 and x2 through all conditions and functions in the clause to the right of the "|" symbol (each clause is delineated by | ).

PHASE 2:

1. Instantiate the characteristics of each clause's output into separate clauses. The output of these clauses are the result of some operation, NS. Recall that nil sensitive functions (NS) will output nothing (or nil) if any of the inputs is nil. Therefore, the output characteristic possibilities for NS functions is:

NS OUTPUT = good IF all operands are good
    nil IF any operand is nil
    bad IF any operand is bad
      AND no operand is nil Since there is only one operand in each of the NS operations above, applying the NS rules to [4] results in:
z:(g)|x1:(g) and r=0
z:(b)|x1:(b) and r=0
z:(n)|x1:(n) and r=0
for the first clause, and:

z:(g)|x2:(g) and r=1
z:(b)|x2:(b) and r=1
for the second clause. [1]

PHASE 3:

1. Combine the two clauses according to common characteristics for z:

$$[5]\ \ z:(g)\ \ |\ x1:(g)\ \text{and}\ r = 0$$
$$|\ x2:(g)\ \text{and}\ r = 1$$
$$z:(b)\ \ |\ x1:(b)\ \text{and}\ r = 0$$
$$|\ x2:(b)\ \text{and}\ r = 1$$
$$Z:(n)\ \ |\ x1:(n)\ \text{and}\ r = 0$$

Phase 3 also changes the OCDs to eliminate overlapping conditions among clauses. However, there are no such overlaps in these OCDs, and therefore, a discussion of overlaps is deferred until analysis of the next sentence.

SECOND SENTENCE:
PHASE 1:
Referring to the second sentence in [2]:

$$[6]\ \text{output}\ \ y = z\ \ |\ x1 > x2$$
$$y = x2\ \ |\ x1 <= x2;$$

The second sentence is analyzed in the same way using the characteristics for z:(g,b,n) defined in [5] and the input characteristics x1:(g,b,n) and x2:(g,b).

1. For z:(g) and x1:(g,b,n) and x2:(g,b) and r=(0,1):

$$[7]\ \text{output}\ g\ |\ x1:(g,b,n) > x2:(g,b)$$
$$\{\text{and}\ x1:(g)\ \text{and}\ r = 0\}\ \text{and}\ z:(g)$$
$$|\ x1:(g,b,n) > x2:(g,b)$$
$$\{\text{and}\ x2:(g)\ \text{and}\ r = 1\}\ \text{and}\ z:(g)$$

The conditions within {} indicates conditions that must hold for z:(g) to be true (see [5]).

The present invention finds the intersection of characteristic possibilities for all variables in each clause:

x1: (x1:(g,b,n) and x1:(g)→x1:(g)) in the first clause of [7]

x2: (x2:(g,b) and x2:(g)→x2:(g)) in the second clause of [7]

The result after this substitution is:

$$\text{output}\ g\ \ |\ x1:(g) > x2:(g,b)\ \text{and}\ r = 0\ \text{and}\ z:(g)$$
$$|\ x1:(g,b,n) > x2:(g)\ \text{and}\ r = 1\ \text{and}$$
$$z:(g)$$

Next, note that x1 is involved in a ">" comparison in the second clause and has a characteristic possibility of "n".

It is meaningless to compare a variable that is "n". The condition is assumed to fail. Therefore, the "n" characteristic is removed from the set for x1. To ensure that the final OCD is complete for all input characteristics, an additional clause is created that specifies that the output is "n" if any input is "n":

[8] output g  | x1:(g) > x2:(g,b) and r = 0 and z:(g)

| x1:(g,b) > x2:(g) and r = 1 and z:(g)

output n | x1:(n)

PHASE 2 (Instantiate the clauses for each characteristic):
Since the clauses already specify a single output characteristic, no further instantiations need be done.
PHASE 1:
2. For z:(b) and x1:(g,b,n) and x2:(g,b):

[9] output b | x1:(g,b,n) > x2:(g,b) {and x1:(b) and r = 0} and z:(b)

| x1:(g,b,n) > x2:(g,b) {and x2:(b) and r = 1} and z:(b)

Simplify [9] by taking the intersection of characteristics for each variable:

output b  | x1:(b) > x2:(g,b) and r = 0 and z:(b)

| x1:(g,b,n) > x2:(b) and r = 1 and z:(b)

Here, again the "n" clause can be eliminated from the characteristic possibilities for x1 and an additional clause can be created.

[10] output b | x1:(b) > x2:(g,b) and r = 0 and z:(b)

| x1:(g,b) > x2:(b) and r = 1 and z:(b)

output n | x1:(n)

PHASE 2 (Instantiates the clauses for each characteristic):
Since the clause already specifies a single output characteristic, no further substitutions need be done.
PHASE 1:
3. For z:(n) and x1:(g,b,n) and x2:(g,b):
[11] output n | x1:(g,b,n) > x2:(g,b) {and x1:(n) and r=0} and z:(n)
Simplify:
output n | x1:(n) > x2:(g,b) and r=0 and z:(n)
Again, the "n" clause can be eliminated from the characteristic possibilities for x1 and an additional clause can be created. However, this leaves the original clause with no possible characteristics for x1. Therefore, the clause is invalid and can be eliminated altogether (The new clause remains).

[12] output n | x1:(n)
PHASE 2 (Instantiate the clauses for each characteristic):
Since the clause already specifies a single output characteristic, no further substitutions need be done.
Summary for the first clause of the second sentence (combine [8], [10], and [12])

[13] output g | x1:(g) > x2:(g,b) and r = 0 and z:(g)

| x1:(g,b) > x2:(g) and r = 1 and z:(g)

output b | x1:(b) > x2:(g,b) and r = 0 and z:(b)

| x1:(g,b) > x2:(b) and r = 1 and z:(b)

output n | x1:(n)

Second clause of sentence in [6]:
output y = x2 | x1 < = x2;
PHASE 1:
1. For x2:(g) and x1:(g,b,n):
[14] output g | x1:(g,b,n) < = x2:(g);
AFTER PHASE 2:
[15] output g | x1:(g,b) < = x2:(g) output n | x1:(n)
PHASE 1:
2. For x2:(b) and x1:(g,b,n): [16] output b | x1:(g,b,n) < = x2:(b);
AFTER PHASE 2:

[17] output b | x1:(g,b) < = x2:(b)

output n | x1:(n)

Summary for the second clause of the second sentence: (combination of [15] and [17])

[18] output g  x1:(g,b) < = x2:(g)

output b | x1:(g,b) < = x2:(b);

output n   x1:n

PHASE 3:
Combine the characteristics for the output for the two clauses of the second sentence ([13] and [18]):
[19] OUTPUT CHARACTERISTIC DEFINITION FOR Y:

output g  | x1:(g) > x2:(g,b) and r = 0 and z:(g)

| x1:(g,b) > x2:(g) and r = 1 and z:(g)

| x1:(g,b) < = x2:(g)

output b  | x1:(b) > x2:(g,b) and r = 0 and z:(g)

| x1:(g,b) > x2:(b) and r = 1 and z:(g)

| x1:(g,b) < = x2:(b)
output n  | x1:(n)

As stated in the above general overview, Phase 3 is responsible for ensuring that the newly created OCD for a component is complete and non-redundant: The OCD is complete if it specifies an output characteristic for every possible input characteristic, and it is non-redundant if there is no input characteristic combination for which more than one output characteristic is defined. Also, characteristics for intermediate level variables for the sentence (i.e., variables that are not inputs to the function or outputs for the sentence) are eliminated from the OCD:
[20] OUTPUT CHARACTERISTIC DEFINITION FOR Y:

output g  | x1:(g) > x2:(g,b) and r = 0 [A]

| x1:(g,b) > x2:(g) and r = 1 [B]

| x1:(g,b) < = x2:(g) [C]

output b  | x1:(b) > x2:(g,b) and r = 0 [D]

| x1:(g,b) > x2:(b) and r = 1 [E]

| x1:(g,b) < = x2:(b) [F]
output n  | x1:(n) [G]

Phase 3 must analyze the OCD and detect any overlaps in input characteristics. Overlaps occur because the evaluation of a function is dependent on conditions among input and internal variables. For example, the output of a function may be dependent on a equality comparison of two variables. The determination of the truth or falsity of the conditions is dependent on the value of the data. However, the value of the data is not known. Rather, only the characteristics of the data is known. This is not so much an incomplete specification of a function as it is a symptom of the incomplete description of faults in general. For example, when a component fails, and it is said that the failure causes corrupted output, the value of the corrupted output is not known. Another component acting on the corrupted input may test the input in a condition. The result of the condition can not be known since the value is not known. Therefore, multiple results (output characteristics) may result from the same input conditions, distinguished only by the internal condition.

The result of this is a non-deterministic output characteristic specification in which two or more output characteristics may be defined on a particular combination of input characteristics, the distinguishing factor being the internal condition.

Overlaps can take on three types:
1. the input characteristics can be identical and the difference is solely in the conditions (e.g., $x{:}g$ and $y{:}g$ $x < y$
$x{:}g$ and $y{:}g$ $x >= y$)

2. the input characteristics of one domain can be a subset of the input characteristics of the other domain, so that there is some characteristic that is in one domain and not the other:

(e.g., $x{:}g$ and $y{:}g.b$ $x < y$
$x{:}g$ and $y{:}g$ $x < y$)

3. or the overlap may be a combination of the two:

(e.g., $x{:}g$ and $y{:}g.b$ $x < y$
$x{:}g$ and $y{:}g$ $x >= y$)

Further, the overlap can occur within or between output characteristics. It is advantageous to resolve overlaps between characteristics first so that the resulting output definition for the component would be complete. Afterwards, overlaps among clauses within an output characteristic definition may be eliminated so that a more concise OCD results.

For dealing with overlaps between OCDs, the following options are ranked in order of preference:
1. Heuristics may be applied depending on the output characteristics involved in the overlap. These heuristics are patterned after the way such overlaps are handled manually. For example,
  a. If the overlap is between a good characteristic and a bad characteristic, and if one of the overlapping characteristics is a bad characteristic, then a conservative assumption would shift the overlap to the bad output characteristic.
  b. If the overlap is between a nil characteristic and a good or bad characteristic, and if one of the overlapping characteristics is a nil characteristic, then a reasonable assumption would shift the overlap to the nil characteristic.
2. It is possible that some of the characteristic possibilities in the condition are not possible. For example, a reasonable assumption would conclude that a variable, x1, whose value is good, (i.e., x1:(g)) would not be equivalent to a variable, x2, whose value is corrupted (i.e., x2:(b)). Therefore, a clause containing the condition, x:g=y:(g,b), can be reduced to x:g=y:b by assuming that a corrupted input will not equal a noncorrupted input. This is a reasonable assumption that may be used to eliminate characteristic possibilities from clauses. Although one may assume the following assumption:

$x{:}b = y{:}b$ $x{:}g = y{:}g$

The assumption may not always hold. Therefore, the analyst is interrogated as to the validity of the assumption if it is relevant to the particular clause. Because these particular assumptions would apply to most cases, the user is interrogated on these assumptions (called condition propagation rules) during phase one. In phase three, when the process L1 detects an overlap between two clauses in different OCDs, the user is asked if the intersecting characteristics may be applied to one or the other OCD.

3. Failing a resolution of the overlap by options 1 or 2, the user may elect to define a nondeterministic output characteristic definition, by including for each path an estimate of the probability of occurrence of the distinguishing characteristic or condition. However, the use of this option is not encouraged because of the percentage assigned to each possibility is often subjective (whereas the other options have some logical foundation) and the resulting OCD has more conditions to analyze. Returning to the example in [20], the following overlaps between output characteristics are detected.
Overlaps:
[A] and [F]
[C] and [D]
[A] and [F]: overlap on x1:(g) and x2:(b) and r=0
Option 1a applies to this set of overlapping clauses, and therefore the user would be interrogated as follows:
Query: Given the following overlapping clauses:
output $g|x1{:}(g) > x2{:}(g,b)$ and $r=0$
[A] output $b|x1{:}(g,b) <= x2{:}(b)$ [F]
(the overlapping condition is: x1:(g) and x2:(b) and r=0) Can the overlapping condition be assigned to the OCD for characteristic "b"?
The user would answer yes, and process L1 would subtract the intersecting characteristics from the OCD for g:
Result:
output $g|x1{:}(g) > x2{:}(g)$ and $r=0$ [A]
output $b|x1{:}(g,b) <= x2{:}(b)$ [F]
[C] and [D]: overlap on x1:(b) and x2:(g)
Option 1a applies to this set of overlapping clauses also, and after an affirmative response to a user query, the result would be:
Result:

output $g$   $x1{:}(g) <= x2{:}(g)$ [C1]

$x1{:}(b) <= x2{:}(g)$ and $r =$ [C2]

output $b$   $x1{:}(b) > x2{:}(g,b)$ and $r = 0$ [D]

RESULT AFTER OVERLAPS BETWEEN OCDs HAVE BEEN RESOLVED:

```
output g    | x1:(g) > x2:(g) and r = 0 [A]
            | x1:(g,b) > x2:(g) and r = 1 [B],[C2]
            | x1:(g) < = x2:(g) [C1]
output b    | x1:(b) > x2:(g,b) and r = 0 [D]
            | x1:(g,b) > x2:(b) and r = 1 [E]
            | x1:(g,b) < = x2:(b) [F]
output n    | x1:(n) [G]
```

Once overlaps between output characteristic definitions have been eliminated, phase 3 analyzes each OCD and detects overlaps between clauses within an OCD. It is not as critical that these overlaps be eliminated since it is only the overlaps between OCDs that make the resulting model ambiguous or incomplete. However, phase 3 detects clauses within an OCD that are subsets of other clauses and eliminates that subset clause from the final OCD. This reduces the size of the final OCD.

Referring to the OCD in [20], the following overlaps within output characteristic definitions are identified:

1. [A] AND [C1]
2. [B] AND [C1]
3. [D] AND [F]
4. [E] AND [F]

The first and fourth overlaps above are super/subset clauses. Therefore, clause [A] and [E] may be eliminated. Combining these, the resulting OCD is:

RESULT AFTER OVERLAPS WITHIN HAVE BEEN RESOLVED:

```
output g    | x1:(g,b) > x2:(g) and r = 1 [B]
            | x1:(g) > x2:(g) [C1]
output b    | x1:(b) > x2:(g,b) and r = 0 [D]
            | x1:(g,b) < = x2:(b) [F]
output n    | x1:(n) [G]
```

Finally, to produce the final output characteristic definition, the conditions are separated from the characteristics. Also, any variables in clauses that involve an enumeration of all possible data characteristics may be eliminated from the clause.

SEPARATE CONDITION FROM INPUT CHARACTERISTIC:

```
output g    | x1:(g,b) and x2:(g) and r = 1 (x1 > x2) [B]
            | x1:(g) and x2:(g) (x1 > x2) [C1]
output b    | x1:(b) and x2:(g,b) and r = 0 (x1 > x2) [D]
            | x1:(g,b) and x2:(b) (x1 < = x2) [F]
output n    | x1:(n) (x1 > x2) [G]
```

ELIMINATE FULLY ENUMERATED VARIABLES:

There are no variables in this OCD that have fully enumerated characteristic sets. With the clause delineator "|" replaced by the logical OR, this OCD is identical to the one presented in [3]. Note that the final OCD for this component is not fully defined. For example, it does not specify the output characteristic for all cases that x2:(n). However, it is defined on all input characteristics given to L1. This is one way in which the model created by the LMG is superior to a user defined model on all inputs in that there are possibly less conditions for RMAS to consider. The model will not be incorrect in RMAS if an impossible combination is modeled in the OCD. However, it would be erroneous if a combination that is possible is not modeled. Therefore, by modeling all combinations (as may be done if the user enters the local reliability models for RMAS), the state space may be larger than necessary, but the model would not be less correct.

A detailed description of the LMG process is disclosed in conjunction with FIGS. 27 to 56.

Referring now to FIG. 27, the LMG process begins with with input query 2702 which inputs from the user the unreliable condition to be analyzed. Unreliable conditions are input by the user through the user interface 218 shown in FIG. 2. The type of unreliable condition being input may be any aberration of a function, the most typical being unreliable output characteristics of a high level function such as this function outputted bad output.

Control then passes to item 2704 which, given the unreliable condition, the system references the BBD for the component related for that function and finds the function that is the function referenced by the unreliable condition. For example, in the case of the output of a particular function being corrupted, then item 2704 will locate the component that performs that function. A function may be a computer system which computes an output.

Control then passes to process 2706, designated process I1, which indicates an intermediate level process. Since the components are defined in the system definition hierarchically for all intermediate level functions, process I1 is executed to trace its subcomponents in order to determine the local reliability models for its lowest level subcomponents. Once process I1 is complete, item 2708 outputs the results to the user interface.

Figure 28:
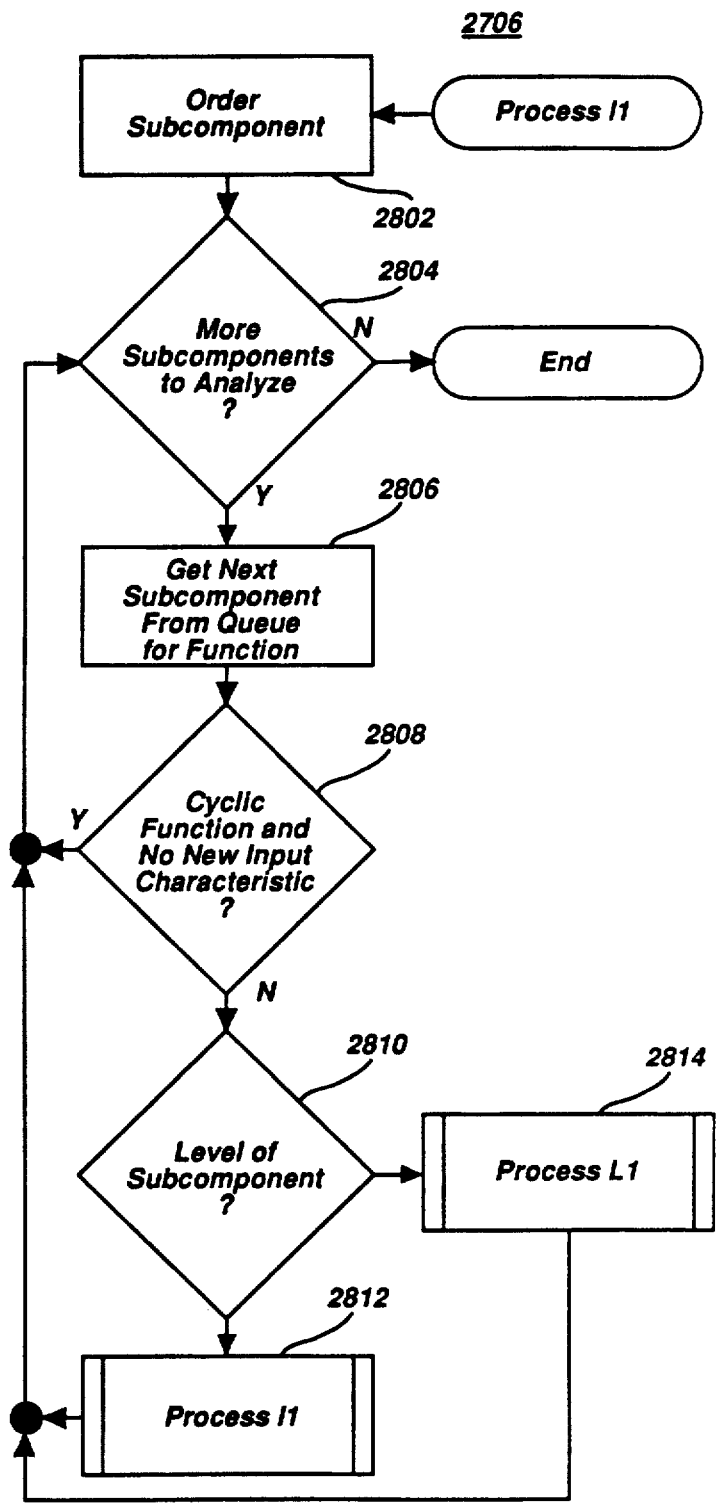
FIG. 28 is a flow diagram of the process I1 subroutine invoked by the process of FIG. 27.

Process I1 is shown in conjunction with FIG. 28. Process I1 begins with item 2802 which orders the subcomponents that perform the given function and places these subcomponents on a queue of subcomponents to be analyzed. For example, if the component has two subcomponents A and B, wherein the input goes to A, and A outputs to B, and B outputs what is the final output for the parent, A and B would be analyzed in sequential order. For parallel subcomponents the order of analysis is arbitrary.

Process control then passes to conditional block 2804, which determines whether there are any more subcomponents to be analyzed on the queue. If there are no more subcomponents to be analyzed, process control returns to the point where the process was entered. If there are more subcomponents to analyze, then item 2806 retrieves the next subcomponent from the queue of subcomponents to analyze and then control passes to control block 2808 which determines if the function that is being analyzed is cyclic and the next subcomponent to be analyzed has no new characteristics that need to be analyzed, then control returns to conditional block 2804 to analyze the next subcomponent, IF, for example, some subcomponents may be related in a cyclic manner, such as A calls B and B calls A. In this case, the parent of the subcomponents will continue analyzing until there are no new characteristics of the data to be analyzed. At this point, for the most part, processing will end, but it is necessary to iterate through the rest of the subcomponents in case there are parallel subcomponents to be analyzed.

Control then passes to conditional block 2810 which determines, for a subcomponent to analyze, if that subcomponent is also an intermediate level component. In this case, process Il is executed recursively according to process block 2812. This is identical to process 2706. If the component is at the lowest level, process 2814 (L1) is invoked to analyze the lowest level component and derive or define a local reliability model for that lowest level component. Once that local reliability model is returned to conditional block 2804 from 2814 or 2812. Conditional block 2804 is invoked to get the next subcomponent that receives those inputs and the process continues.

Process 2814 (L1) is called to generate the model for the lowest level component and it is shown in further detail in conjunction with FIG. 29. Process L1 is called by process block 2814 of FIG. 28 and it begins with iterative block 2902 which iterates for each component state (which may be the failure state or a nonfailed state). When finished analyzing all component states, control passes to process block 2904, which combines the output characteristic definitions for each component state into a single output characteristic definition and transitions that then comprise the local reliability model and this local reliability model is then returned to conditional block 2804 of FIG. 28. Therefore, for each component state, control enters iterative block 2906, which iterates for each sentence in a given function. A sentence is delineated in the definition by a semicolon. For each sentence, iterative block 2908 is entered to iterate for each clause of the sentence. As noted above, a clause is delineated by a vertical bar in the functional specification. For each clause within each sentence control enters process block 2910 which is generally referred to as Phase 1. Phase 1 propagates all input characteristics through the given sentence until output characteristics ar defined. Process flow then continues to process block 2912 which is generally referred to as Phase 2.

In process 2912, an output characteristic definition for each output characteristic is defined for that clause. After process 2912 is complete, control returns to iterative block 2908 which analyzes the next clause. After all clauses have been analyzed, control passes to process block 2914 which is generally referred to as Phase 3.

In Phase 3, all output characteristic definitions for each output characteristic, for example, good, bad and nil are combined for all the clauses and then each new output characteristic definition is analyzed to eliminate overlaps between output characteristics. When process 2914 is complete, the output characteristics for the lowest level model have been defined and control returns to iterative block 2906 which analyzes the next sentence in the function. After all sentences have been analyzed control returns to iterative block 2902 to analyze the next component state. After all component states have been analyzed, then an output characteristic definition is defined and process control returns to process L2 (2904).

Figure 30:
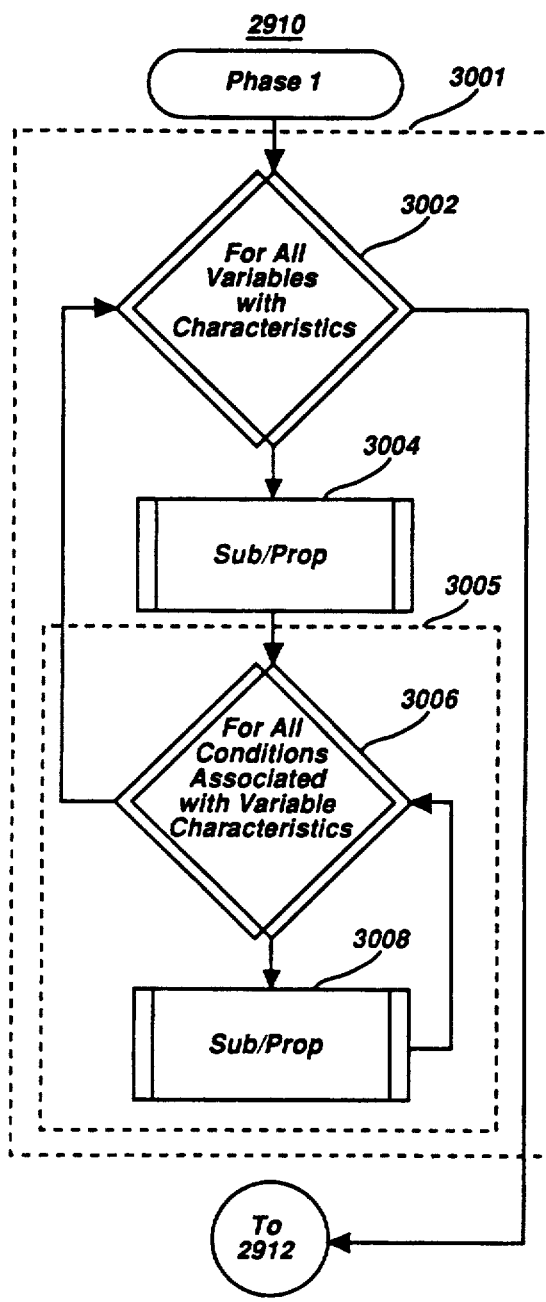
FIG. 30 is a flow diagram detailing the operation of the phase 1 subroutine invoked by the process of FIG. 29.

The Phase 1 process which was called by process block 2910 in FIG. 29 is shown in greater detail in conjunction with FIG. 30. As shown in the example, the first phase is responsible for propagating all input characteristics and local variable characteristics through the current sentence until output characteristics are defined. This propagation is accomplished through an iteration of:

a. Substituting characteristics in for variables, and b. Propagating these characteristics through functions and conditions in which the variables are involved in order to define characteristics for other variables.

Three special attributes of the substitution/propagation phase are discussed herein:

1. Define the set of characteristics possibilities for a variable at an instance in the analysis as the variable's characteristic set. As a result of propagating characteristics through an operation or a function, other variables' characteristic sets may be changed. These changes must be substituted for all instances of these variables and propagated through any other affected functions. Therefore, at any one time in phase 1, there will be many variables whose characteristics must be substituted/propagated. In order to perform this in an organized manner, a predefined substitution/propagation is performed until all variables that are affected have had their new characteristic sets substituted/propagated. This is a depth-first approach handled by the Sub/Prop process of FIG. 31.

2. Intermediate variable characteristic possibilities are dependent on other variable characteristic sets. For example, an intermediate variable may have a characteristic of "g" only if an input variable's characteristic is "g" according to analysis of a previous sentence in the function. When the intermediate variable characteristics are substituted/propagated, these dependencies must be substituted in also. This is performed by conditional loop 3005.

3 Further, for a given set of variables to be substituted at any one time, a priority ordering that favors intermediate variable substitutions before input characteristic substitutions is used. This reduces the number of substitutions that must be made since (as explained above) conditions upon which the intermediate variable characteristics depend are substituted in with these characteristics.

Substitution:

Substitution is performed as follows: Given a set of characteristics to be substituted in for a variable, the intersection of these characteristics with the characteristics currently associated with the variable is calculated. This intersection is then considered to be the new set of characteristics for the variable. Each instance of the variable in the clause is then updated with the new set of characteristics. This is handled by the substitute subroutine of FIG. 32.

Propagation:

Propagation consists of the following: For each instance of the variable, the variable characteristics are propagated through the operation or condition in which the variable is involved. These conditions and operations may be nil-sensitive operations, non-nil-sensitive operations, or Boolean comparators such as $=$, $\neq$. Other Boolean comparators such as $<$, $>$, $<=$, $>=$, are not propagated since the result of the Boolean comparison is dependent on the value of the variables involved, and these values are not generally known. For example, what is the result of the comparison $x>y$ when x has the characteristic of "b"? The result is dependent on the value of x, and that value is not known. Therefore, assumptions regarding Boolean comparators are handled interactively with the user in Phase 3. The propagation process is introduced in conjunction with FIG. 33. The following details the propagation rules for nil-sensitive and non-nil-sensitive operations and equality comparators.

A. Nil-sensitive operations:

If the variable is a parameter in a nil-sensitive operation, and if all parameters of the operation are characterized (i.e., all have characteristics currently associated with them), then the nil-sensitive propagation rules are applied to separate the clause into three types of clauses (i.e., for "g,b,n" characteristic outputs) according to the parameters, characteristics:

Nil-sensitive propagation rules:

1. "G" clause:

If all parameters have a characteristic possibility of "g", then it is necessary to create a clause in which the result of the function is assigned characteristic "g" and all parameters for this clause are assigned characteristic "g". This is illustrated in conjunction with FIG. 34A, items 3402 to 3408.

2. "N" clauses:

If there is any parameter with an "n" characteristic, then it is necessary to create a clause for each variable x(i) that has an "n" characteristic in which the result of the function is assigned characteristic "n", the variable x(i) is assigned the characteristic "n", and assign all other variables, x(k) where k>i, (according to some predetermined ordering) retain their currently assigned characteristics (i.e., no changes to these variable characteristics). Further, the present process removes from variables, x(j) where j<i, the characteristic "n". Since no two clauses may address intersecting conditions, the clauses must define an exclusive OR condition, instead of simply a Boolean inclusive OR. The last change to the transitions for x(j), where j<i satisfies this. If any resulting variable sets are empty (i.e., the only characteristic was "n" for that set), then the present process removes the clause. This is illustrated in items 3410 to 3422 of FIG. 34A.

3. "B" clauses:

If there are no parameters that have "n" as the only characteristic possibility and there is any parameter with a "b" characteristic, then it is necessary to create a clause for each variable x(i) that has a "b" characteristic possibility if all variables x(j), where j<i, have a characteristic possibility "g".

[3] The new clause is formed by:

a. assigning the variable x(i) a "b" characteristic,
b. the result of the function is assigned characteristic "b",
c. all variables x(j) for j<i are assigned the "g" characteristic,
d. assign all other variables, x(k) where k>i, (according to some predetermined ordering) to retain their currently assigned characteristic sets with "n" removed.

Figure 34A:
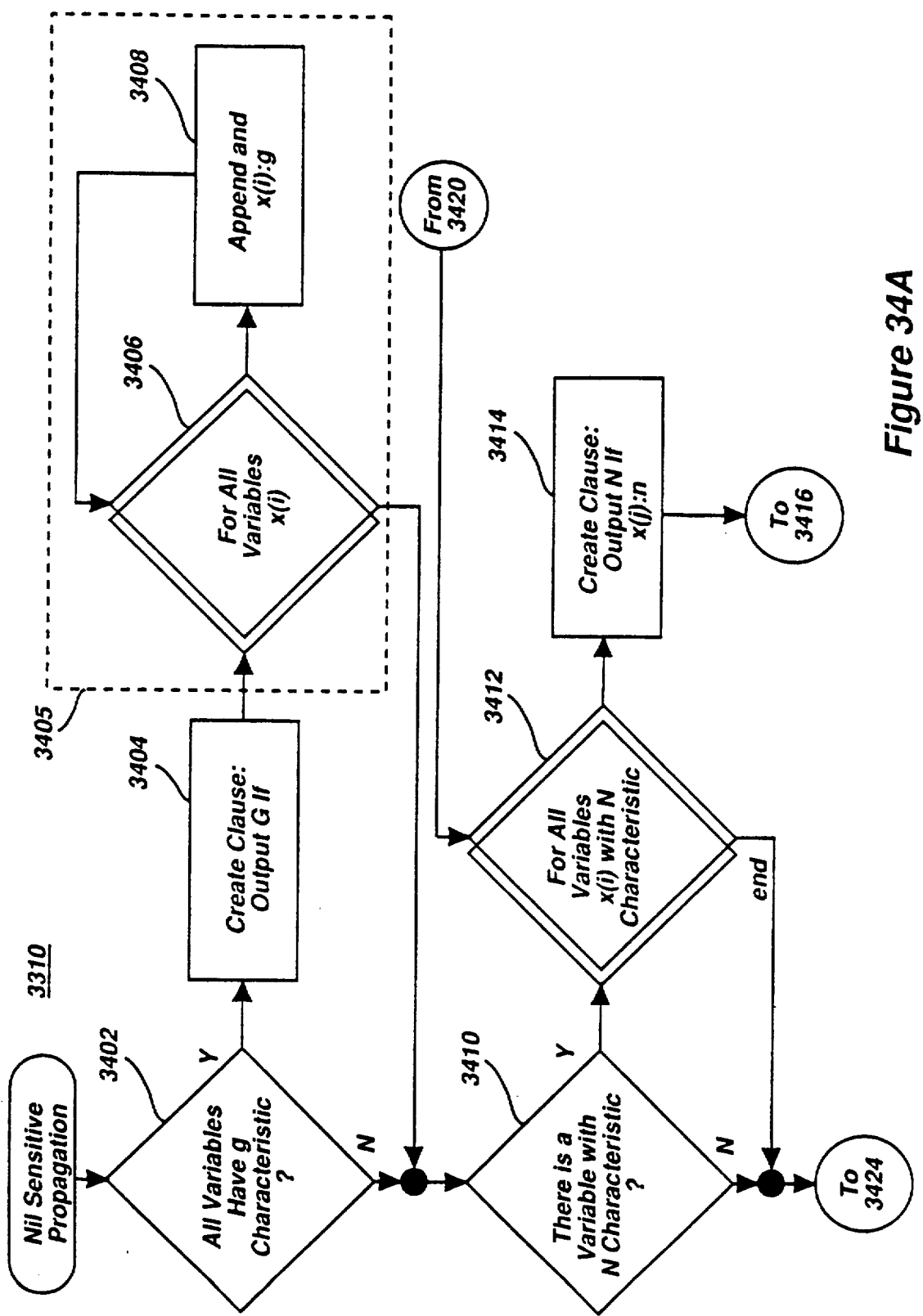

This additional condition also ensures that the clauses define an exclusive OR. However, removing "b" from the previous variables is not sufficient since the characteristic of "n" is not allowed either. Therefore, all variables prior to this variable must have a "g" characteristic. A flowchart for nil-sensitive propagation is shown in FIGS. 34A-34B2.

Figure 37:
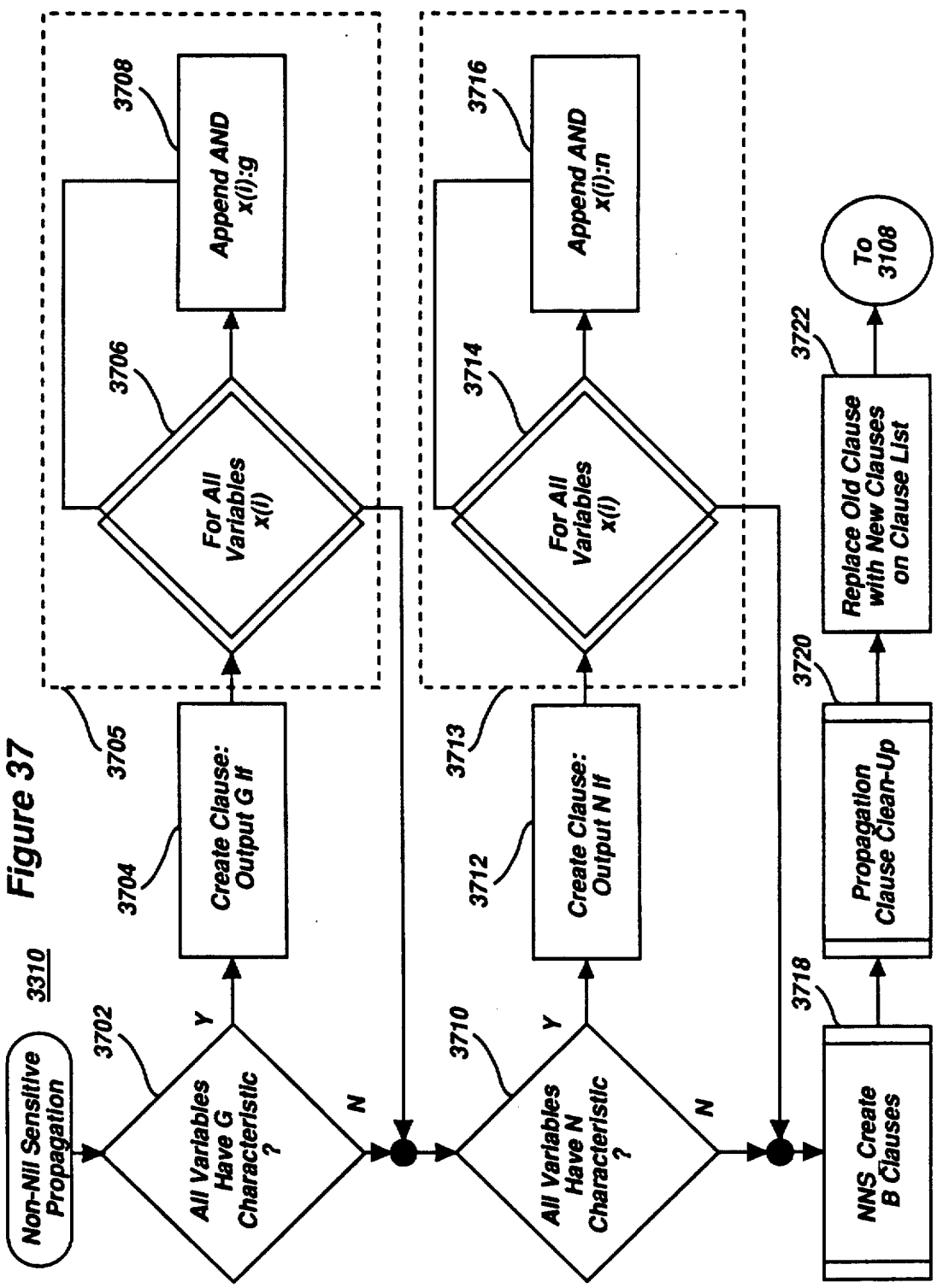
FIG. 37 is a flow diagram detailing the operation of the non-nil-sensitive propagation subroutine invoked by the process of FIG. 33.

B. Non-nil-sensitive operations:

If the variable is a parameter in a non-nil-sensitive operation, and if all parameters of the operation are characterized (i.e., all have characteristics currently associated with them), then the non-nil-sensitive propagation rules are applied to separate the clause into three types of clauses (i.e., for "g,b,n" characteristic outputs of the function) according to the parameters' characteristics:

Non-nil-sensitive propagation rules are discussed in more detail in conjunction with FIG. 37.

1. "G" clause:

If all parameters have a characteristic possibility of "g", then it is necessary to create a clause in which the result of the function is assigned characteristic "g" and all parameters for this clause are assigned characteristic "g". This is illustrated in FIG. 37, items 3702 to 3708.

2. "N" clauses:

If all parameters have a characteristic possibility of "n", then it is necessary to create a clause in which the result of the function is assigned characteristic "n" and all parameters for this clause are assigned characteristic "n".

3. "B" clauses:

If there is any parameter with a "b" characteristic, then it is necessary to create a clause for each variable x(i) that has a "b" characteristic in which the result of the function is assigned characteristic "b", the variable x(i) is assigned the characteristic "b", and the present process assigns all other variables, x(k) where k>i, (according to some predetermined ordering) to retain their currently assigned characteristics (i.e., no changes to these variable characteristics). Further, the present process removes from variables, x(j) where j<i, the characteristic "b". Since no two clauses may address intersecting conditions, the clauses must define an exclusive OR condition, instead of simply a Boolean inclusive OR. The last change to the transitions for x(j), where j<i satisfies this. If any resulting variable sets are empty (i.e., the only characteristic was "n" for that set), then remove the clause. A flowchart for non-nil-sensitive propagation is shown in FIG. 33.

Figure 40:
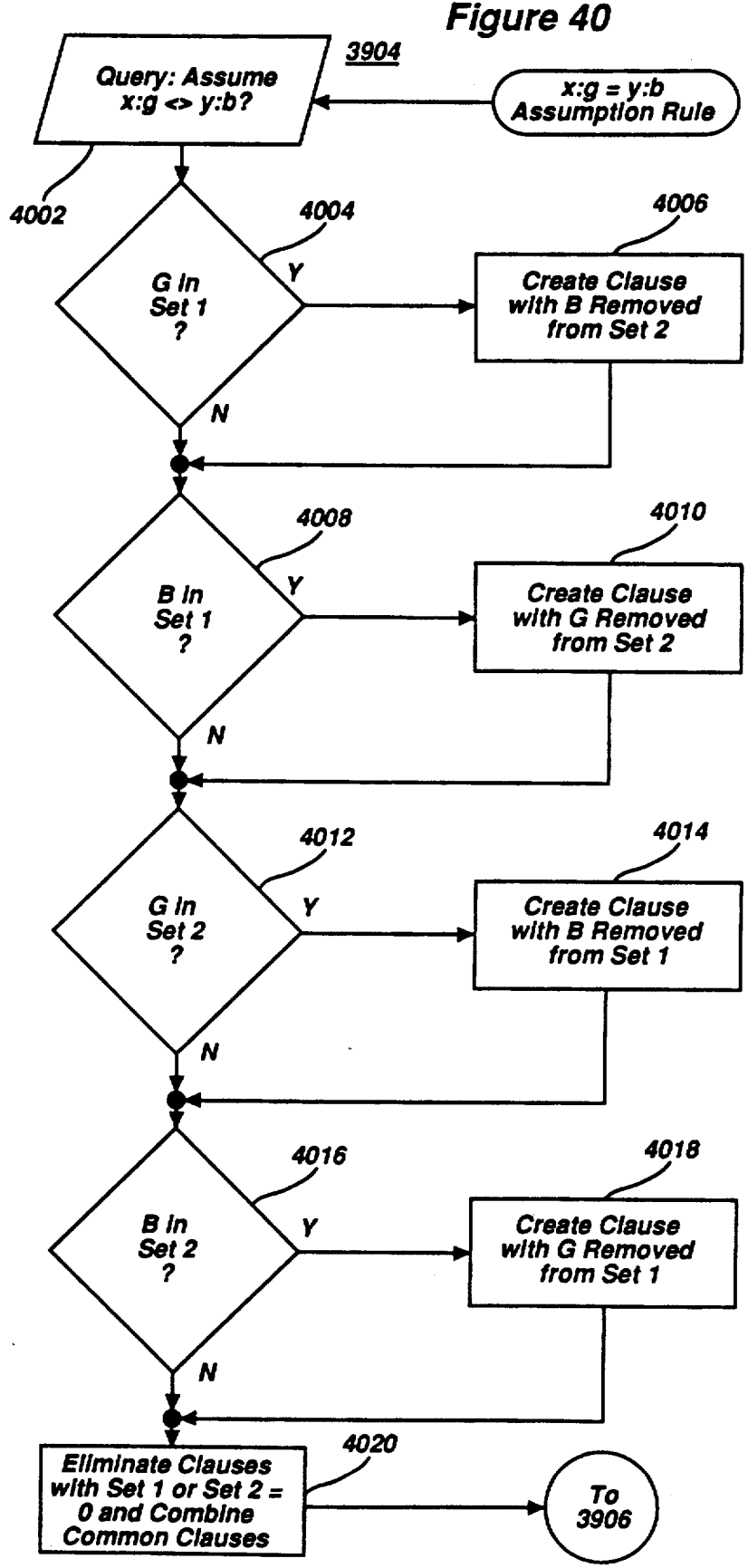
FIG. 40 is a flow diagram detailing the operation of the x:g=y:b assumption subroutine invoked by the process of FIG. 39.

C. Condition Propagation Rules are discussed in more detail in conjunction with FIG. 39, wherein:

there are three types of assumptions which may apply to Boolean comparators for equality (=) and inequality (<>). These are:

1. x:g<>y:b assumption, which is discussed in more detail in conjunction with FIG. 40: Assume that a variable that is "g" is never equal to a variable that is "b". In other words, a condition "x:g=y:b" always fails. Again, the equality of two variables cannot be determined without knowledge of their values. However, most analysts assume that if a value is corrupted by some failure, it would not be equal to another variable that was not corrupted. To verify this assumption, the following rule is defined:

Condition: equality condition in the clause (x:(set1-)=y:(set2)) where set1 or set2 has "b" and the other set has "g".

To determine whether it can be assumed that x:b<>y:g and x:g<>y:b:

Action: Create 4 separate clauses:

1. if "g" in set1 then remove "b" from set2
2. if "b" in set1 then remove "g" from set2
3. if "g" in set2 then remove "b" from set1
4. if "b" in set2 then remove "g" from set1

Eliminate duplicate clauses and clauses with set1 or set2=0.

Figure 41:
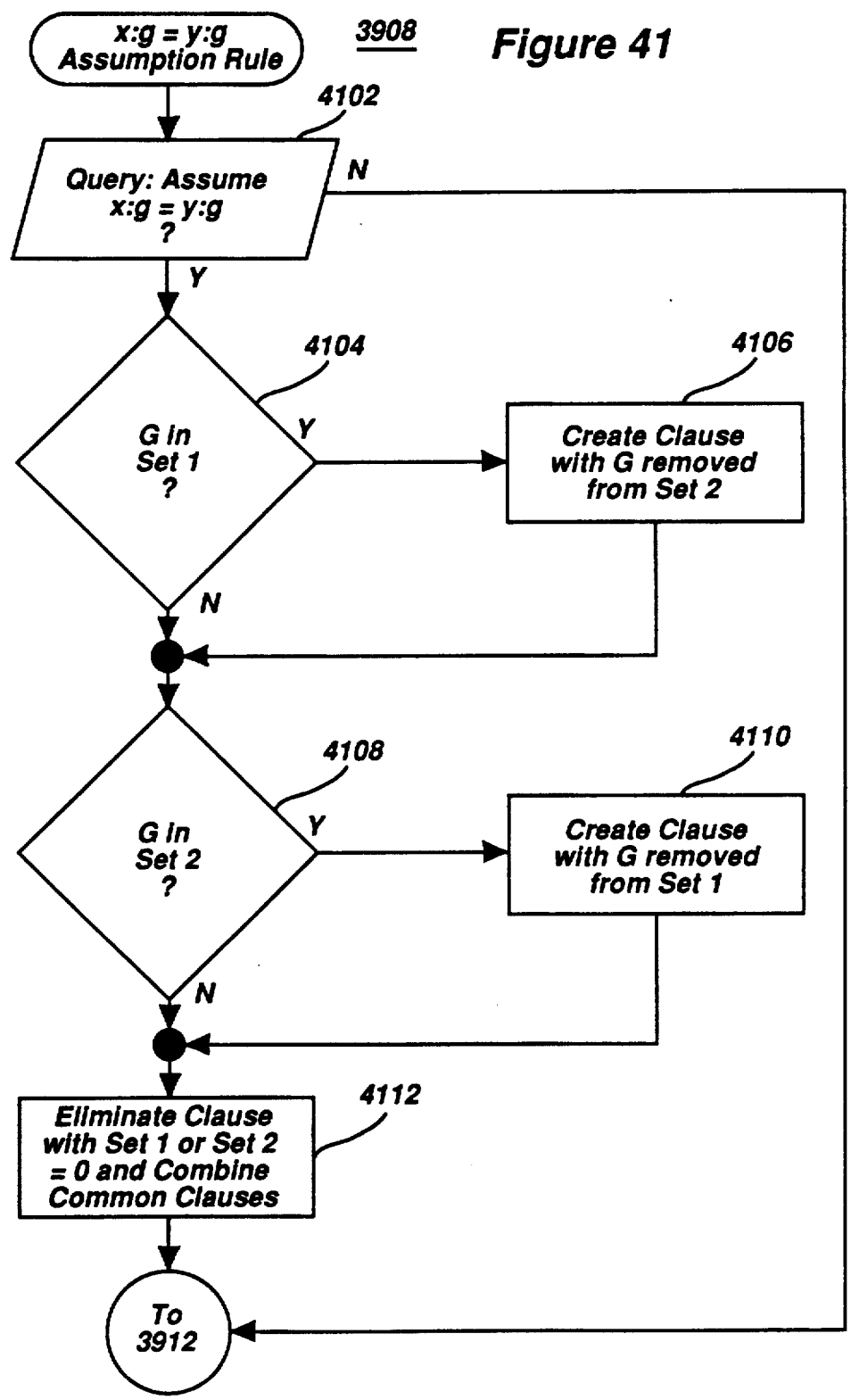
FIG. 41 is a flow diagram detailing the operation of the x:g=y:g assumption subroutine invoked by the process of FIG. 39.

2. x:g=y:g assumption which is discussed in more detail in conjunction with FIG. 41: This assumption is common for comparing variables that relate to the same redundant component type. It assumes that in comparing two variables that are both "g" (i.e., not corrupted), the equality test will hold. To verify that this assumption holds, the following rule is defined:

Condition: Inequality Operation (x:(set1)<>y:(set2)) where set1 and set2 have "g".

To determine whether it can be assumed that x:g=y:g:

Two clauses are created:

1. if "g" in set1 then remove "g" from set2
2. if "g" in set2 then remove "g" from set1

Eliminate duplicate clauses and clauses with set1 or set2=0.

3. x:b=y:b assumption which is discussed in conjunction with FIG. 42: This assumption is often used as a simplifying assumption to handle a worst case analysis. For example, the analysis of a voter component that outputs the majority of the inputs may assume a worst case scenario in which all corrupted ("b") inputs have that same value, and therefore, may outvote a "g" value. To verify that this assumption holds, the following rule is defined:

Condition: Inequality Operation ((x:(set1)<>y:(set2)) where set1 and set2 have "b":

To determine whether it can be assumed that x:b=y:b, then:

1. if "b" in set1 then remove "b" from set2
2. if "b" in set1 then remove "b" from set2

Eliminate duplicate clauses and clauses with set1 or set2=0.

4. Nil comparison assumption: This assumption is the only one applied to non-equality Boolean comparators. As illustrated in the previous example, it assumes that a comparison to a nil value always fails. The rule is defined as follows:

For Boolean comparators (=, <, >, <=, >=) where set1 or set2 contain an "n" characteristic:

1. Remove "n" from the set1 and set2
2. Create a clause: N|{x:(n)}AND {y:(n)} where {} indicates inclusion only if the variable has an "n" characteristic. This is described in more detail in conjunction with FIG. 42B.

These four assumptions have been identified as common assumptions made by analysts. As further assumptions are identified, interactive inquiries may be added to this list. Further reductions are applied in Phase 3.

Phase 1 of the Local Model Generator is described in more detail in conjunction with FIG. 30. The subroutine of FIG. 30, when invoked, begins with iterative block 3002, which iterates for all variables in a particular clause that have characteristics currently associated with them. At the beginning of this subroutine, input characteristics are processed. For all variables that have characteristics enter subroutine process block 3004, which performs a combination of substitution/propagation to propagate those characteristics through the sentence or through the clause being analyzed, once substitute/propagation returns, control flows to iterative block 3006, which iterates for all conditions affected by the above-described substitution/propagation subroutine. In other words, for all variables affected, and for all instances of a single variable, each instance is involved in a different condition or operation. It is necessary to examine each one of the conditions associated with that variable to perform a substitution/propagation with process 3008, which is the same as the substitute/propagation process which was performed in process 3004.

Returning to process block 3004, after a particular variable instance has been substituted and propagated through the function, then iterative block 3006 performs an iterative loop. For some variables in sentences that are intermediate sentences, in the function, the variable conditions or characteristics have associated with them other variable characteristics which must be true in order for this variable to have this particular characteristic and therefore, for those other variable characteristics the same substitute propagation is performed in process 3008.

Figure 31:
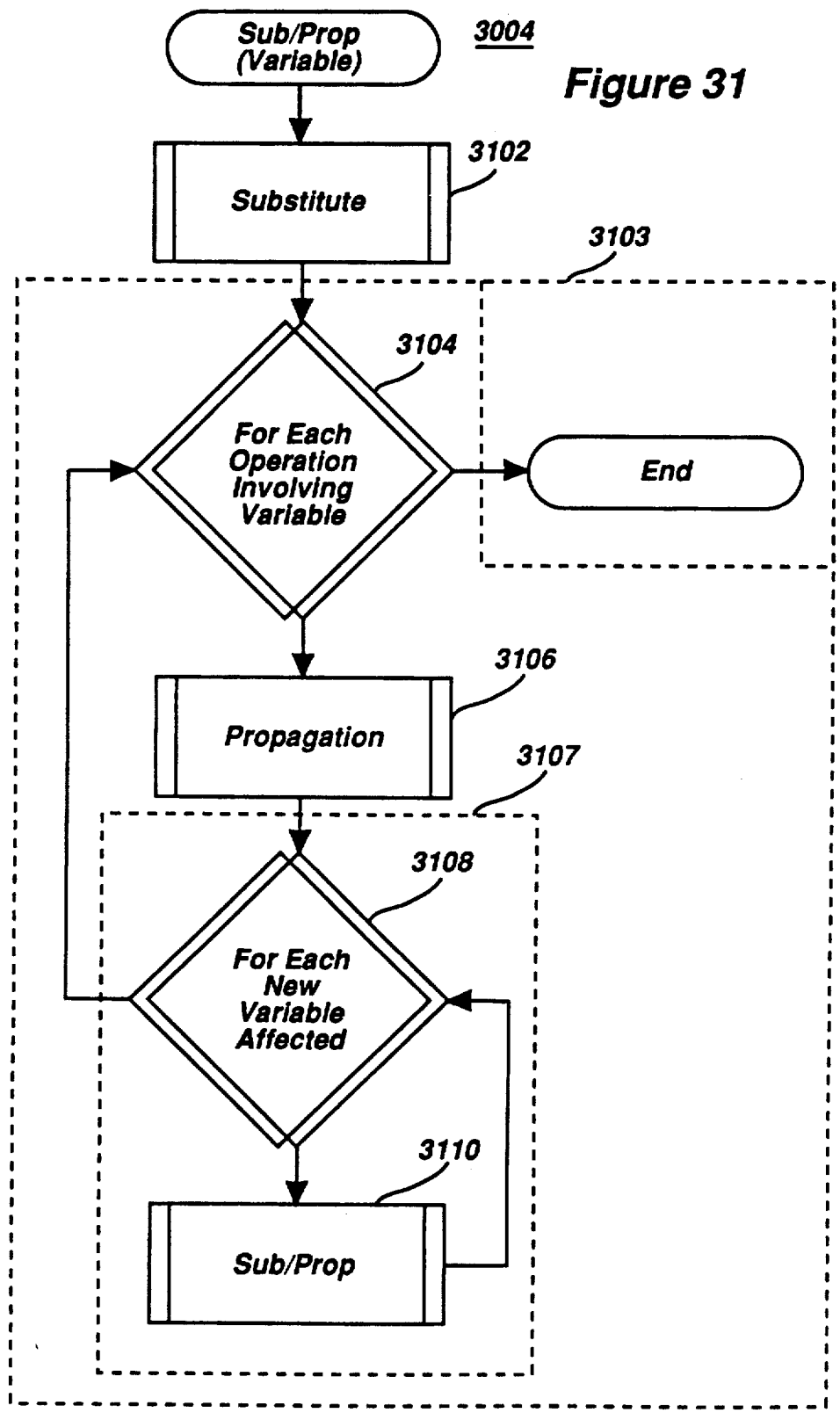
FIG. 31 is a flow diagram detailing the operation of the substitute/propagate subroutine invoked by the process of FIG. 30.

FIG. 31 shows in more detail the substitute/propagation process block 3004 and 3008. Substitute/propagation process block 3004 begins with process 3102 (substitute), which performs the actual substituting of characteristics for all variables in the clause. Control then passes to iterative block 3104 (loop 3103) which iterates for each operation or condition which the variable is found in; and for each operation or condition, control passes to process 3106, which propagates the characteristics through the condition. Control then passes to iterative block 3108 (in loop 3107), which iterates for each new variable affected by that propagation. Therefore, it recursively calls process 3110, which is identical to process 3004. Once all new variables affected have been analyzed, control returns to iterative block 3104, which then analyzes the next operation involved by that variable. Therefore, the present process is a depth-first substitution scenario in which a characteristic is substituted in the clause and then propagated across a function which affects other variables. The other variables are then substituted in the characteristics; any propagations associated with that variable are performed until the process is complete, with any effects for a single variable substitution computed, and then as each level is processed, the characteristic is substituted in the next characteristic for the variable.

Figure 32:
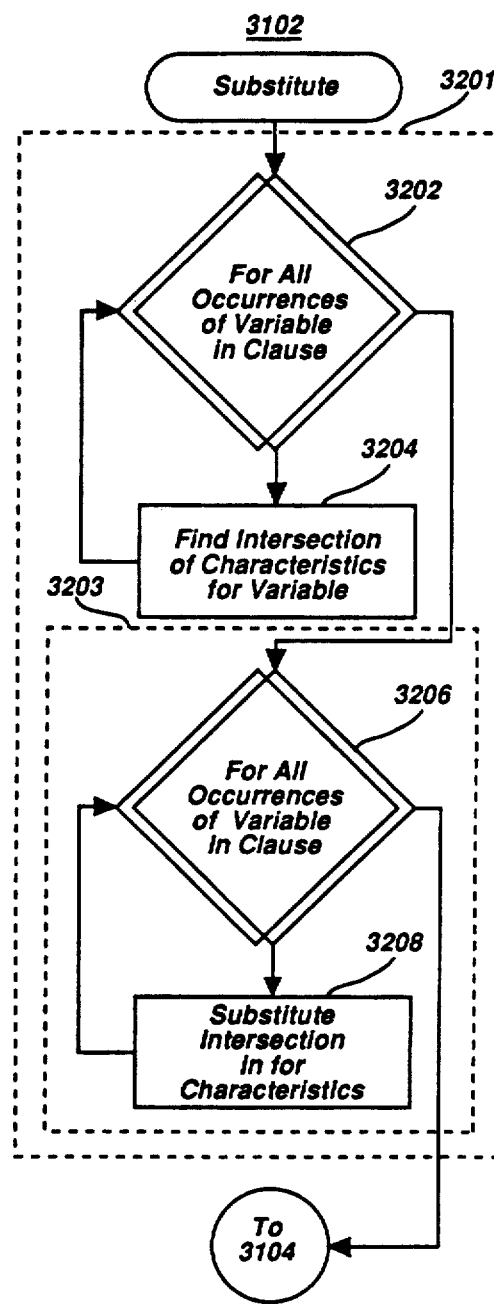
FIG. 32 is a flow diagram detailing the operation of the substitute subroutine invoked by the process of FIG. 31.

Referring now to FIG. 32, the substitute subroutine called by the subroutine of FIG. 31 is shown in detail. This process begins with iterative block 3202, which iterates for all occurrences of the variable in the clause and locates the intersection of the new characteristics that must be substituted in those characteristics which are currently assigned to that variable. Once the intersections are located, they are returned to become a new set which is substituted for the next instance of the variable for a new intersection. When completed, iterative block 3204 has produced the intersections of all characteristics for that variable. Intersections are defined as a set intersection.

Once the intersections are located, control passes to iterative block 3206, which again iterates, for all variables, and passes control to item 3208, which substitutes intersection sets into each occurence of the variable.

When all of the occurrences for the variables in the clause have been assigned a new characteristic set by iterative block 3206, then control passes to iterative block 3104 of FIG. 31.

Referring to FIG. 33, process 3106, designated propagation, is described in more detail. Process 3106 begins with conditional block 3302, which determines the type of operation being propagated across. The operation may be one of three types. The operation may be a nil-sensitive function, it may be a condition, or it may be a non-nil-sensitive function. A nil-sensitive function is a general category of functions for which the parameters of the function can take on characteristics of good, bad and nil. Nil-sensitive functions are those in which the output is nil or not existent if any of the parameters are nil. Non-nil-sensitive functions are those functions in which the output is insensitive to nil functions or nil parameters. Most mathematical functions may be considered nil-sensitive. A voter may be considered a non-nil-sensitive function. For example, a voter votes the inputs that it has and if an input is nil then it votes on the other inputs. It is always up to the discretion of the user if the user wants to define a new type; the structure exists for defining the new function.

Voters are only one type of component. Other examples of components are threshold components, adders, sensors and communication interfaces which may be composed of many other types of components for the purpose of reliability analysis. In other words, failure modes are best characterized by the effects on their outputs. Most components may be characterized as input/output components. It is the specific function provided by the component which differentiates one from the other. The nil-sensitive and non-nil-sensitive designation is a useful method of distinguishing the functions of components. For example, an adder component may be defined which adds A and B. However, it is necessary to determine the result of adding A and B when A is bad. Most commonly, it is assumed that the output is going to be bad. Therefore, instead of requiring the user to specify in a mathematical equation for analysis, a set of formulas is defined for propagating characteristics through these functions. Most functions will act according to one of these defined formulas. Therefore, if the user is able to indicate that this is a nil-sensitive or a non-nil-sensitive function, it is not necessary to know the values which contributed to an output being bad, but rather only that the output is corrupted in some way.

Once the type of operation is identified by conditional block 3302, if a nil-sensitive function is detected, process control invokes conditional block 3304, which determines if all operands or parameters for this function have characteristics defined. If not, then the function cannot be analyzed or propagated yet. Therefore, control returns to conditional block 3108. However, if all operands have characteristics, then control enters process block 3306, which propagates the characteristics through the nil-sensitive function as defined in FIGS. 34A-34B2. If the type of operation, according to control block 3302, is a non-nil-sensitive function, control enters conditional block 3308, which analogously determines if all operands for that function have characteristics; and if so, process block 3310 is executed to propagate through the non-nil-sensitive function. If all operands have not been defined, process control returns to conditional block 3108. Finally, if the operation is a condition such as a greater than, less than or equality test, then control enters "condition propagation" process 3312, which propagates through the function, after which control returns to conditional block 3108.

Referring now to FIGS. 34A, 34B1 and 34B2, the nil-sensitive propagation subroutine 3310 is described in detail. When invoked, control block 3402 determines if all variables in the clause have a possible characteristic of x:g and, if so, a new clause is created which is defined according to item 3404, which is initialized with:

output:g: "IF":

then iterative block 3406 iterates for all the variables in the clause and item 3408 appends to the new clause an AND: g characteristic for that variable. When the process represented by iterative block 3406 is complete, a single clause is generated which states that the output is good if all variables in the operation are good. If conditional block 3402 determines no variable has a good characteristic, then conditional block 3410 determines whether there is at least one variable in the function that has a nil characteristic and, if so, then a set of clauses for each variable possibility of nil is generated. Therefore, for each variable that has a possibility of nil it is desirable have a set of clauses which indicates which variables are nil. The output is nil "IF" the variable is nil OR for all clauses. A problem is that all clauses must be mutually exclusive with no overlapping characteristics, therefore, an exclusive OR condition is required.

For example:

x(1):n or x(2):n is 2 clauses wherein:

|x(1)|:n is clause 1

|x(2)|:n is clause 2 by clause 1+2 overlap (both are true) when x(1) and x(2) are true. Therefore, make exclusive OR |x(1)|:n, |x(2)|:n AND NOT x(n):n Iterative block 3412 iterates for all variables that have a possibility of an N characteristic. Item 3414 is selected to create a clause which states:

output = nil: "IF":x(i) = nil.

Control then passes to iterative block 3416 which iterates for all variables x(j)<i in the order assigned to the variables in the clauses. For all variables less than the variable x(i), the clause x(j) is appended by item 3418 and x(j) has a set of characteristics that has nil removed from the characteristic definition. This ensures that no clauses overlap.

After all variables x(j), for (j)<(i) have been analyzed, control passes to iterative block 3420, which iterates for those variables x(k), where k is greater than i in the function, and for each of those variables, the clause is appended by item 3422 in which the variable characteristic maintains the same characteristic as the old characteristics. After all variables x(k), k greater than (i) have been analyzed, control returns to iterative block 3412, which analyzes the next characteristic to create the next clause. After all characteristics have been analyzed, control passes to conditional block 3424, which determines if there is no variable that has a nil possibility as the only characteristic possibility. Process block is then called 3426 to create the set of clauses that have an output of bad. If, however, there is a variable in our function parameter list which has a characteristic possibility of only nil, then no bad clauses can be created since it's a nil-sensitive propagation function and process control passes to item 3428. Item 3428 is called after all the new clauses have been created, to append the rest of the information to the clause that existed in the old clauses and replace the old clause with the new clause just created. Also, meaningless clauses are eliminated. Control then passes to item 3430, which replaces the old clause with the new set of clauses on the clause list.

Figure 35:
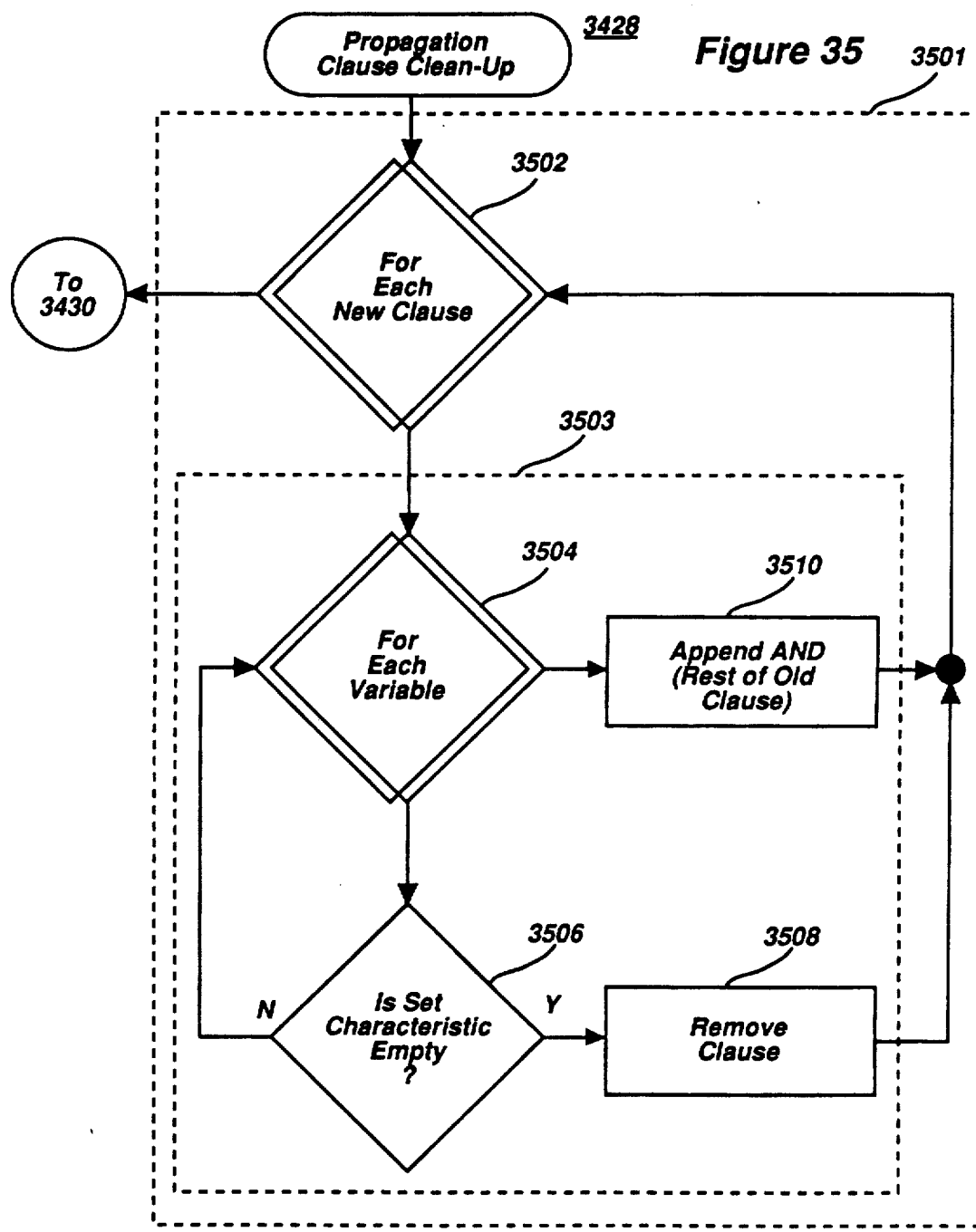
FIG. 35 is a flow diagram detailing the operation of the propagation clause cleanup subroutine invoked by the process of FIG. 34B1.

Referring now to FIG. 35, the propagation clause cleanup process 3428 begins with iterative block 3502 which iterates for each new clause created. Control then passes to iterative block 3504 which iterates for each variable in that new clause. Control then passes to conditional block 3506, which checks to see if the variable has any characteristic possibilities in this clause, and, if it does not have any characteristic possibilities (i.e., if the set of characteristic possibilities is empty) then the clause can never be true, and control passes to item 3508 which removes that entire clause from the set of new clauses. Control then passes to iterative block 3502 to analyze the next clause.

If, in conditional block 3506 the variable characteristic set is not empty, then control returns to iterative block 3504 to analyze the next variable in the clause. After all variables in the clause have been analyzed and none of them were empty, control passes to item 3510 which appends to the new clause the rest of the conditions in the old clause with the exception of the function that is being analyzed. When this is completed, control returns to iterative block 3502 to analyze the next new clause. When all clauses have been analyzed, control returns to item 3430 in FIG. 34B1.

The number of clauses created by this algorithm would be reduced if an a priori sorting of the variable parameters would place those variables without "g" characteristics ahead of those variable characteristics with "g". This is illustrated in conjunction with FIG. 36.

Figure 36:
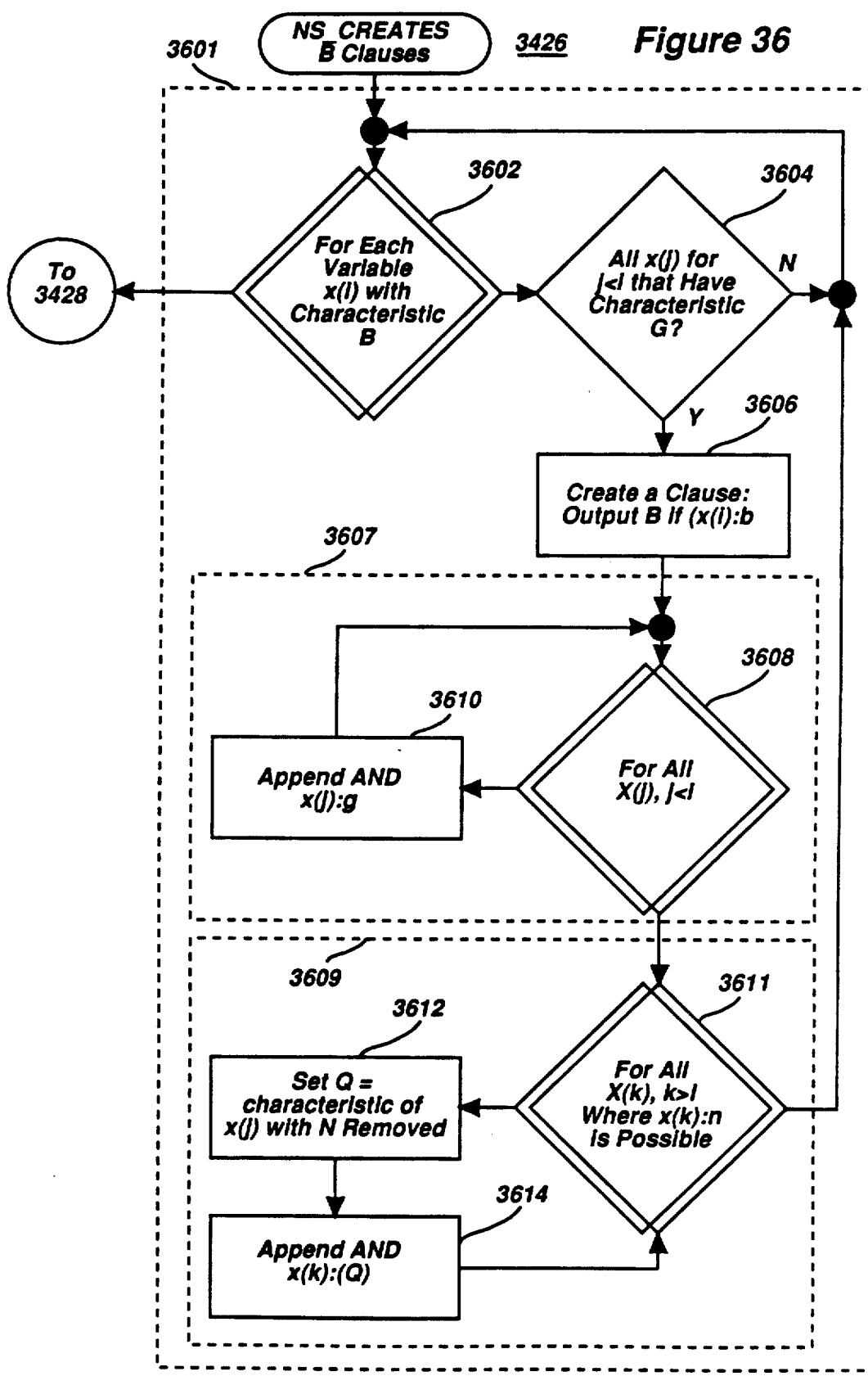
FIG. 36 is a flow diagram detailing the operation of the nil-sensitive create bad clauses subroutine invoked by the process of FIG. 34B1.

FIG. 36 details the "NS create B clauses" process 3426. This process creates all clauses that define the bad output characteristics for the nil sensitive function. Initially, iterative block 3602 is invoked, which iterates for all variables $x(i)$ which have a possible characteristic of bad or B. For each such variable, conditional block 3604 tests to determine whether all variables $x(j)$, for $(j)<(i)$ have a possible characteristic of good and if any of them do not have a characteristic possibility of good, then control returns to iterative block 3602 to get the next variable $x(i)$ that has a characteristic of bad or "B". If all $x(j)$ for $(j)<(i)$ have a characteristic possibility of good, then control passes to item 3606, which initializes a new clause that begins:

OUTPUT B IF $x(i)$:B.

Control then passes to iterative block 3608, which iterates for all variables $x(j)$, for $(j)<(i)$. Control then passes to item 3610 which appends to the newly created clause, the Boolean condition "AND $x(j)$: good". Control then returns to iterative block 3608 to iterate for the next variable. After all such variables have been analyzed, control passes to iterative block 3610, which iterates for all variables $x(k)$, for $(k)>(i)$ where $x(k)$ has a possibility of a nil value. In this case, control flows to item 3612, which sets the new characteristic set "Q" for that variable to the old set but removes nil or "N" from that set. Control then passes to item 3614, which appends the boolean to the existing new clause and $x(k)$ is of the set with nil removed. This is represented by the expression:

$x(k)$:Q

After that item has been analyzed, control returns to iterative block 3610 to analyze the next variable $X(k)$. After all variables have been analyzed, control returns to item 3428 in FIG. 34B1.

FIG. 37 details the processing involved for process block "non-nil-sensitive propagation" 3310, which was referred to in FIG. 33. Process 3310 begins with a conditional block 3702 which determines that all the variables have a characteristic possibility of good or G, and if so, then item 3704 creates a clause that begins:

output:G IF:

and control then passes to iterative block 3706, which iterates for all variables $x(i)$ in the function. Control then passes to item 3708 which appends to the new clause the Boolean:

AND $x(i)$:G

Control then returns to iterative block 3706 to iterate for the next variables. After all such variables have been analyzed, conditional block 3710 is entered which tests to see if all variables have a characteristic of nil or "N" possibility. Only if all variables have a characteristic of N possibility is item 3712 entered. Item 3712 creates a clause that begins:

output:N IF:

and then control passes to iterative block 3714, which iterates for all variables $x(j)$, and control passes to item 3716, which appends to the newly created clause the Boolean:

AND $x(i)$:N

Control then returns to iterative block 3714 until all variables have been analyzed. Control then passes to process block 3718, which creates all clauses that exist for bad characteristics. After process block 3718 is executed, control returns to process 3720, which is the propagation clause cleanup process discussed in reference to FIG. 35 and which is identical to process block 3428. Control then returns from process block 3720 to item 3722 which replaces the old clauses with the new clauses on the clause list. After which, control returns to conditional block 3108 according to FIG. 33.

Figure 38:
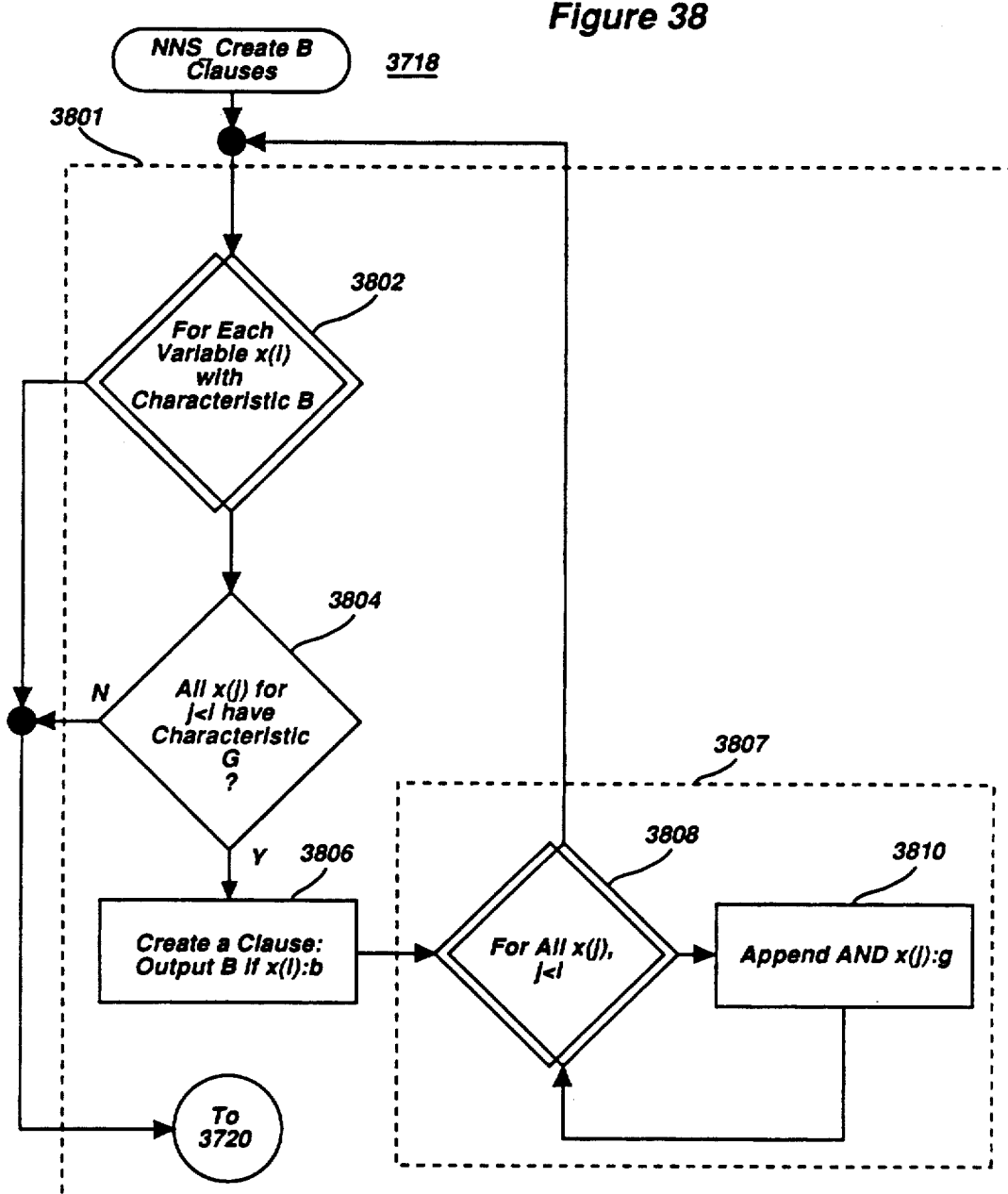
FIG. 38 is a flow diagram detailing the operation of the non-nil-sensitive create bad clauses subroutine invoked by the subroutine of FIG. 37.

FIG. 38 describes the process 3718 called by the process shown in FIG. 37. Process 3718, "NNS create B clauses", is called to create all clauses that reference bad characteristics or define the bad characteristics for that function, and it begins with an iterative block 3802, which iterates for each variable $x(j)$ that has a characteristic of bad or B. Control then passes to control block 3804 which checks to see that all variables:

$x(j)$, for $(j)<(i)$ have a characteristic of G for good.

If there are any variables that do not have a characteristic possibility of good or G, then control returns to control block 3720; however, if all variables $x(j)$ have characteristic possibility of good, then control passes to item 3806, which creates a new clause that begins:

output B IF $x(i)$:B

Control then passes to iterative block 3808, which iterates for all variables:

$x(j)$, for $(j)<(i)$.

Item 3810 then appends for each of those variables a Boolean:

AND $x(j)$:G and control then returns to iterative block 3808 to iterate for the rest of the variables $x(j)$. After all such variables have been analyzed, control returns to iterative block 3802 to get the next variable $x(i)$ with characteristic of B for bad.

Figure 39:
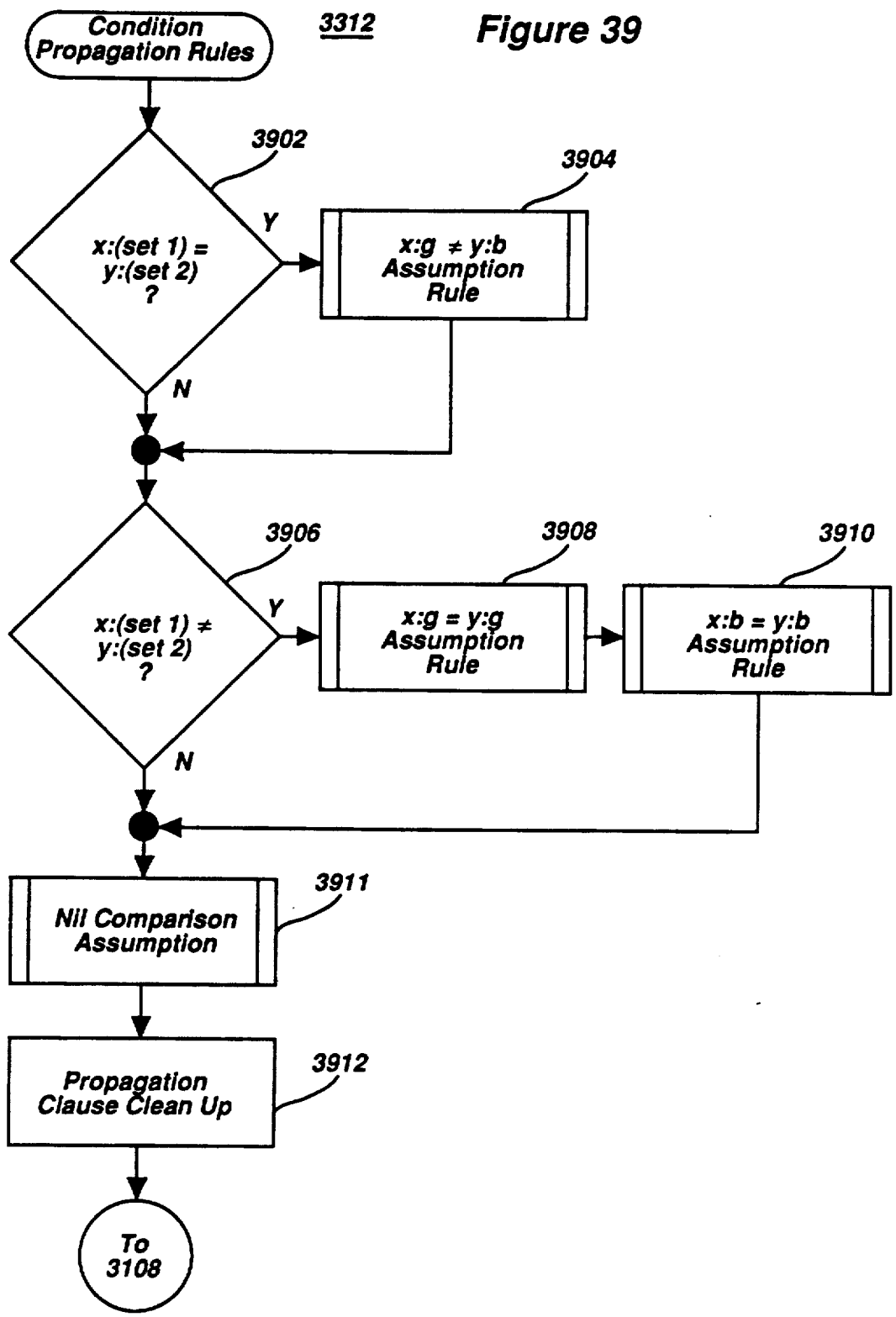
FIG. 39 is a flow diagram detailing the operation of the condition propagation rules subroutine invoked by the process of FIG. 33.

Referring now to FIG. 39, the "condition propagation rules" process is shown in detail. This was process 3312, described in conjunction with FIG. 33. Initially, conditional block 3902 checks to see if the condition is of the form:

$$x:(set\ 1) = y:(set\ 2)$$

If so, then process block 3904 is invoked to check to see if an assumption holds, and that assumption is:

$$x:(g) \neq y:(b)$$

Once process 3904 returns, process control is passed to conditional block 3906. Conditional block 3906 determines whether the condition is of the form:

$$x:(set\ 1) \neq y:(set\ 2)$$

Note: the symbols $\neq$ and $<>$ are equivalent in the present specification.

If that form is detected, then control passes to process block 3908, which checks to see if the assumption:

$$x:(g) = y:(g)$$

may hold for this condition. In either case, returning from process 3908, control passes to process 3910 to check to see if the assumption:

$$x:(b) = y:(b)$$

may hold for this condition. After process 3910 is complete, control passes to 3911 to remove comparisons to nil characteristics. After process 3911, control passes to process block 3912, designated propagation cleanup clauses and discussed in conjunction with FIG. 35. When complete, control returns to conditional block 3108 according to FIG. 33. Therefore, condition propagation rules generally check to see if the condition adheres to some criteria, and if so, tests to determine if certain assumptions about the condition can be verified. If these assumptions are verified, then some reduction in the number of characteristics can be made.

Referring now to FIG. 40, process 3904 tests the assumption:

$$x:(g) = x:(b)$$

Process 3904 begins with inquiry block 4002, which asks the user, if under this context in a particular clause, can it be assumed that:

$$x:(g) \neq y:(b)\ for\ all\ conditions$$

The reason the user must enter this information is that under some conditions the system cannot arbitrarily make the decision because it lacks the knowledge. For example, in the case of a threshold analyzer, some characteristic may be coming in that is bad, and the function of this component is defined:

$$IF\ x:(b) > 30\ or\ x:(b) < 30$$

Therefore, the threshold component cannot determine if the variable x that is bad is greater than 30 or less than 30. These assumptions model assumptions that analysts have to make in their analysis because of the incomplete knowledge of failures. In other words, it is not possible to determine the manner in which the data is corrupted. Therefore, the analyst makes assumptions and the present invention cannot unilaterally make an assumption that all conditions that are bad are always going to fail. It is therefore necessary to interrogate the user. So in this case the user is asked whether it can be assumed that:

$$x:G \neq y:B\ for\ a\ particular\ x\ and\ y.$$

If the user answers that the assumption can be made, then the following changes are made to the clause. Control enters conditional block 4004, which checks to determine whether the characteristic good is in Set 1, Set 1 being the set for x and Set 2 being the set for y. If it's good in Set 1, then a new clause is created by item 4006 with B being removed from Set 2. Conditional block 4008 then checks to determine whether bad (B) is in Set 1; if B is in Set 1, then item 4010 creates a new clause with good (G) removed from Set 2. Conditional Block 4012 then checks to determine whether the condition good is in Set 2 for the y characters and then if good is in Set 2, item 4014 removes bad from Set 1. Conditional block 4016 then checks if bad is in Set 2; if bad is in Set 2, then item 4018 removes good from Set 1. Finally, item 4020 eliminates any new clauses in which Set 1 or Set 2 have no characteristics associated with them, and combines any clauses that are duplicates of each other. Control then returns to conditional block 3906.

The process of FIG. 41 tests the assumption rule:

$$x:g = y:g$$

which are two variables wherein both characteristics are equal.

The first step of process 3908 is an inquiry block 4102 which asks the user if those two characteristics being good are always assumed to be equivalent, and if it is, conditional block 4104 checks to determine whether good is in set 1 for the x variable. If it is, item 4106 creates a clause with good removed from set 2.

Conditional block 4108 then checks to see if good is in set 2; if the characteristic good is in set 2 for variable y, then item 4110 creates a clause with good removed from set 1 for variable x. Finally, item 4112 eliminates clauses with set 1 or set 2 that have no characteristics and combines common clauses. Control then returns to conditional block 3912.

Figure 42A:
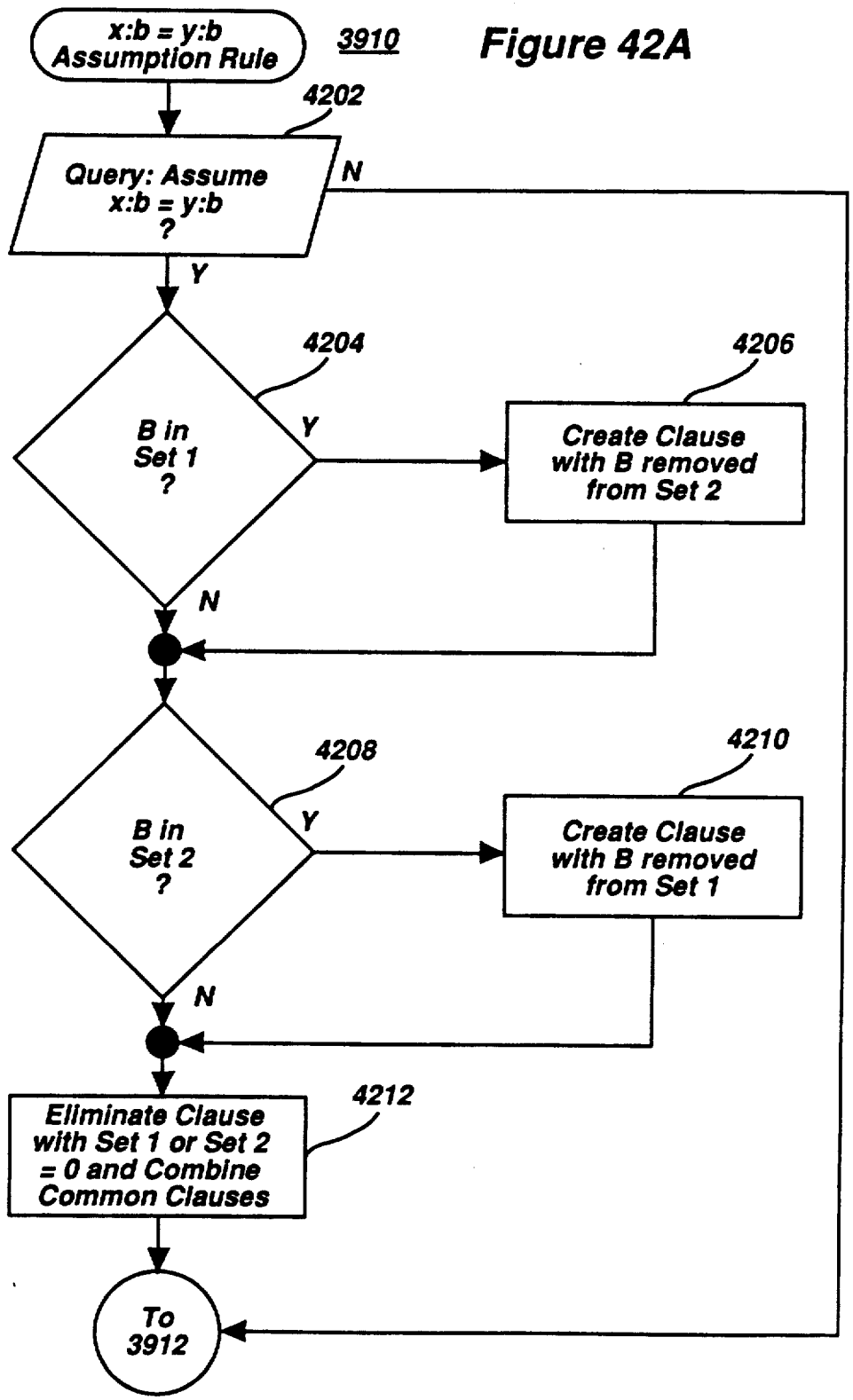
FIG. 42A is a flow diagram detailing the operation of the x:b=y:b assumption subroutine invoked by the process of FIG. 39.

Process 3910 is shown in more detail in FIG. 42A. Process 3910 begins with inquiry box 4202 which asks the user if the assumption that:

$$x(b) = y(b)\ can\ be\ made\ under\ all\ conditions$$

If that assumption cannot be made, then program control returns to item process 3912 of FIG. 39. If the assumption can be held true, conditional block 4204 checks to determine whether the characteristic bad is in set 1. If it is, then item 4206 creates a new clause with the characteristic bad removed from set 2. Conditional block 4208 checks to determine whether the characteristic bad is in set 2; if it is, item 4210 creates a new clause with the characteristic bad removed from set 1. Finally, item 4212 removes or eliminates the clauses with set 1 or set 2 equal to 0 and combines the common clauses. Process control flow then returns to process 3912.

Figure 42B:
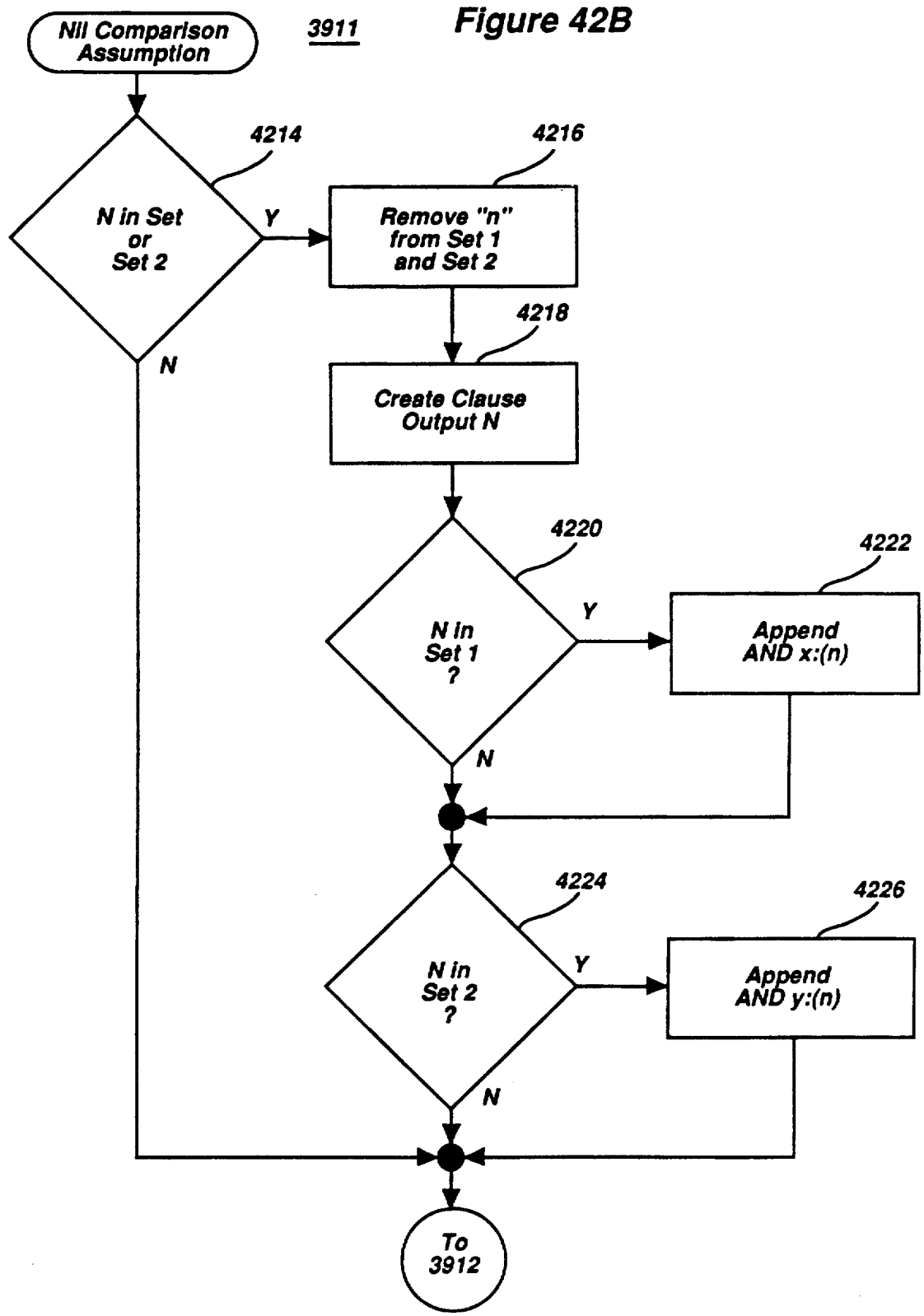
FIG. 42B is a flow diagram detailing the operation of the nil comparison assumption subroutine called by the process of FIG. 39.

FIG. 42B shows in detail the operation of Phase 2 for process 3911. This process removes nil characteristics from comparison operators since if is irrelevant to compare variables that are "nil". Control flow passes to conditional block 4214 which checks to see if the characteristic "nil" is in either variables characteristic set. If it isn't, control passes to 3912. If it is, control passes to item 4216, which removes the characteristic "nil" from the variables in the clause. Then control passes to item 4218, which creates a new clause which begins:

OUTPUT N IF

Control then passes to conditional block 4220, which checks if "N" is in set 1. If it is, item 4222 appends to the new clause:

AND x:(n)

Control then passes to conditional block 4224, which checks if "n" is in Set 2. If it is, item 4226 appends to the new clause:

AND y:(n)

Control then returns to 3912.

Figure 43:
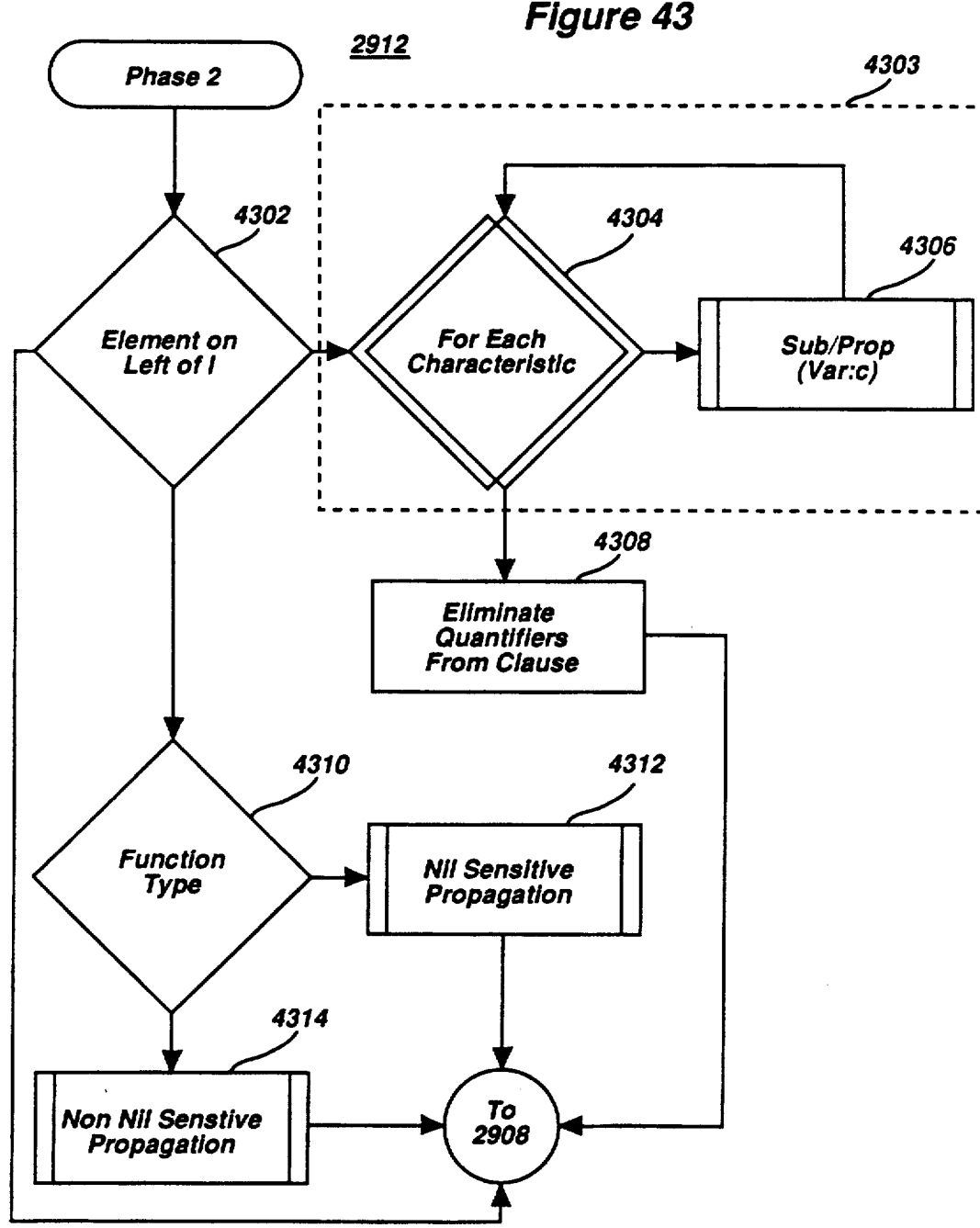
FIG. 43 is a flow diagram detailing the operation of the phase 2 subroutine invoked by the process of FIG. 29.

FIG. 43 shows in detail the operation of the Phase 2 process 2912 which was called by the process of FIG. 29. After all the substitutions and propagations have been performed for the clause, the consequent part of the clause (to the left of the | in the current functional definition) is instantiated for each possible output characteristic. There are three types of consequents to a clause: a function, a variable, or a single characteristic.

1. Characteristic: If the consequent is a characteristic, then no instantiation is necessary.

2. Variable: If the consequent is a variable, then a separate clause is created for each characteristic associated with the variable. For each new clause, the characteristic is substituted into the characteristic set for that variable, and the substitution/propagation algorithm is executed for the clause.

3. Function: If the consequent is a function, the appropriate function propagation rules are applied to the function (NS or NNS function propagation rules), and the substitution/propagation algorithm is executed for the clause.

Process 2912 begins with a conditional block 4302, which, given a clause, examines the element to the left of the vertical bar in the clause. Recall that vertical bars are used to designate clauses and semicolons designate sentences. The vertical bar indicates the form: the output of the clause is an element if these particular conditions exist. In this case, the consequent of the clause is examined to determine what type of element it is. If the element is a characteristic, no further processing is required because Phase 2 instantiates a clause for each possible characteristic. In that case, control returns to conditional block 2908 of FIG. 29.

If the element is a variable, then iterative block 4304 iterates for each characteristic of the variable in conjunction with process block 4306, which invokes a substitute/propagate process which was defined in conjunction with FIG. 31, and invokes that subprocess for the particular characteristic to propagate that characteristic back through the function. Control then returns to iterate for the next characteristic. After all characteristics have been instantiated through iterative block 4304, then control passes to item 4308, which then removes any quantifiers which may have existed in the clause. When complete, control returns to iterative block 2908.

If the element analyzed in conditional block 4302 is a function, then control passes to conditional block 4310, which determines what type of function it is. If it is a nil-sensitive function, then process block 4312 performs a nil-sensitive propagation process which creates clauses for each new characteristic; and if it is a non-nil-sensitive function type, then process block 4314 performs a non-nil-sensitive propagation process, which was discussed in conjunction with FIG. 37, to create clauses for each characteristic of that function type. After all function characteristics have been instantiated, control returns to iterative block 2908.

Figure 44:
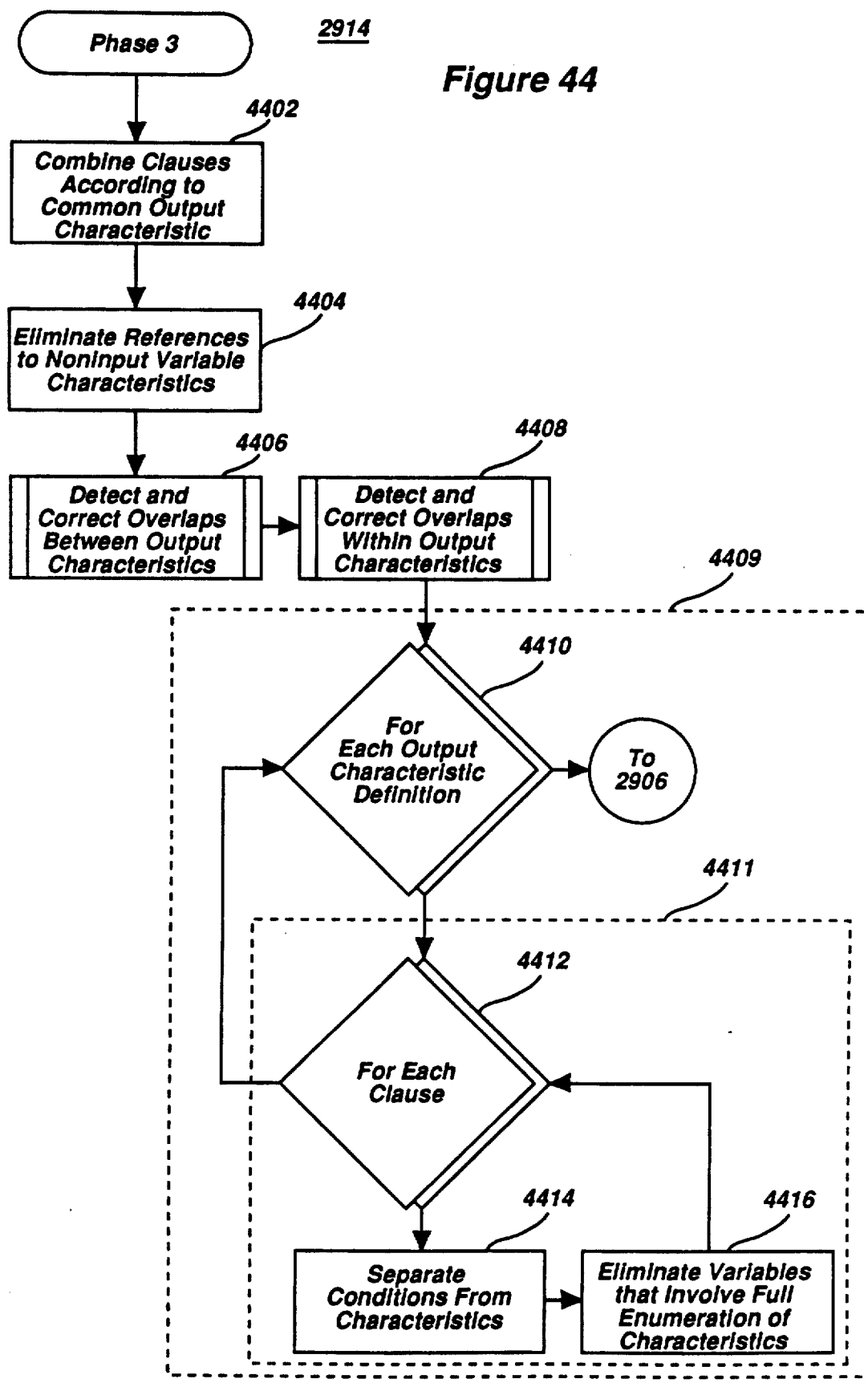
FIG. 44 is a flow diagram detailing the operation of the phase 3 subroutine invoked by the process of FIG. 29.

FIG. 44 details Phase 3, which was introduced in FIG. 29 as process block 2914. The Phase 3 process is performed after all sentences in the function have been analyzed and the output characteristic definitions for the last sentence have been defined. The output characteristic definitions for each clause in the sentence are combined according to a common output characteristic to become new output characteristic definitions for each characteristic.

After all clauses have been instantiated for the sentence, the clauses are grouped, in Phase 3, according to common output characteristics. Next, the algorithm analyzes each group pair to detect overlapping conditions between output characteristics. After all overlaps between groups have been eliminated, each group is analyzed to detect overlaps within an output characteristic definition so that a more consise OCD is defined. The previous example discussed the motivation for eliminating overlapping conditions and the heuristics used to resolve the conflicts. Therefore, such information is not repeated in this section. After all conflicts have been resolved within and between output characteristic groups, the input characteristics are separated from both the intermediate variable characteristics and the internal boolean conditions. This is because the final OCD for the subcomponent must define the output characteristics of the function in terms of the input characteristics and the state of the subcomponent. References to the state of the subcomponent are added in process L2 after all failure and non-failure states have defined OCDs.

Once clauses are combined in item 4402, item 4404 is called to eliminate references to any noninput variable characteristics. The variable itself will still be referenced in the clause but the characteristics are not of importance in this case, because only input characteristics are processed in this process, and output characteristics are defined in terms of input characteristics and intermediate variable characteristics. Process block 4406 then is called to detect and correct overlaps between output characteristics. The purpose of this process is to make sure that the output characteristics definitions do not overlap, or, in other words, there is no input characteristic combination that is defined as producing two different output characteristics.

After overlaps between output characteristics have been corrected, process flow continues to process block 4408, which detects and corrects overlaps within each output characteristic definition. Following process 4408, control passes to iterative block 4410, which iterates for each output characteristic definition. This is followed by nested iterative block 4412, which iterates for each clause within each output characteristic definition and within each clause item 4414 separates the conditions in the clause from the characteristics of the clause.

After the conditions have been separated from the characteristics, item 4416 eliminates any variables that involve the full enumeration of characteristics, good, bad and nil. After iterative block 4412 has finished, control returns to iterative block 4410 to analyze the next output to characteristic definition. Following this control returns to conditional block 2906 of FIG. 29, that will now analyze the next sentence.

Figure 45:
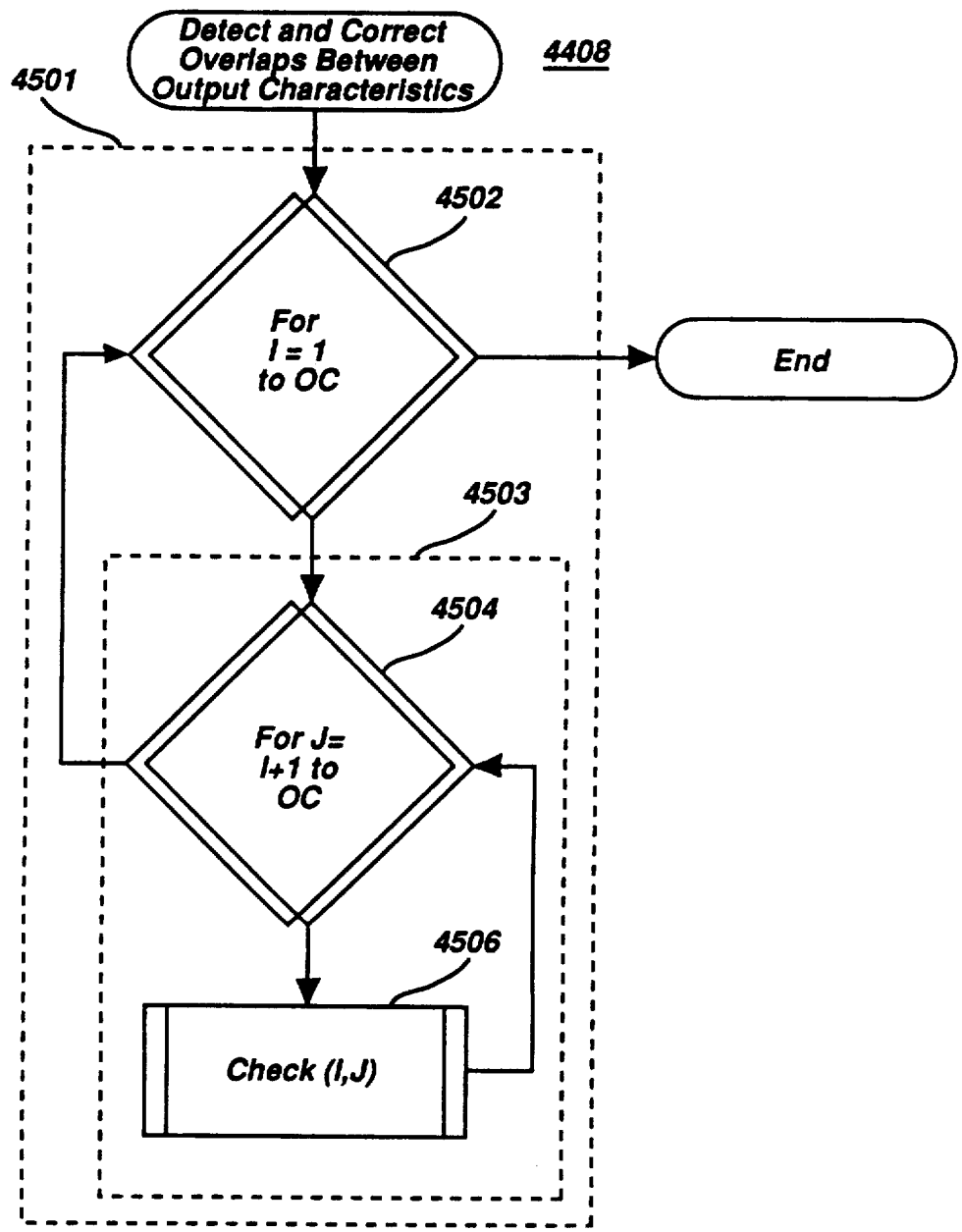
FIG. 45 is a flow diagram detailing the operation of the detect and correct overlaps between output characteristics subroutine invoked by the process of FIG. 44.

FIG. 45 introduces in more detail what is involved with detecting and correcting overlaps between output characteristics. The process of FIG. 45 is invoked to detect overlaps between each output characteristic definition. When invoked, iterative block 4502 iterates for each output characteristic definition, as indicated by the statement "FOR I = 1 to OC", where OC is the number of output characteristics: good, bad or nil. Iterative block 4504 is then invoked to iterate for each output characteristic greater than the current output characteristic. Iterative blocks 4502 and 4504 analyze each possible pair of output characteristics. For example, first good and then bad are analyzed, then good and then nil are analyzed and then bad and then nil are analyzed in a nested loop structure. Process block 4506 is then invoked to check output characteristic I with output characteristic J to determine if any overlaps exist between any of the clauses between the two characteristic pairs.

Figure 46:
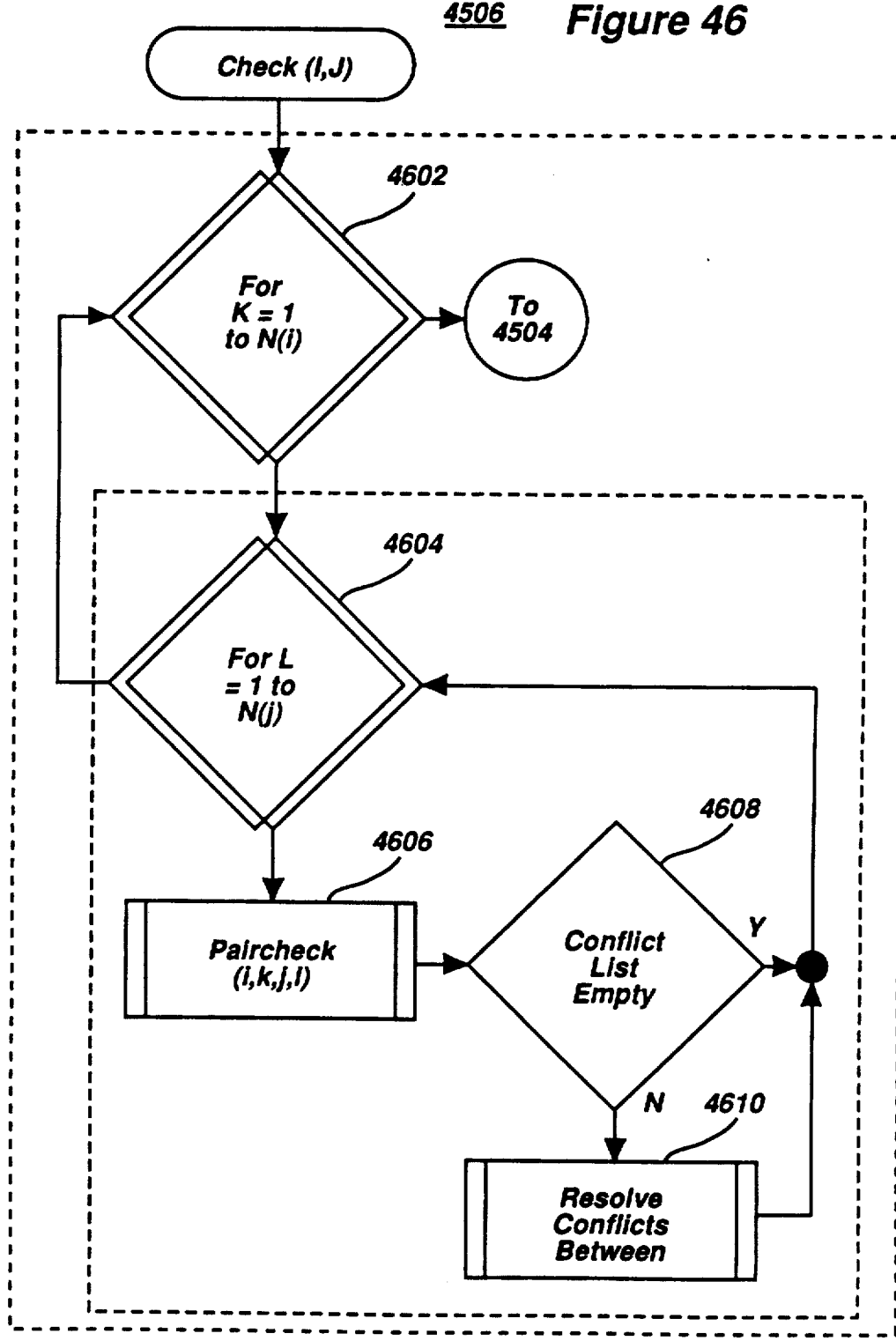
FIG. 46 is a flow diagram detailing the operation of the check (i,j) subroutine invoked by the process of FIG. 45.

Process 4506, designated "check I,J", is discussed in further detail in conjunction with FIG. 46. Process 4506 begins with an iterative loop 4602 which iterates for each clause in output characteristic I, as indicated by the statement: "for K equals 1 to N(i)", where N(i) is a number of clauses with output characteristic I. This is followed by nested iterative block 4604 which iterates for each clause L, wherein L equals 1 to N(j) for the number of clauses in input characteristic (j), to find each possible pair of characteristics between output clauses between output characteristics I and J. Process block 4606 is invoked for processing each pair of clauses between two characteristic definitions. Process 4606 is responsible for checking two particular clauses detecting an overlap between those two clauses and that process returns a list of variables that conflict or overlap in some manner, so once returned, control flows to conditional block 4608 which checks to determine whether the conflict list is empty, and if the conflict list is empty then control returns to conditional block 4604, which iterates for the next paragraph.

If the conflict list is not empty, then control proceeds to process block 4610, which resolves conflicts between those two clauses. After all clauses have been analyzed for these two output characteristics, control flows to iterative block 4504.

Figure 47:
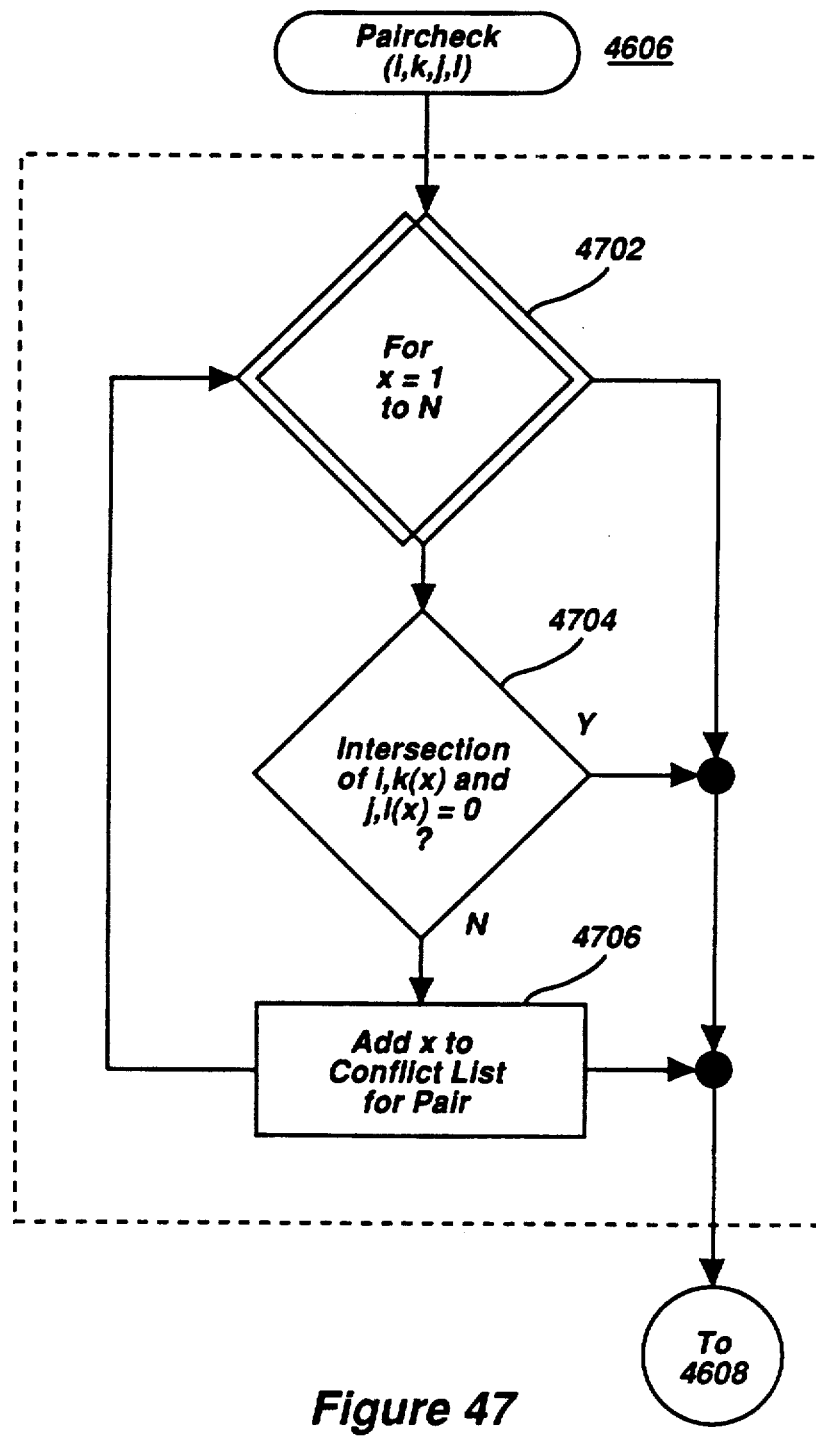
FIG. 47 is a flow diagram detailing the operation of the paircheck (i,j,k,l) subroutine invoked by the process of FIG. 46.

FIG. 47 discusses in more detail process "pair check" 4606. Pair check 4606 iterates, initially, with iterative block 4702 for each variable x from 1 to N wherein N is the number of input variables in the clause. For each variable, conditional block 4704 determines if the intersection of characteristics between the two sets of characteristics for the same variable is empty. If that intersection is empty and if there is no overlap between those characteristic sets of this variable, then, at a minimum, it is known that the clauses are distinguished by that variable. Therefore, there is no overlap between those clauses, and control returns to conditional block 4608.

If there is some intersection, then there is a possibility that there's still an overlap between the clauses and control passes to item 4706 which adds x to the list of possible conflict pairs and then control passes to iterative loop 4702. If at any time conditional block 4704 determines the intersection equals zero, the entire clause is not overlapping and control returns conditional block 4608.

Figure 48:
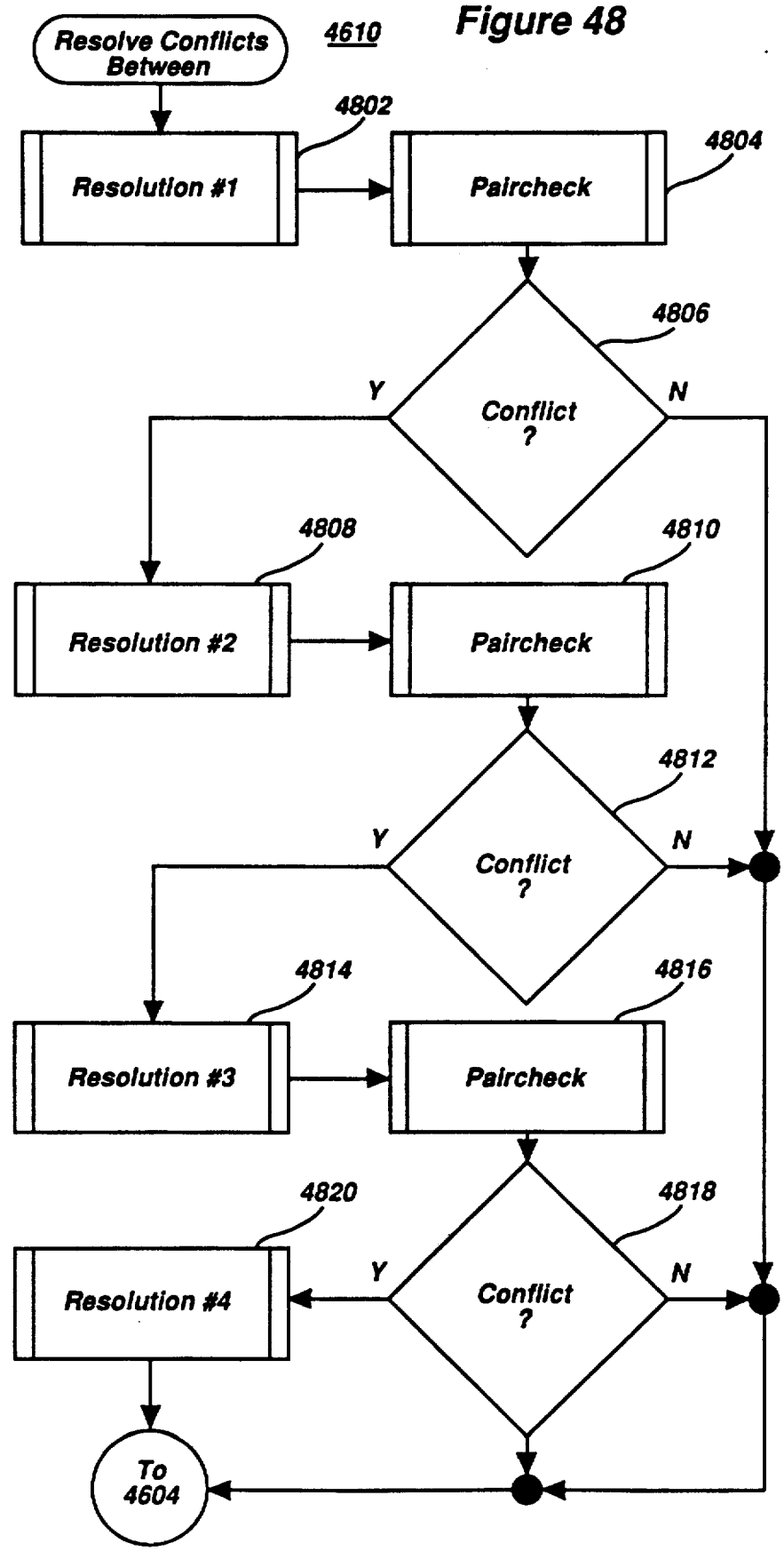
FIG. 48 is a flow diagram detailing the operation of the resolve conflicts subroutine invoked by the subroutine of FIG. 46.

Referring now to FIG. 48, process 4610 is described in more detail. The purpose of process 4610 is to resolve a conflict which may exist between two clauses, and there are four options which may be taken. Options are invoked in the order of preference. The preference is based upon, initially, options that are most often taken by users given, the same situation leading to options that are less and less based upon logic and reason. These also are options taken by users. FIG. 48 indicates that processes are invoked, one resolution at a time, and process 4802 is invoked to attempt to resolve a conflict through resolution number 1. Upon return, process 4804 is invoked to re-execute the pair check and conditional block 4806 checks to determine whether the conflict still exists. If the conflict no longer exists, this process ends and returns to process 4604. If the conflict still exists, then the process block 4808 is invoked to attempt to resolve the conflict through resolution number 2 and pair check process 4810 is invoked and the conflict is again tested by conditional block 4812. Failing a resolution at this level, process control block 4814 is invoked to resolve the conflict using resolution number 3. Again, pair check is invoked by process 4816. The conflict is tested again by conditional block 4818 and failing a conflict resolution at this stage, process block 4820 is invoked which necessarily resolves the conflict using resolution number 4. Control then returns to conditional block 4604.

Figure 49:
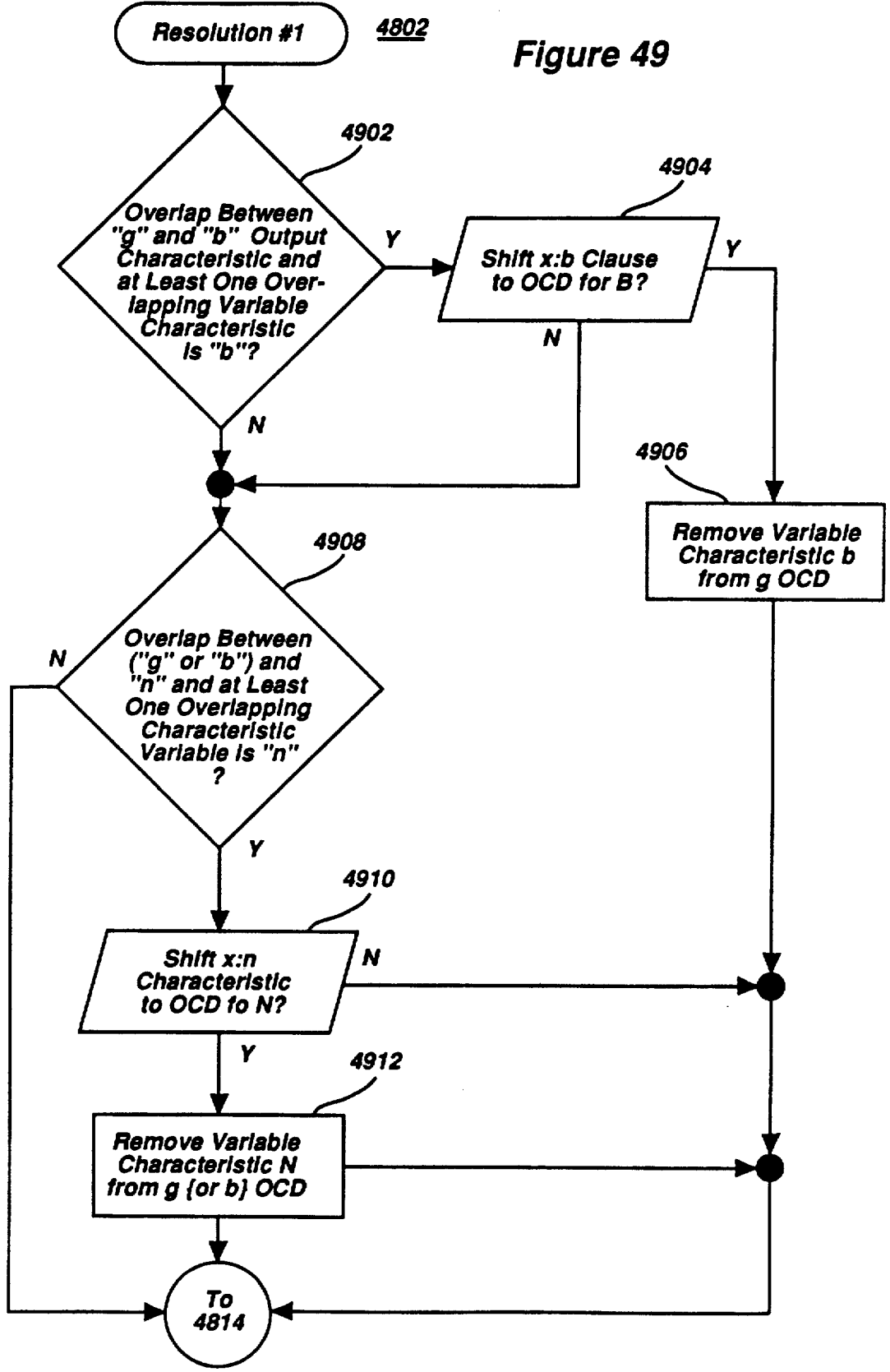
FIG. 49 is a flow diagram detailing the operation of the resolution #1 subroutine invoked by the subroutine of FIG. 48.

Process 4802, designated "resolution 1", is detailed in FIG. 49 and was invoked by conditional block 4812. There are two assumptions that are commonly used by analysts to reduce or eliminate overlaps between characteristics. One assumption is the fact that if an overlap is between a good characteristic definition and a bad characteristic definition and if one of the overlapping characteristic definitions is a bad characteristic for a variable, then a conservative assumption is to shift the difference (or those conditions that are in both cases) to the bad output. Conditional block 4902 tests this condition, and if that condition is satisfied, inquiry block 4904 asks the user if the bad characteristic for the particular variable can be attributed to the output characteristic definition for all bad characteristics. If the analyst answers yes, then item 4906 removes the variable characteristic for bad from good output characteristic definition or OCD. If the analyst answers no, then control passes to conditional block 4908. Conditional block 4908 tests to determine if the overlap characteristic is between two clauses, one clause being a nil output characteristic definition clause and the other one being either a good or bad OCD clause. If it is between these two types of clauses and the intersecting variable characteristic is nil, then inquiry block 4910 is invoked to ask user if the overlapping characteristic can be shifted to the output characteristic definition for all nil outputs. If the analyst answers yes, then item 4912 is invoked to remove the overlapping conditions from the OCD for good or bad. Control then returns to 4814.

Figure 50:
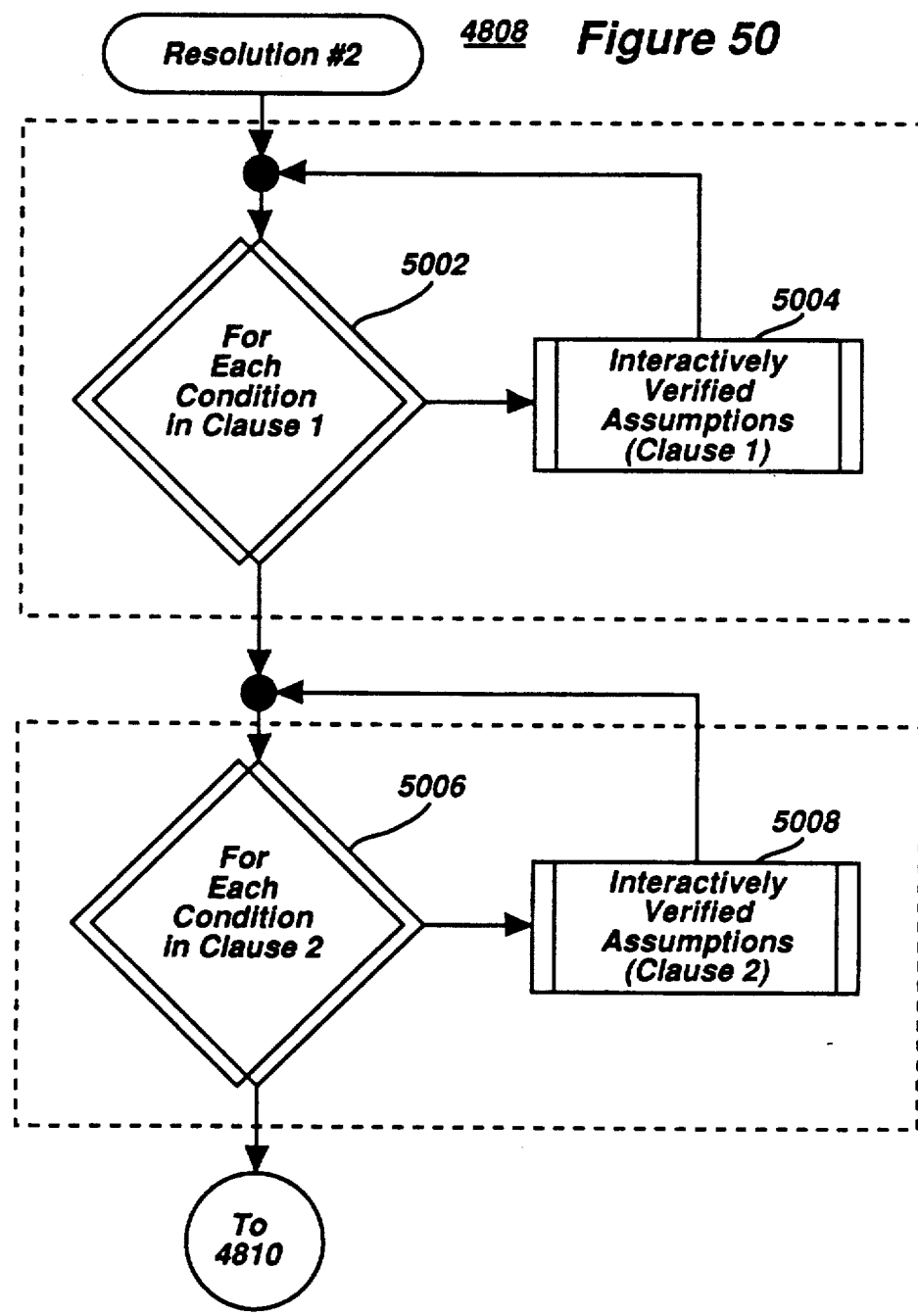
FIG. 50 is a flow diagram detailing the operation of the resolution #2 subroutine invoked by the subroutine of FIG. 48.

Referring now to FIG. 50, the resolution number 2 routine 4808 is discussed in detail. Resolution number 2 begins with the iterative block 5002, which iterates for each condition in clause 1. For each condition in clause 1 process block 5004 is invoked for that clause to interactively verify the assumptions. After each condition in clause 1 has been analyzed through loop 5002, iterative block 5006 is invoked for the second clause and each condition in this clause is analyzed through an identical process designated 5006 to iteratively verify assumptions for Clause 2. After both clauses have been analyzed, control returns to process 4810.

Figure 51:
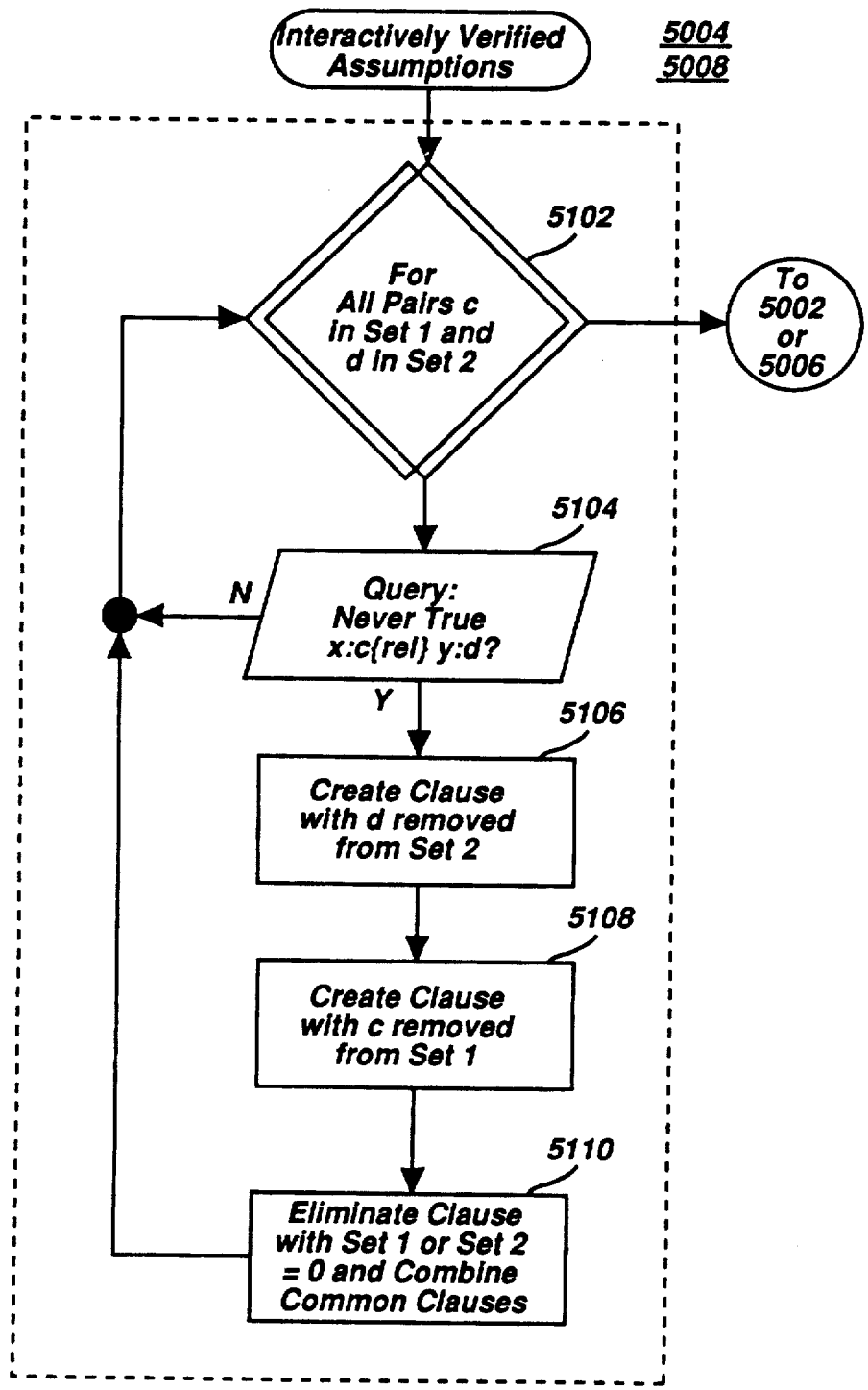
FIG. 51 is a flow diagram detailing the operation of the interactivity verified assumptions subroutine invoked by the processes 5004, 5008 of FIG. 50.

Interactively verified assumptions are discussed in conjunction with FIG. 51. This process is invoked by processes 5004 and 5006 of FIG. 50 and begins with an iterative block 5102 which iterates for all pairs of characteristics, c in Set 1 and d in Set 2. For each pair of characteristics, a query is asked of the user in inquiry block 5104 which asks the user if the condition being analyzed is never true when c is the characteristic for variable x and d is the characteristic for variable y and if this is always true, then the following reduction in the clauses can be made. Item 5106 creates a separate clause with d removed from Set 2 and then item 5108 creates another clause for c removed from Set 1. Item 5110 eliminates clauses that might have been created with Set 1 or Set 2 empty and combines the two clauses into to a single clause if they are the same clause. Control then returns to iterative block 5102 to iterate for the rest of the pairs, and then finally after all pairs have been completed control returns to process 5002 or 5006, where the paircheck routine will check for an overlap again.

Figure 52:
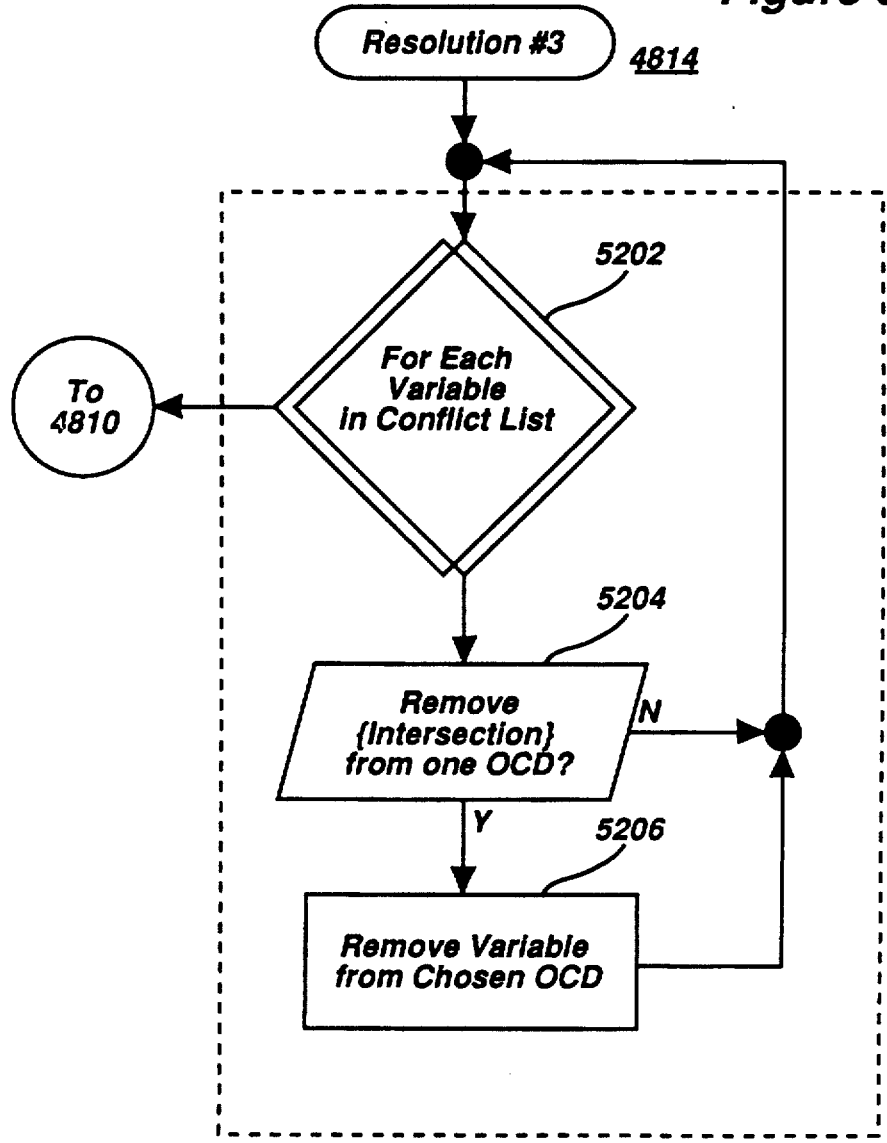
FIG. 52 is a flow diagram detailing the operation of the resolution #3 subroutine invoked by the process of FIG. 48.

Resolution number 3 is discussed in conjunction with FIG. 52. Failing resolutions number 1 or number 2, resolution number 3 begins with an iterative loop 5202 which iterates for each variable in the conflict list. For each variable, inquiry block 5204 asks the user if the intersection of the characteristics may be removed from one or the other of the output characteristic definitions. If the user answers yes, then item 5206 removes the variable characteristic from the chosen output characteristic definition and control returns to iterative loop 5202 to iterate for the other variables in the conflict list. If the user answers no, that the intersection may not be attributed to either one or the other output characteristic definition exclusively, then control returns to iterative block 5202 to iterate for the other variables in the conflict list. After all variables have been analyzed, control returns to process 4810.

Figure 53:
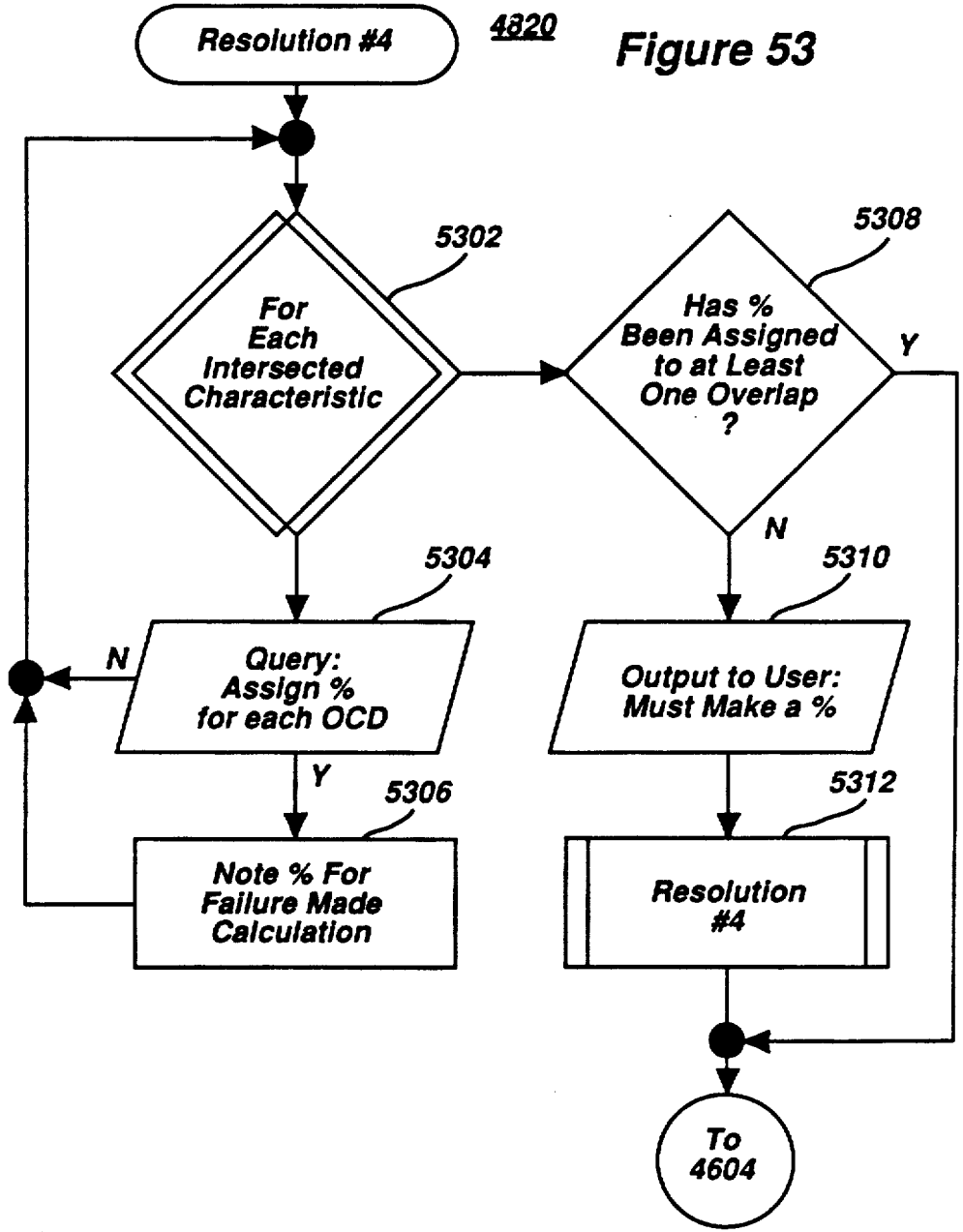
FIG. 53 is a flow diagram detailing the operation of the resolution #4 subroutine invoked by the process of FIG. 48.

Process 4820, designated resolution number 4, is discussed in more detail in conjunction with FIG. 53. Resolution number 4 is invoked when resolutions 1, 2 and 3 have not been successful. Resolution number 4 is always successful and it begins with an iterative block 5302 which iterates for each intersecting characteristic and invokes inquiry block 5304 to ask the user to assign a percentage by which each of the overlapping characteristic may be attributed to either output characteristic definition. If the user answers yes, the percentage is noted by item 5306 for that output characteristic. Control returns to inquiry block 5302 to ask the same question for the intersecting variable characteristics. After the user has had a chance to assign probability to all characteristics, control passes to conditional block 5308, which determines if the user has assigned a percentage to at least one of the overlapping characteristics. If the user has not assigned any percentage to any of them, then it outputs a message to the user in item 5310 instructing the user that at least one percentage has to be assigned, and then resolution 4 is invoked again in 5312 to give the user an opportunity to assign other characteristics. Therefore, process 5312 invokes the same resolution number 4 recursively, until the user assigns a percentage to one or the other. If the user has assigned a percentage to at least one of the overlapping characteristics, then the process returns to iterative block 4604.

Figure 54:
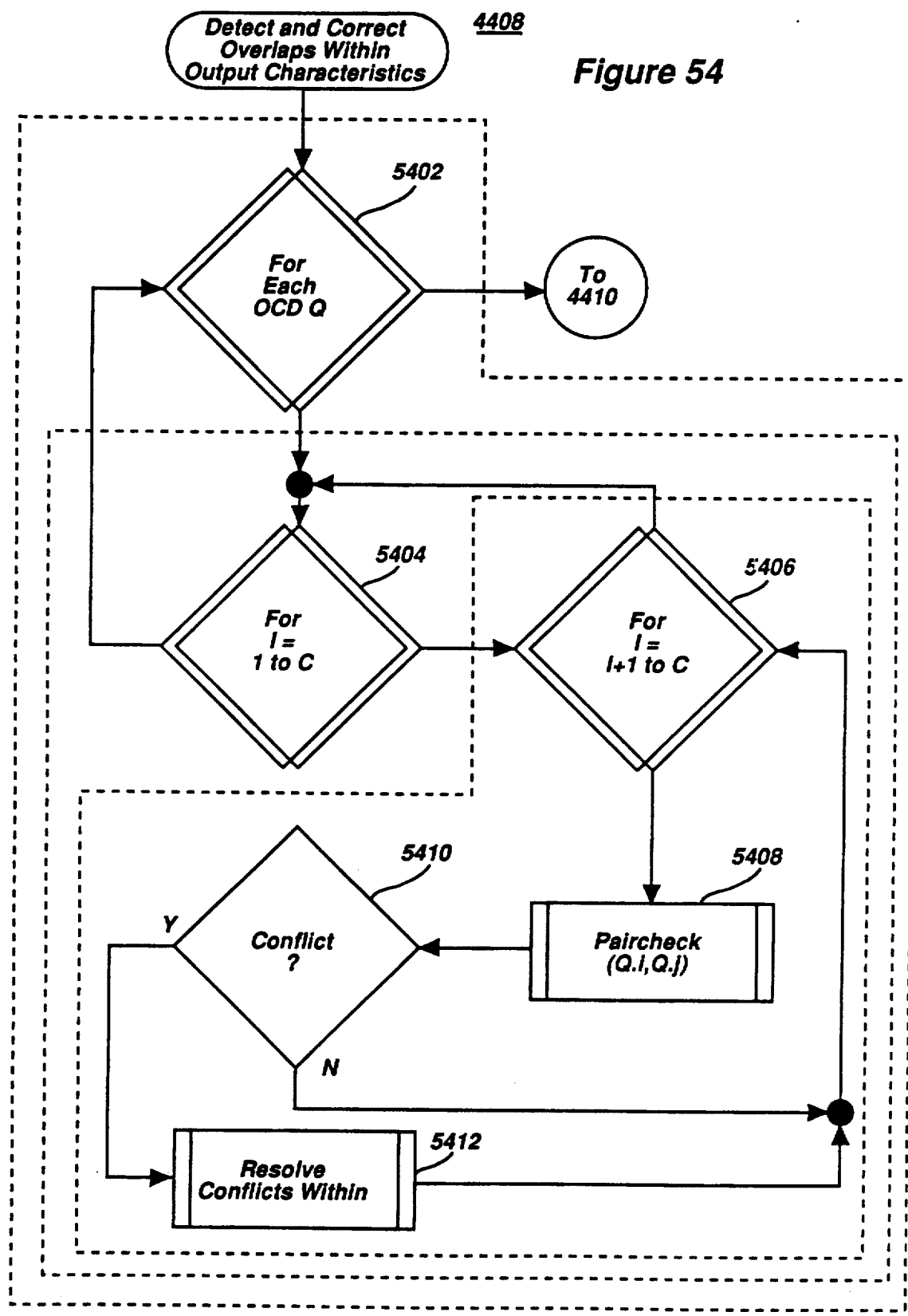
FIG. 54 is a flow diagram detailing the operation of the detect and correct overlaps within output characteristics subroutine invoked by the subroutine of FIG. 44.

The process of FIG. 54 is invoked after all overlaps between output characteristics definitions have been resolved. Process 4408 iterates for each output characteristic definition and attempts to resolve overlaps within clauses for each output characteristic definition. This isn't as critical as resolving overlaps between output characteristic definitions. However, it is desirable to reduce the state spaces. Therefore, the present process attempts to detect where one clause is a subset of another clause, and in that case, it chooses the superset clause and totally eliminates the subset clause.

The process begins with iterative block 5402, which iterates for each output characteristic definition clause Q. For each output characteristic definition Q, nested block 5404 iterates for each clause, 1 to C, in the output characteristic definition. This is followed by a third nested iterative block 5406 which iterates for each other clause given a particular clause so that every possible combinations of clauses within a single output characteristic definition is obtained. Given two clauses within an output characteristic definition, process block 5408 performs the pair check function, discussed above, to determine if a conflict exists between two clauses. Then conditional block 5410 determines if a conflict has been detected and if so process control block 5412 resolves conflicts within a particular clause. If a conflict does not exist, it checks the next pair through iterative block 5406. After all pairs have been analyzed and all output characteristic definitions have been analyzed, control returns to iterative block 4410.

Figure 55:
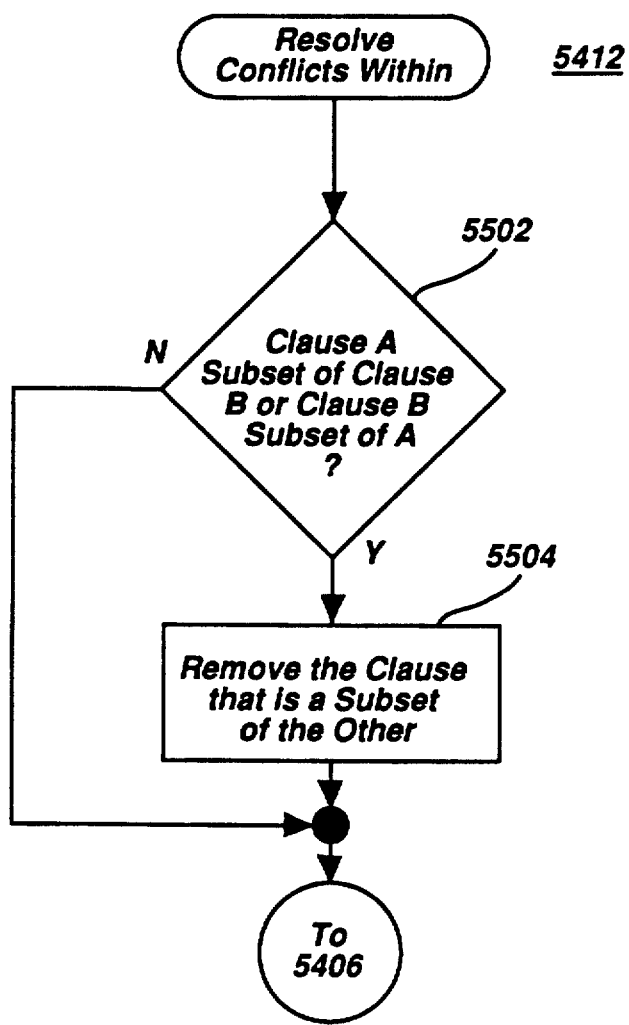
FIG. 55 is a flow diagram detailing the operation of the resolve conflicts within subroutine invoked by the process of FIG. 54.

Referring now to FIG. 55, the resolved conflicts routine 5412 is shown in detail. Process 5412 chooses the clause that is a subset of the other clause. When invoked, conditional block 5502 determines whether clause A is a subset of clause B or clause B a subset of clause A. If so, item 5504 removes the subset. If not, control returns to iterative block 5406.

Figure 56A:
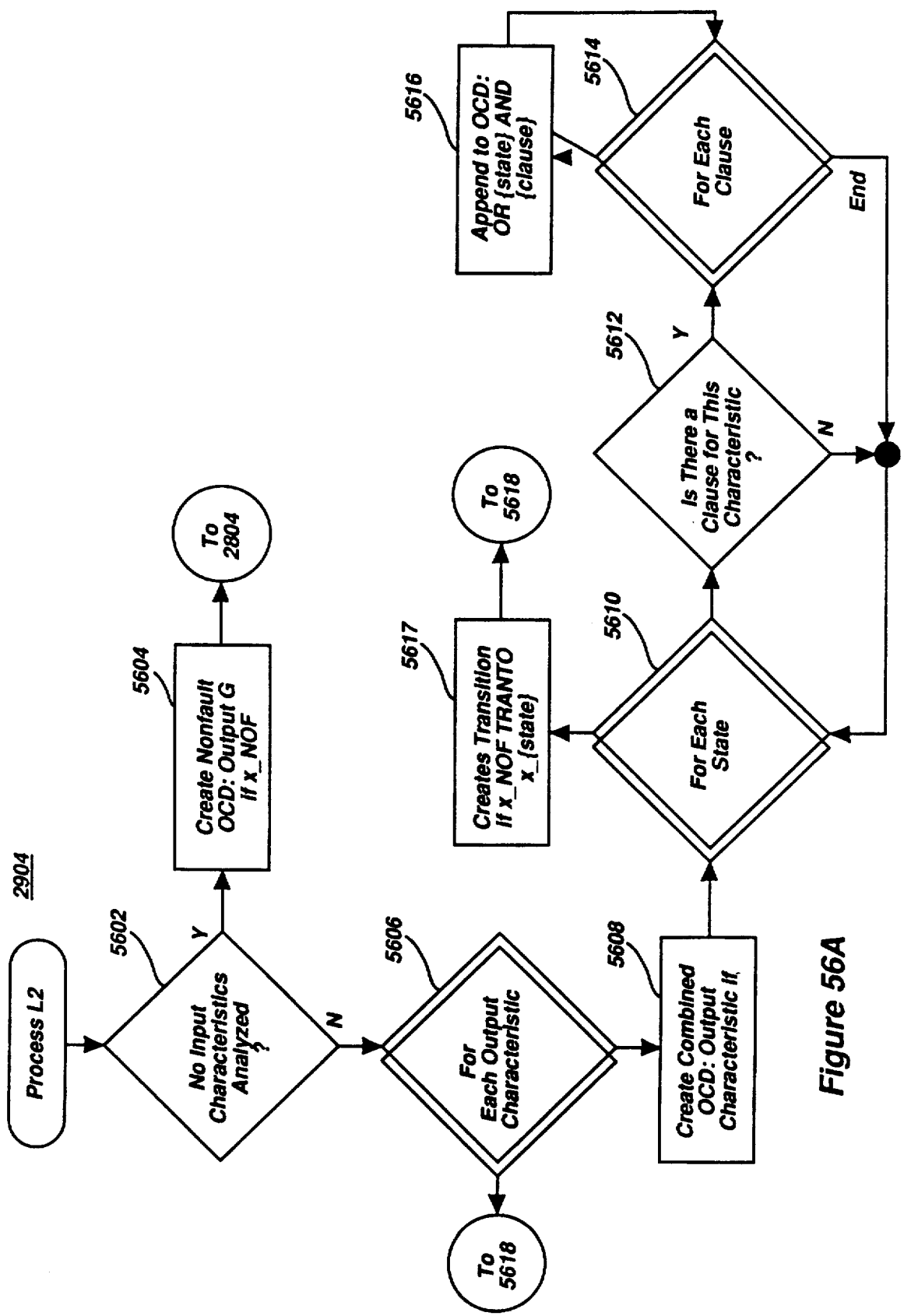
FIG. 56A is a flow diagram detailing the process L2 subroutine invoked by the process of FIG. 29.

FIG. 56 describes process 2904 (L2), which is invoked after all output characteristic definitions have been defined for each component's state for all failure modes and for nonfailure states of the component.

Process L2 is called after process L1 has analyzed each failure mode function and the non-failed function for a component. The purpose of process L2 is to combine the OCDs for each failure mode state into a single OCD for the component. The algorithm for process L2 is straightforward. For each output characteristic, a combined OCD is created by concatenating the failure mode state variable and the OCD for the failure mode state into a single clause. Thus, the combined OCD is defined as:

OUTPUT (output characteristic)
IF (OCD in L1) AND (fault state)
OR {next fault state}

In the case of a voter component, if two failure modes BAD, and NO-OP were also modeled for the voter, process L1 would return the following OCDs for each failure mode:

OUTPUT y:b
  IF VOTER_NOF TRANTO VOTER_BAD;
OUTPUT y:n

IF VOTER_NOF TRANTO VOTER_NO-OP;

The OCDs here are simplistic because in each case the output characteristic is defined regardless of the input characteristics. Nevertheless, this example illustrates how the OCDs for different failure modes can be combined.

The OCDs defined for the voter under a non-failed state as follows:
OUTPUT y:n IF ALL(x(i):n)
OUTPUT y:g IF #(x(i):g)>#(x(i):b)
OUTPUT y:b IF #(x(i):b)>#(x(i):g)
The combined OCD for y:g, y:b, and y:n is:
OUTPUT y:g IF #(x(i):g)>#(x(i):b) AND VOTER_NOF
OUTPUT y:b IF (#(x(i):b)>#(x(i):g) AND VOTER_NOF)
OR ({} AND VOTER_BAD)
OUTPUT y:n IF (ALL(x(i):n) AND VOTER_NOF)
OR ({} AND VOTER_NO-OP)
where the {} indicates that no input conditions existed for that failure mode's OCD. Eliminating the {}, the new OCDs are:
OUTPUT y:g IF #(x(i):g)>#(x(i):b) AND VOTER_NOF
OUTPUT y:b IF (#(x(i):b)>#(x(i):g) AND VOTER_NOF)
OR VOTER_BAD
OUTPUT y:n IF (ALL(x(i):n) AND VOTER_NOF)
OR VOTER_NO-OP All OCDs may be combined in this way to produce a correct, combined set of OCDs for the component. This, along with the transitions for each failure mode, constitutes the local reliability model that is returned.

In order to reduce the OCDs, heuristics may be applied. These heuristics are based on semantic knowledge of the condition variables (e.g., conditions X_BAD and X_NO-OP refer to the same component failure mode and conditions x:b,x:g, and x:n refer to the same variable characteristics). With this knowledge, OCD clauses may be combined and possible conditions eliminated so that the resulting OCD is reduced. For example, one heuristic groups OCD clauses (in disjunctive normal form) according to common input characteristics (i.e., clauses that differ only by component state). If the group of clauses represents all states for that component, then the group may be replaced by a single clause with the input characteristics only. Then, to maintain consistency, a condition AND NOT({input conditions}) is added to other clauses. An example of this heuristic follows:
Given the OCD:
OUTPUT N IF ((r=0 OR r=1) AND XNO-OP)
OR ((r=1) AND XBAD)
OR (r=1 and XNOF)
change the OCD into disjunctive normal form:

r = 0 AND XNO-OP [1]
r = 1 AND XNO-OP [2]
r = 1 AND XBAD [3]
r = 1 AND XNOF [4]

where [1], [2], [3], and [4] identify the new clauses. Attempt to group the clauses according to a common input characteristic:

r=0: Only clause 1 contains this characteristic, and all states of component X are not referenced in this clause.
r=1: Clauses [2], [3], and [4] can be grouped:

r=1 and (XNOF.XBAD. XNO-OP)

Since all component states are represented in the grouped clause, the group may be replaced by: r=1. Next, the condition: NOT(r=1), which is equivalent to r=0, may be eliminated from the other clause ([1]) so that the resulting OCD is:

OUTPUT N IF XNO-OP [1]
OR r = 1 [2-4]

This process defines the local reliability model for the output characteristic definition by creating the reliability model as follows. The conditional block 5602 determines if no input characteristics were analyzed, and if so then a single output characteristic definition of the form:

output: good: "IF": x <not failed> is returned by item 5604.

If this is not the case, then iterative block 5606 iterates for each output characteristic and item 5608 creates a combined output characteristic definition of the form:

output <characteristic> IF

Iterative loop 5610 then iterates for each state and proceeds to conditional block 5612 which determines if there is a clause for the characteristic in this state and if so iterative block 5614 iterates for each clause that has that characteristic and item 5616 appends to the newly combined output characteristic definition the logical:

OR <state>clause.

In other words, the present process creates the output: the output is good "IF" the component is in a particular state and particular conditions hold. It then loops for each clause or a component in the state and wherein the conditions hold. The process then loops for the state and appends for the next state, to produce a new state. When complete, all clauses within all states are identified. The model is returned to item 5617 which creates a transition for the state of the form:

F X_not failed transition to <state>

After item 5617 is returned, process 5618 is invoked to put all the new output characteristic definitions in DNF form. Item 5620 then groups the clauses that differ only by state and which have the exact same input characteristics. This will most likely occur if you have only one or two input characteristics. Once grouped by state and all states are represented in the group, according to conditional block 5622, the whole group may be replaced, according to item 5624, by a single clause with only the input characteristic.

Item 5626 then eliminates the condition NOT input characteristics in the other clauses if they exist, to provide a reduced set of clauses. Control returns to conditional block 2804 to produce the final output of the system.

In summary, a reliability model generator for use with a reliability analysis tool has been described. Accordingly, other uses and modifications will be apparent to persons of ordinary skill without departing from the spirit and scope of this invention.

We claim:

1. A computer system for generating reliability models comprising, in combination:
   a first memory having stored therein a first knowledge base for storing a plurality of low level reliability models which represent the reliability characteristics for low level system components;
   a second memory having stored therein a second knowledge base for storing definitions of the interrelationship of said low level models based on a desired system configuration; and
   means for aggregating the low level reliability models stored in said first knowledge base into a single reliability model based on the system configuration definitions stored in said second knowledge base.

2. The computer system of claim 1 further including means for manually inputting reliability parameters into said first knowledge base said, reliability parameters corresponding to individual components; and
   means for automatically generating low level reliability models based on said user defined reliability parameters for individual components and for storing said low level reliability models in said first knowledge base.

3. A reliability model generator comprising a programmed computer, memory means for storing
   a first knowledge base, said first knowledge base for defining a plurality of basic components in terms of a plurality of component input and output characteristics, failure modes and failure rates of said basic components wherein said output characteristics are affected by said failure modes, and further wherein said component characteristics describe component operation independent of any system configuration, said memory means for further storing
   a second knowledge base, said second knowledge base for storing desired system configurations which define the interconnections of said basic components;
   means for modifying the definitions stored in said first and second knowledge bases; and
   means for automatically calculating the effect of a failed basic component on the operation of said desired system by aggregating said component definitions stored in said first knowledge base based on the interconnection definitions stored in said second knowledge base.

4. The reliability model generator of claim 3 wherein said means for modifying definitions comprises an interactive graphics based user interface.

5. A programmed computer system for generating reliability models comprising in combination:
   first memory means for storing a plurality of component model definitions;
   second memory means for storing definitions of the interrelationships of said components; and
   means for mapping said component models into a global reliability model, wherein a component may comprise a plurality of subcomponents.

6. A method of automatically generating a reliability model of a system with a reliability model generator, said reliability model generator comprising a computer system having a memory, said memory storing a first knowledge base for encoding a function and a reliability model for each of a plurality of system components and said memory for further storing a second knowledge base for encoding a high level configuration of said system and a failure mode for said high level configuration, said method comprising the steps of:
   identifying the intermediate subcomponents of said system components and the failure modes for each of said subcomponents which contribute to the failure modes of said system components;
   identifying the lower level subcomponents of said intermediate level components and the failure modes of each said lower level subcomponents which contribute to the failure modes of said intermediate level components;
   inputting a set of inputs from said intermediate levels component identified with said lower level components for each of said identified lower level components;
   tracing the effects of all inputs through said lower level components to determine resulting output characteristics and transitions for possible failure modes of said lower level components for each operational state of said identified lower level components; and
   aggregating failure mode states and input characteristic conditions of said intermediate and lower level components to produce a global reliability model for said high level system configuration.

7. The method of claim 6 wherein said step of defining said component models includes the step of automatically performing failure mode effect analysis on said components.

8. A method for generating a reliability model with a reliability model generator, said reliability model for use with a reliability analysis tool, said reliability model generator comprising a computer system having a memory said memory for storing a first knowledge base of encoding definitions of the function and reliability of a plurality of one or more high level components, said method comprising the steps of:
   grouping said high level components into a set of subcomponents arranged in a hierarchical arrangement;
   analyzing each set separately and identifying critical failure modes for each set;
   combining failure modes of said subcomponents according to severity and common effects on said high level component to produce a composite model for each high level component; and
   repeating steps a-c until a composite model for the highest level component in the system is produced.

9. A computer system for automatically generating a reliability model for use with a reliability analysis tool, comprising in combination, a first memory means for storing a first knowledge base encoding predefined knowledge of
   a plurality of system components wherein each of said components has at least one input;
   a second memory means for storing a second knowledge base encoding predefined knowledge of a predefined set of output characteristics and failure modes for each of said system components based on said inputs;
   a third memory means for storing a third knowledge base encoding predefined knowledge of the interrelationship of said system components;

a fourth memory means for storing a fourth knowledge base encoding predefined knowledge of an output condition of a system being modeled; and a knowledge base interpreter for interpreting said first, second, third, and fourth knowledge bases means for tracing through said components to determine which of said failure modes of said system components contributed to said system output condition.

10. A method of generating a reliability model for use with a reliability analysis tool, said reliability model generator comprising a computer system having a memory said memory for storing a first knowledge base for storing definitions of A method of automatically generating a reliability model for use with a reliability analysis tool, local reliability models for each basic component in a system wherein each of said basic components provides a predetermined function expressed in terms of a sequence of operations mapping component inputs to outputs wherein said local reliability model defines the behavior of a component independent of any system configuration, said method comprising the steps of defining a desired system configuration comprising the interrelationship of said basic components to define the structural characteristics of a system;

defining the failure modes and failure rates for each of said basic components; and automatically calculating the effects of basic component failures on other components in the system to produce a global reliability model.

11. A method of generating a reliability mode, with a reliability model generator, said reliability model for use with a reliability analysis tool, said reliability model generator comprising a computer system having a memory, said memory for storing a first knowledge base for storing definitions of a plurality of basic system components in terms of function, and output characteristic definitions said method comprising the steps of:

defining a plurality of intermediate level components wherein said intermediate level components comprise a plurality of intermediate or basic system components coupled in series or parallel in a predefined configuration;

defining a system based on component interconnectivity;

calculating the output characteristic definition for each of said intermediate level components by aggregating the output characteristic definitions of said basic system components which comprise said intermediate level components based on said component interconnectivity;

defining a global system model with said intermediate level components coupled in a predetermined configuration by aggregating the output characteristic definitions of said intermediate level components and eliminating overlaps between said output characteristic definitions of said intermediate level components to produce a global system output characteristic definition; and calculating the effects of failures of lower level components on said global system model.

12. The method of claim 11 wherein input and output characteristics are used to represent the effects of component failure modes emanating to other components in the system.

13. The method of claim 11 wherein said step of determining the effects of failures of lower level components includes the step of determining the effects of corrupted inputs on component's outputs regardless of inputted values.

14. The method of claim 11 wherein said step of defining a plurality of basic system components includes the step of defining the relationship between what is input to the component and the information that is produced by the component based on said input and known functions performed by said component.

15. The method of claim 11 wherein each of said components is mathematically defined by a series of statements separated by a semicolon to indicate sequential flow among statements wherein a plurality of clauses may be defined within a statement and further wherein each clause represents a condition under which component state changes.

16. The method of claim 15 wherein each clause is delineated by "|" and takes the form:

$$y = x | x > z$$

where x, y and z comprise input or output variables.

17. The method of claim 16 wherein the basic system components are defined to allow the effects of input characteristics to be traced through the function to define output characteristics wherein said output characteristics become input characteristics for other components.

18. The method of claim 17 wherein rules define output characteristics of good, bad or nil for all possible input characteristics good, bad or nil based on predefined component functions and failure modes.

19. The method of claim 17 wherein logical rules define output characteristics of one, zero or data values based on predefined logical functions and failure modes.

20. The method of claim 11 wherein generic functions are defined to characterize nil-sensitive and non-nil-sensitive operations.

21. The method of claim 11 wherein failure modes are defined as a change in component's outputs produced by a change in a component function representing degraded operation.

22. The method of claim 11, further including the step of automatically accounting for failure modes which do no affect system operation.

23. The method of claim 11, further including the step of accounting for failure modes wherein said system automatically compensates for said failure modes.

* * * * *

UNITED STATES PATENT AND TRADEMARK OFFICE
CERTIFICATE OF CORRECTION

PATENT NO.    :   5,014,220
DATED         :   May 7, 1991
INVENTOR(S)   :   Catherine M. McCann; Gerald C. Cohen It is certified that error appears in the above-identified patent and that said Letters Patent is hereby corrected as shown below:

In column 75, claim 11, line 33, please delete "mode" and substitute therefor -- model --.

Signed and Sealed this

Sixteenth Day of February, 1993

Attest:

STEPHEN G. KUNIN

*Attesting Officer*    *Acting Commissioner of Patents and Trademarks*